(12) United States Patent
Kokubo et al.

(10) Patent No.: US 7,019,280 B2
(45) Date of Patent: Mar. 28, 2006

(54) APPARATUS FOR DETECTING THE TILT OF A LIGHT REFLECTOR RELATIVE TO THE OPTICAL AXIS OF INPUT LIGHT

(75) Inventors: Fumio Kokubo, Nara (JP); Keiji Sakai, Nara (JP); Tetsuo Ueyama, Nara (JP); Renzaburo Miki, Kyoto (JP)

(73) Assignee: Sharp Kabushiki Kaisha, Osaka (JP)

(*) Notice: Subject to any disclaimer, the term of this patent is extended or adjusted under 35 U.S.C. 154(b) by 46 days.

(21) Appl. No.: 10/489,694

(22) PCT Filed: Sep. 17, 2002

(86) PCT No.: PCT/JP02/09489

§ 371 (c)(1),
(2), (4) Date: Mar. 15, 2004

(87) PCT Pub. No.: WO03/025499

PCT Pub. Date: Mar. 27, 2003

(65) Prior Publication Data

US 2004/0238727 A1    Dec. 2, 2004

(30) Foreign Application Priority Data

Sep. 17, 2001  (JP) ............................. 2001-282137
Sep. 6, 2002   (JP) ............................. 2002-261839

(51) Int. Cl.
*G01D 5/34*     (2006.01)
*G02B 27/40*    (2006.01)
*G02B 27/64*    (2006.01)
*G02B 7/04*     (2006.01)

(52) U.S. Cl. ............................. 250/231.1; 250/201.5; 369/112.01

(58) Field of Classification Search ............ 250/201.5, 250/231.1; 340/689; 200/61.45 R, 61.52; 369/44.11–48.14, 112.01–112.29
See application file for complete search history.

(56) References Cited

U.S. PATENT DOCUMENTS

| 4,908,506 | A | * | 3/1990 | Coops et al. ............ 250/201.5 |
| 5,036,185 | A | * | 7/1991 | Ando ...................... 250/201.5 |
| 5,065,380 | A | * | 11/1991 | Yokota .................... 369/44.12 |
| 5,313,332 | A |   | 5/1994 | Schell et al. ............... 359/813 |
| 2004/0228236 | A1 | * | 11/2004 | Sakai et al. ............... 369/44.41 |

FOREIGN PATENT DOCUMENTS

| EP | 1 031 970 A2 | 8/2000 |
| JP | 59-87309 | 5/1984 |
| JP | 5-87548 | 4/1993 |
| JP | 8-235624 | 9/1996 |

* cited by examiner

*Primary Examiner*—David Porta
*Assistant Examiner*—Patrick J. Lee
(74) *Attorney, Agent, or Firm*—David G. Conlin; David A. Tucker; Edwards Angell Palmer & Dodge LLP

(57) ABSTRACT

The object of the invention is to accurately detect the amount of tilt in the light reflector to the optical axis of an output light with a simple configuration. A tilt sensing apparatus includes a light reflector, a light source, a condensing unit for condensing an output light from the light source onto the light reflector, and a light sensing unit for sensing the reflected light from the light reflector. An optical device provided in the condensing unit for varying the light quantity of the transmitting light has first and second optical device strips that are formed at the positions of axial symmetry about the optical axis and have a predetermined shift in the direction of a straight line of connecting the axis of the light reflector to the condensed position where the light emitted from the light source is condensed onto the light reflector by the condensing unit.

27 Claims, 38 Drawing Sheets

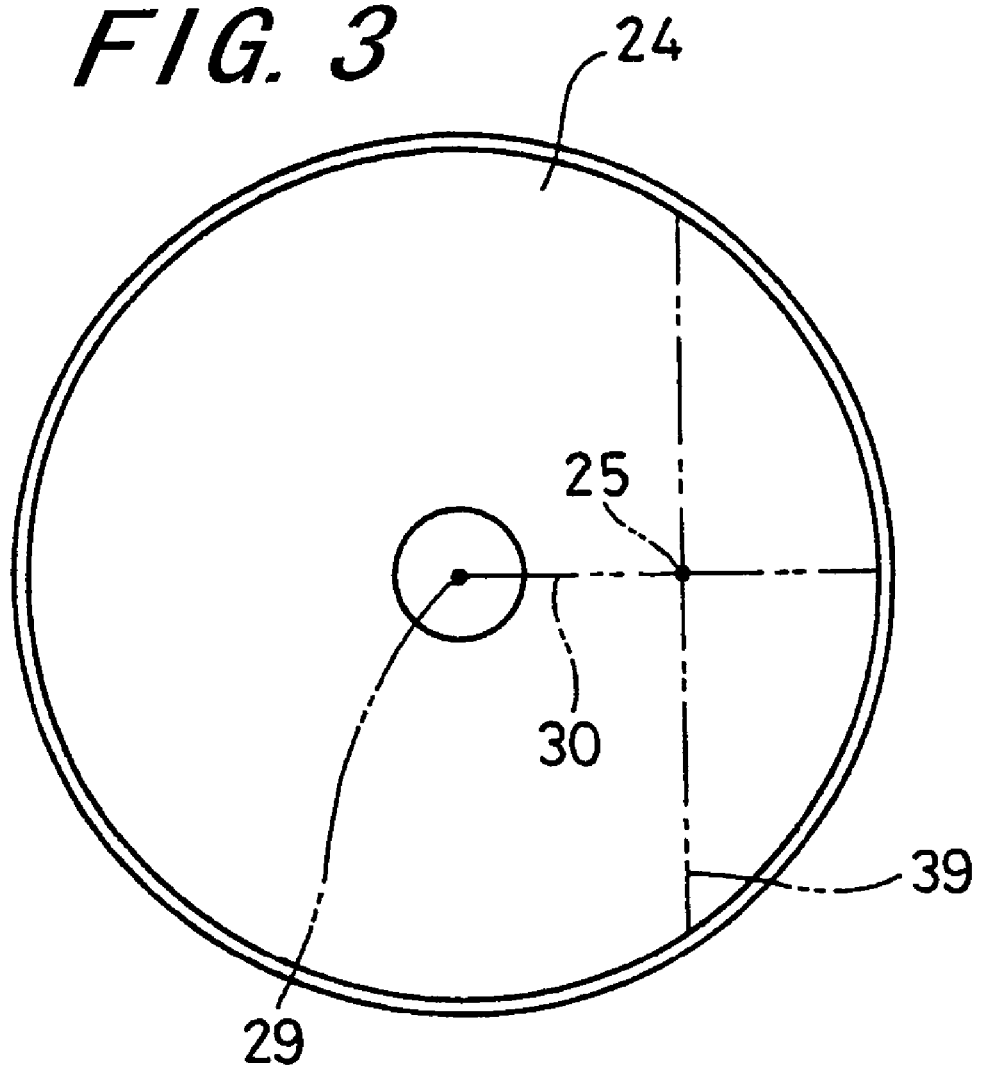

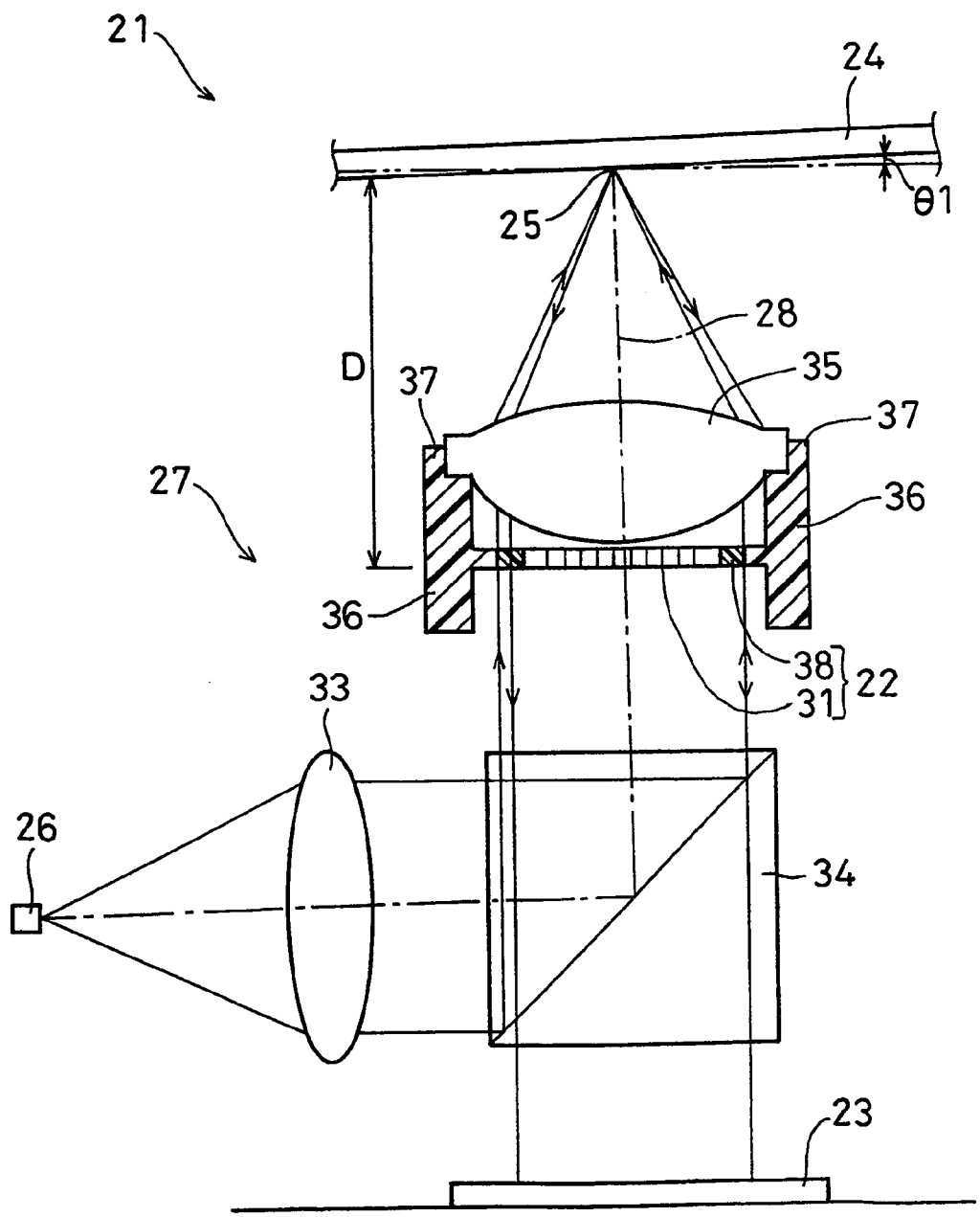

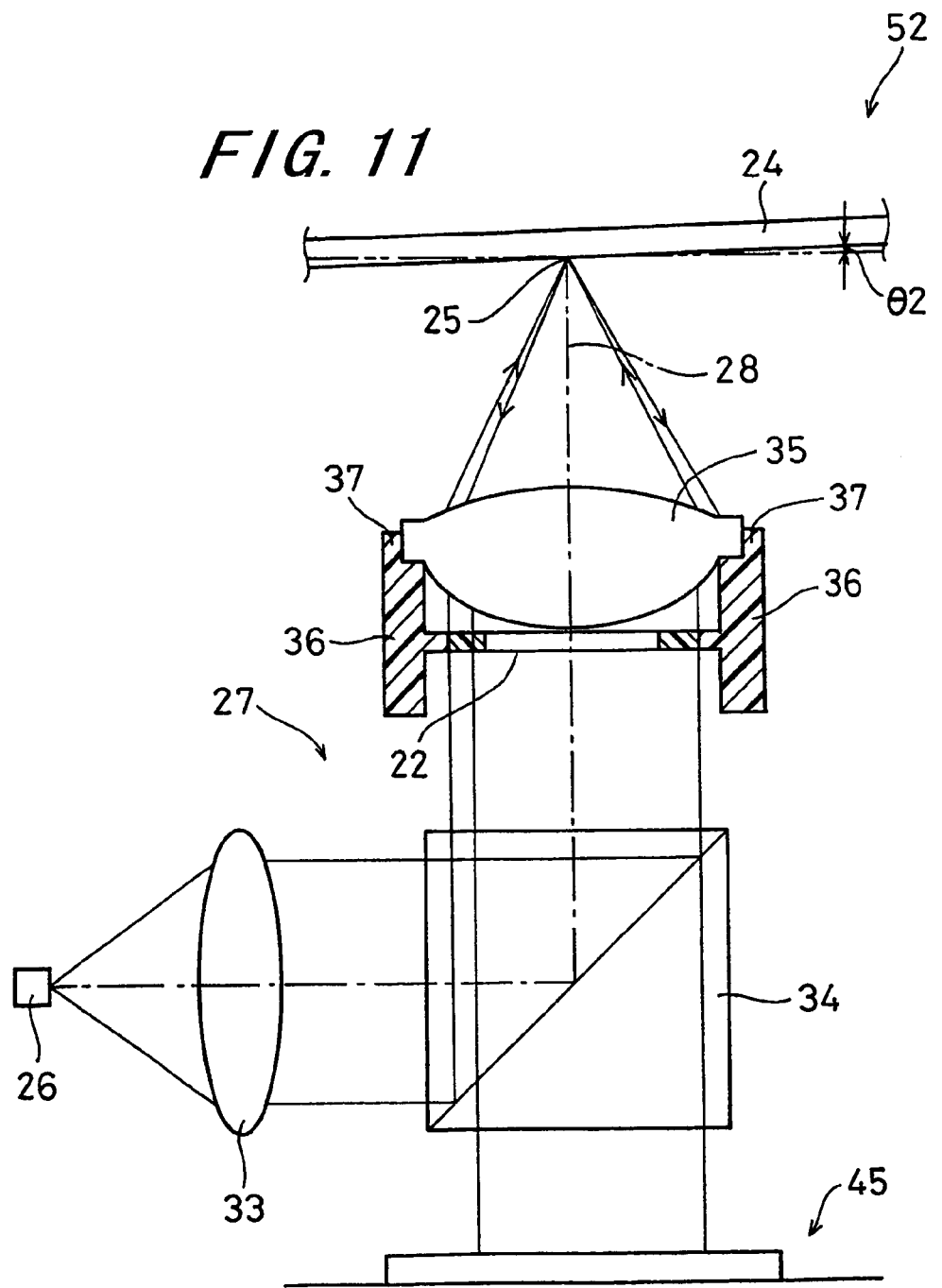

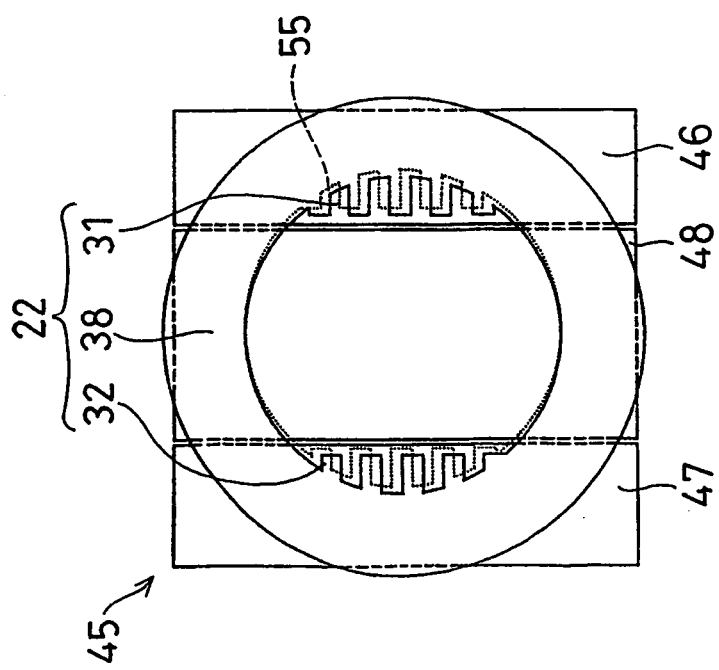
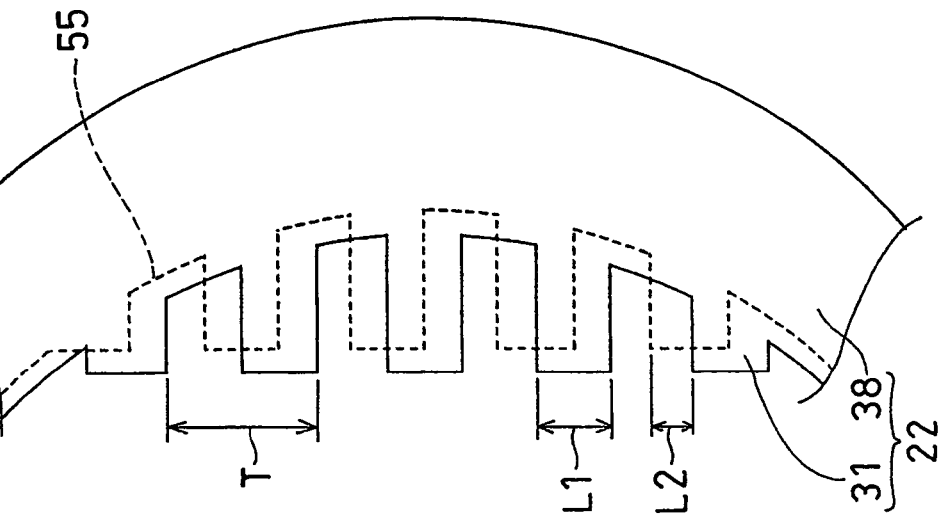
FIG. 12A
FIG. 12B 47  48  53  46

47  48  46

APPARATUS FOR DETECTING THE TILT OF A LIGHT REFLECTOR RELATIVE TO THE OPTICAL AXIS OF INPUT LIGHT

TECHNICAL FIELD

The present invention relates to a tilt sensing apparatus for detecting a shift from the state that a light reflector reflecting an output light from a light source is orthogonal to the optical axis of the output light.

BACKGROUND ART

To record or reproduce information on an optical recording medium, light to be used is condensed by an objective lens and the very small light spot condensed has to be formed on the information recording surface of the optical recording medium. In recent years, with the progress of the realization of a large recording capacity in the optical recording medium, it is desired to form further smaller light spots. The light spot diameter is determined by a wavelength $\lambda$ to be used and the numerical aperture NA of an objective lens, and it is proportional to wavelength/numerical aperture ($\lambda$/NA). Thus, an attempt has been proceeding in which the numerical aperture of the objective lens is increased, whereby the light spot diameter is reduced.

The coma aberration which is generated in the light having transmitted through the objective lens due to the tilt of the optical recording medium is increased in proportion to the third power of the numerical aperture. With the increase in the numerical aperture of the objective lens in this manner, the coma aberration generated due to the tilt of the optical recording medium is grown, thus causing a problem that good reproducibility cannot be obtained. Accordingly, to keep the optical recording medium and the optical axis of the light being condensed in the orthogonal state and to prevent the coma aberration from being generated, the amount of tilt in the optical recording medium needs to be firstly detected.

An example of the related art of detecting the amount of tilt in the optical recording medium is described as follows (see a patent literature 1). FIG. 40 is a partial cross section illustrating the simplified configuration of a traditional tilt sensing apparatus 1. FIG. 41 is a plan view illustrating the simplified configuration of a light sensing unit 2 provided in the traditional tilt sensing apparatus 1. In the traditional tilt sensing apparatus 1, a flat glass 4 is mounted on a lens holding member 5 that holds an objective lens 3. The light sensing unit 2 and a light shield 7 are fixed at positions of axial symmetry about the axis of the objective lens 3 on the objective lens 3 or flat glass 4. A light 8 emitted from a light source toward an optical recording medium 6 is partially shielded by the light shield 7, incident on the objective lens 3, and condensed onto the optical recording medium 6 by the objective lens 3. The light 8 emitted from the light source including a light shielded portion 9 is reflected at the position of axial symmetry by the optical recording medium 6. As shown in FIG. 41, the light sensing unit 2 is formed of four light receiving elements 10, 11, 12 and 13. When the optical recording medium 6 is not tilting, that is, it is orthogonal to an optical axis 14 coaxial to the axis of the objective lens 3, the position where the light shielded portion 9 of the light 8 emitted from the light source is reflected is matched with the position of the light sensing unit 2. Therefore, suppose detection signals detected by discrete light receiving elements 10 to 13 are expressed by detection signals a, b, c and d, respectively, and the difference between the detection signal a and the detection signal c, and the difference between the detection signal b and the detection signal d are zero.

FIG. 42 is a partial cross section simplifiedly illustrating the state that the optical recording medium 6 is tilting in the traditional tilt sensing apparatus 1. FIG. 43 is a plan view illustrating the position where the light shielded portion 9 reaches on the light sensing unit 2 in the state shown in FIG. 42.

As shown in FIG. 42, when the optical recording medium 6 is tilting in the counterclockwise direction on the paper of FIG. 42 in the tilt sensing apparatus 1, the light reflected by the optical recording medium 6 takes the optical path shifted in the right direction on the paper of FIG. 42. On this account, the light shielded portion 9 is reflected by the optical recording medium 6 and reaches at the position shifted in the right direction on the paper of FIG. 43 on the light sensing unit 2. Thus, the difference between the detection signal b and the detection signal d is positive. Inversely, when the optical recording medium 6 is tilting in the clockwise direction on the paper of the FIG. 42, the reflected light from the optical recording medium 6 takes the optical path shifted in the left direction on the paper of the FIG. 43 and the light shielded portion 9 reaches at the position shifted in the left direction on the light sensing unit 2. Thus, the difference between the detection signal b and the detection signal d is negative. Accordingly, from the results of operating the detection signals obtained by receiving light in the discrete light receiving elements 10 to 13, the amount of tilt in the optical recording medium 6 can be detected.

[Patent literature 1]

Japanese Unexamined Patent Publication JP-A 8-235624 (1996) (Pages 3–4, FIG. 2)

The traditional tilt sensing apparatus 1 of the related art has the following problems. In the tilt sensing apparatus 1, the light shield 7 and the light sensing unit 2 have to be disposed integrally in the objective lens 3 or lens holding member 5. Tracking control in recording or reproducing the optical recording medium 6 is performed by drive of an objective lens actuator mounted with the lens holding member 5. Accordingly, when the light sensing unit 2 is not disposed integrally in the objective lens 3 or lens holding member 5 as described above, the light shield 7 is moved with the tracking control, thereby causing the phenomenon that the light shielded portion 9 is shifted on the light sensing unit 2, despite the axis of the objective lens 3 being orthogonal to the optical recording medium 6. To prevent this phenomenon, the light shield 7 and the light sensing unit 2 have to be integrally combined with the objective lens 3 or lens holding member 5.

However, when the light sensing unit 2 and the light shield 7 are integrally mounted on the objective lens 3 or flat glass 4 held by the lens holding member 5, the light sensing unit 2 has to be routed through the objective lens actuator, thus causing a problem that the fabrication processes are complicated. In addition, a light sensing unit for detecting detection signals of information provided in the optical recording medium 6 and tracking error signals cannot be combined with the light sensing unit 2 into one, thus causing a problem that the parts count is increased and costs are raised. Furthermore, a plurality of light sensing units is disposed, thus causing a problem that the arrangement of optical systems is complicated.

DISCLOSURE OF THE INVENTION

The object of the invention is to provide a tilt sensing apparatus with a simple configuration capable of accurately detecting an amount of tilt in a light reflector to the optical axis of an output light.

The invention provides a tilt sensing apparatus comprising:

a light source for emitting light;

a light reflector for reflecting the light emitted from the light source;

an irradiating unit disposed between the light source and the light reflector for forming the light emitted from the light source into parallel light and irradiating the parallel light onto the light reflector;

an optical device disposed in the irradiating unit for varying a light quantity of the light emitted from the light source and/or the reflected light reflected from the light reflector; and a light sensing unit for sensing the reflected light reflected from the light reflector and varied in light quantity by the optical device, wherein an amount of tilt in the light reflector is detected.

According to the invention, the light emitted from the light source is formed into parallel light by the irradiating unit and is irradiated onto the light reflector. The light transmitted through the optical device disposed in the irradiating unit is reduced in light quantity and is irradiated onto the light reflector. The reflected light reflected by the light reflector again transmits through the optical device and is received on the light sensing unit. When the light reflector is orthogonal to the optical axis and it is not tilting (hereafter, this state is referred to as untilting), the incident position of the reflected light on the optical device is the same as the output light. Further variations in light quantity are not generated by transmitting the optical device. When the light reflector is in the state not orthogonal to the optical axis and it is tilting (hereafter, this state is referred to as tilting), the position where the reflected light reflected from the light reflector enters the optical device is moved, and thus the light quantity is varied by transmitting the optical device. In this manner, the light quantity to be received on the light sensing unit is varied corresponding to the amount of tilt in the light reflector, and thus the accurate amount of tilt in the light reflector can be detected.

In addition, the invention provides a tilt sensing apparatus comprising:

a light source for emitting light;

a disk-shaped light reflector for reflecting the light emitted from the light source;

a condensing unit disposed between the light source and the light reflector for condensing the light emitted from the light source onto-the light reflector;

an optical device disposed in the condensing unit for varying the light quantity of the output light emitted from the light source and the reflected light reflected from the light reflector, the optical device having an optical device body, and first and second optical device strips formed on the optical device body so as to have a predetermined shift from positions of axial symmetry about an optical axis in the direction of a straight line of connecting an axis of the light reflector to the condensed position where the light emitted from the light source is condensed onto the light reflector by the condensing unit; and a light sensing unit for sensing the reflected light reflected from the light reflector and varied in light quantity by the optical device, wherein an amount of tilt in the light reflector is detected.

According to the invention, the light emitted from the light source is condensed onto the disk-shaped light reflector by the condensing unit. The light transmitted through the optical device disposed in the condensing unit is reduced in light quantity by the first and second optical device strips formed on the optical device body so as to have the predetermined shift from at the positions of axial symmetry about the optical axis the positions of axial symmetry about the optical axis in the direction of the straight line of connecting the axis of the light reflector to the condensed position where the light emitted from the light source is condensed onto the light reflector by the condensing unit. When the light reflector is untilting, the reflected light reflected by the light reflector in axial symmetry again transmits through the optical device and is reduced in light quantity. Additionally, when the light reflector is tilting, the position where the reflected light from the light reflector reaches on the optical device is moved as compared with the case of the light reflector untilting, and thus the light quantity reduced by the first and second light receiving element strips is varied corresponding to the amount of tilt. In this manner, the light quantity varied corresponding to the amount of tilt in the light reflector is sensed on the light sensing unit, whereby the amount of tilt in the light reflector can be detected accurately.

In the invention, it is preferable that the first and second optical device strips have an approximately rectangular cross section orthogonal to the optical axis, the optical device strips are formed in plurals as extending from the optical device body at a predetermined array pitch T in a direction of a straight line of connecting the axis of the light reflector to the condensed position where the light emitted from the light source is condensed onto the light reflector by the condensing unit.

According to the invention, the first and second optical device strips have an approximately rectangular cross section orthogonal to the optical axis. Thus, the modulation factor of the light quantity is increased to the amount of tilt in the light reflector and detection accuracy is improved. Additionally, the first and second optical device strips are arranged at regular intervals, whereby the light quantity is varied linearly corresponding to the amount of tilt in the light reflector. Thus, the amount of tilt in the light reflector can be detected accurately and easily.

In the invention, it is preferable that the first and second optical device strips have a length which is a half of the array pitch T in the direction of the straight line of connecting the axis of the light reflector to the condensed position where the light emitted from the light source is condensed onto the light reflector by the condensing unit, and the shift is a quarter of the array pitch T.

According to the invention, the optical device is configured in which the first and second optical device strips are shifted by a quarter of the array pitch T, the first and second optical device strips have the length which is a half of the array pitch T in the direction of the straight line of connecting the axis of the light reflector to the condensed position where the light emitted from the light source is condensed onto the light reflector by the condensing unit. Therefore, the light quantity takes the maximum value when the position where the reflected light from the light reflector enters the optical device is shifted by a quarter toward one of the direction points of the straight line, whereas it takes the minimum value when shifted by a quarter toward the other of the direction points of the straight line. Accordingly, the amount of tilt can be detected accurately regardless of the direction of the light reflector tilting.

In the invention, it is preferable that the light sensing unit includes at least three light receiving elements having parting lines in a direction parallel to the straight line of connecting the axis of the light reflector to the condensed position where the light emitted from the light source is condensed onto the light reflector by the condensing unit and being arranged in the direction orthogonal to the straight line.

According to the invention, the light sensing unit includes at least three light receiving elements, which is configured of the light receiving element for receiving the light transmitted through the area containing the first optical device strips, the light receiving element for receiving the light transmitted through the area containing the second optical device strips, and the light receiving element for receiving the light transmitted through the remaining area containing the first and second optical device strips. The detection signals detected by the light receiving element for receiving the light transmitted through the area containing the first optical device strips and the light receiving element for receiving the light transmitted through the area containing the second optical device strips are divided by the detection signal detected by the light receiving element for receiving the light transmitted through the remaining area containing the first and second optical device strips. Then, the influence of variations in the light intensity caused by the light diffraction by the light reflector and variations in the reflectance is cancelled. Consequently, the accurate amount of tilt in the light reflector can be obtained regardless of the variations in the light intensity of the reflected light.

In the invention, it is preferable that the light sensing unit includes at least two light receiving elements having a parting line in a direction orthogonal to the straight line of connecting the axis of the light reflector to the condensed position where the light emitted from the light source is condensed onto the light reflector by the condensing unit and being arranged in the direction of the straight line.

In the invention, it is preferable that, in the light sensing unit, at least three rows are disposed in a direction orthogonal to the straight line of connecting the axis of the light reflector to the condensed position where the light emitted from the light source is condensed onto the light reflector by the condensing unit and at least two columns are disposed in a direction parallel to the straight line.

According to the invention, at least two light receiving elements are disposed in the direction of the lens moved with tracking control, and thus the direction of the objective lens moved can be detected based on the difference between the detection signals by the light receiving elements.

In the invention, it is preferable that the tilt sensing apparatus further comprises a diffraction grating disposed between the optical device and the light sensing unit, the diffraction grating having at least two parting lines parallel to a straight line of connecting the axis of the light reflector to the condensed position where the light emitted from the light source is condensed onto the light reflector by the condensing unit, and also having at least three diffraction regions arranged in a row in a direction orthogonal to the straight line.

According to the invention, the diffracted light of the light transmitted through the area containing the first optical device strips and the diffracted light of the light transmitted through the area containing the second optical device strips are received by the same light receiving element. This allows simplification of an arithmetic circuit, and reduction in the numbers of the light receiving elements. Thus, the simplified, scaled-down apparatus and the cost reduction can be realized.

The invention further provides a tilt sensing apparatus comprising:

a light source for emitting light; a disk-shaped light reflector for reflecting the light emitted from the light source;

a condensing unit disposed between the light source and the light reflector, for condensing the light emitted from the light source onto the light reflector;

an optical device disposed in the condensing unit, for varying a light quantity of the light emitted from the light source and the reflected light reflected from the light reflector, the optical device having at least four optical device strips formed from positions of axial symmetry about an optical axis so as to have a predetermined shift in a direction of a straight line of connecting an axis of the light reflector to the condensed position where the light emitted from the light source is condensed onto the light reflector by the condensing unit; and a light sensing unit for sensing the reflected light reflected from the light reflector and varied in light quantity by the optical device, wherein an amount of tilt in the light reflector is detected.

According to the invention, the light emitted from the light source is condensed onto the disk-shaped light reflector by the condensing unit. The light transmitted through the optical device disposed in the condensing unit is reduced in light quantity by at least four optical device strips formed at the positions of axial symmetry about the optical axis so as to have the predetermined shift in the direction of the straight line of connecting the axis of the light reflector to the condensed position where the light emitted from the light source is condensed onto the light reflector by the condensing unit. When the light reflector is tilting, the position where the reflected light from the light reflector reaches on the optical device is moved as compared with the case of the light reflector untilting. Thus, the light quantity to be reduced by at least four light receiving element strips is varied corresponding to the amount of tilt. In this manner, the light sensing unit senses the light quantity varied corresponding to the amount of tilt in the light reflector, whereby the amount of tilt in the light reflector can be detected.

In the invention, it is preferable that the optical device is provided with third, fourth, fifth and sixth optical device strips, wherein the optical device strips are formed at the positions of axial symmetry about the optical axis as the third optical device strips to the fifth optical device strips and the fourth optical device strips to the sixth optical device strips, so as to have a predetermined shift in the direction of the straight line of connecting the axis of the light reflector to the condensed position where the light emitted from the light source is condensed onto the light reflector by the condensing unit.

According to the invention, the optical device is provided with the third, fourth, fifth and sixth optical device strips. The optical device strips are formed at the positions of axial symmetry about the optical axis as the third optical device strips to the fifth optical device strips and the fourth optical device strips to the sixth optical device strips, and they have the predetermined shift in the direction of the straight line of connecting the axis of the light reflector to the condensed position where the light emitted from the light source is condensed onto the light reflector by the condensing unit. Therefore, the light quantity reduced by the third optical device strips and the fifth optical device strips is different from the light quantity reduced by the fourth optical device strips and the sixth optical device strips in the variations corresponding to the amount of tilt. Accordingly, the light quantity reduced by the third optical device strips and the fifth optical device strips and the light quantity reduced by the fourth optical device strips and the sixth optical device strips can detect the amount of tilt in the light reflector.

In the invention, it is preferable that the third, fourth, fifth and sixth optical device strips have an approximately rectangular cross section orthogonal to the optical axis and are formed in plurals as extending from the optical device main body at a predetermined array pitch T1 in the direction of the straight line of connecting the axis of the light reflector to the condensed position where the light emitted from the light source is condensed onto the light reflector by the condensing unit.

According to the invention, the third, fourth, fifth and sixth optical device strips have an approximately rectangular cross section orthogonal to the optical axis. Thus, the modulation factor of the light quantity to the amount of tilt in the light reflector is greater and the detection accuracy is enhanced. Besides, the third, fourth, fifth and sixth optical device strips are arranged at regular intervals, whereby the light quantities of the light transmitting through the area containing the third optical device strips and the light transmitting through the area containing the fifth optical device strips, the light quantity of the light transmitting through the area containing the fourth optical device strips, and the light quantity of the light transmitting through the area containing the sixth optical device strips are varied linearly and separately corresponding to the amount of tilt in the light reflector. Therefore, the amount of tilt in the light reflector can be detected accurately and easily.

In the invention, it is preferable that the third, fourth, fifth and sixth optical device strips have a length which is a half of the array pitch T1 in the direction of the straight line of connecting the axis of the light reflector to the condensed position where the light emitted from the light source is condensed onto the light reflector by the condensing unit, the third optical device strips and the fifth optical device strips have a shift which is a quarter of the array pitch T1 in one of the direction points of the straight line, and the fourth optical device strips and the sixth optical device strips have a shift which is a quarter of the array pitch T1 in the other of the direction points of the straight line.

According to the invention, the optical device is configured in which the third, fourth, fifth and sixth optical device strips have the length which is a half of the array pitch T1 in the direction of the straight line of connecting the axis of the light reflector to the condensed position where the light emitted from the light source is condensed onto the light reflector by the condensing unit, the third optical device strips and the fifth optical device strips are arranged to shift by a quarter of the array pitch T1 in one of the direction points of the straight line, and the fourth optical device strips and the sixth optical device strips are arranged to shift by a quarter of the array pitch T1 in the other of the direction points of the straight line. Therefore, the light quantities of the light transmitting through the area containing the third optical device strips and the light the transmitting through the area containing the fifth optical device strips take the maximum value when the position where the reflected light from the light reflector enters the optical device is shifted by a quarter in one of the direction points of the straight line whereas they take the minimum value when shifted by a quarter in the other of the direction points. Furthermore, the light quantities of the light transmitting through the area containing the fourth optical device strips and the light transmitting through the area containing the sixth optical device strips take the minimum value when the position where the reflected light from the light reflector enters the optical device is shifted by a quarter in one of the direction points of the straight line, whereas they take the maximum value when shifted by a quarter in the other of the direction points. Accordingly, the amount of tilt can be detected accurately regardless of the direction of the light reflector tilting.

In the invention, it is preferable that the third through sixth optical device strips are so formed as to be axisymmetrical about a straight line which passes through the center of the optical device and is perpendicular to the straight line of connecting the axis of the light reflector to the condensed position where the light emitted from the light source is condensed onto the light reflector by the condensing unit.

According to the invention, the third through sixth optical device strips are so formed as to be axisymmetrical about the straight line which passes through the center of the optical device and is perpendicular to the straight line of connecting the axis of the light reflector to the condensed position where the light emitted from the light source is condensed onto the light reflector by the condensing unit. Thus, the light quantities reduced by the third and fifth optical device strips are allowed to be equal to the light quantities reduced by the fourth and sixth optical device strips when the light reflector is untilting.

In the invention, it is preferable that the light sensing unit includes at least four light receiving elements arranged in a matrix shape as having parting lines in the direction parallel to the straight line of connecting the axis of the light reflector to the condensed position where the light emitted from the light source is condensed onto the light reflector by the condensing unit and in the direction orthogonal to the straight line, the four light receiving elements for receiving the lights transmitted through the areas containing the third, fourth, fifth and sixth optical device strips.

According to the invention, the light sensing unit is configured of the light receiving element for receiving the light transmitted through the area containing the third optical device strips, the light receiving element for receiving the light transmitted through the area containing the fourth optical device strips, the light receiving element for receiving the light transmitted through the area containing the fifth optical device strips, and the light receiving element for receiving the light transmitted through the area containing the sixth optical device strips. The amount of tilt can be detected accurately by the detection signal of the detection signal by the light receiving element for receiving the light transmitted through the third optical device strips added to the detection signal by the light receiving element for receiving the light transmitted through the fifth optical device strips and the detection signal of the detection signal by the light receiving element for receiving the light transmitted through the fourth light receiving element strips added to the detection signal by the light receiving element for receiving the light transmitted through the sixth optical device strips. In addition, at least two light receiving elements included in the light sensing unit are disposed in the direction of the lens moved with tracking control. Thus, the direction of the objective lens moved can be detected based on the difference in the detection signals of the respective light receiving elements.

In the invention, it is preferable that the light sensing unit includes at least three light receiving elements having parting lines in the direction parallel to the straight line of connecting the axis of the light reflector to the condensed position where the light emitted from the optical axis is condensed onto the light reflector by the condensing unit and being arranged in the direction orthogonal to the straight line, wherein among the three light receiving elements, one light receiving element is further split into at least two parts by a parting line orthogonal to the straight line so as to receive the lights transmitted through the areas containing the third and fourth optical device strips, and another light receiving element is further split into at least two parts by the parting line orthogonal to the straight line so as to receive the lights transmitted through the areas containing the fifth and sixth optical device strips.

According to the invention, the amount of tilt in the light reflector can be detected by the detection signal of the detection signal by the light receiving element for receiving the light transmitted through the area containing the third light receiving element strips added to the detection signal by the light receiving element for receiving the light transmitted through the area containing the fifth light receiving element strips and the detection signal of the detection signal by the light receiving element for receiving the light transmitted through the area containing the fourth light receiving element strips added to the detection signal by the light receiving element for receiving the light transmitted through the area containing the sixth optical device strips. Moreover, the detection signals by the respective light receiving elements for receiving the light transmitted through the area containing the third light receiving element strips, the light transmitted through the area containing the fourth light receiving element strips, the light transmitted through the area containing the fifth light receiving element strips, and the light transmitted through the area containing the sixth optical device strips are divided by the detection signal by the light receiving element for receiving the light transmitted through the remaining area containing the third, fourth, fifth and sixth light receiving element strips, and the influence of the variations in the light intensity caused by the light diffraction by the light reflector and variations in the reflectance. Therefore, the accurate amount of tilt in the light reflector can be obtained regardless of the variations in the light intensity of the reflected light. Besides, at least two light receiving elements included in the light sensing unit are arranged in the direction of the lens moved with tracking control. Thus, the direction of the objective lens moved can be detected based on the difference in the detection signals by the respective light receiving elements.

In the invention, it is preferable that the tilt sensing apparatus further comprises a diffraction grating disposed between the optical device and the light sensing unit, the diffraction grating having partition lines in the direction parallel to the straight line of connecting the axis of the light reflector to the condensed position where the light emitted from the light source is condensed onto the light reflector by the condensing unit and in the direction orthogonal to the straight line, and also having at least four diffraction regions arranged in a matrix shape.

According to the invention, for example, the light transmitted through the area containing the third light receiving element strips and the light transmitted through the area containing the fifth light receiving element strips are received by the same light receiving element, and the light transmitted through the area containing the fourth light receiving element strips and the light transmitted through the area containing the sixth light receiving element strips are received by the same light receiving element. Therefore, an arithmetic circuit for determining the sum signal does not need to be disposed. This allows simplification of an arithmetic circuit and reduction in the numbers of the light receiving elements. Thus, the simplified, scaled-down apparatus and the cost reduction can be realized.

In the invention, it is preferable that the tilt sensing apparatus further comprises a diffraction grating disposed between the optical device and the light sensing unit, the diffraction grating having a parting line parallel to the straight line of connecting the axis of the light reflector to the condensed position where the light emitted from the light source is condensed onto the light reflector by the condensing unit, and also having at least three diffraction regions arranged in a column in the direction perpendicular to the straight line, in which among the three diffraction regions, one diffraction region has a parting line perpendicular to the straight line and has at least two small diffraction regions disposed adjacently in the direction parallel to the straight line, so that the lights transmitted through the areas containing the third and fourth optical device strips enter, and another diffraction region includes a diffraction grating having a parting line perpendicular to the straight line and having at least two small diffraction regions disposed adjacently in the direction parallel to the straight line, so that the lights transmitted through the areas containing the fifth and sixth optical device strips enter.

According to the invention, for example, the light transmitted through the area containing the third light receiving element strips and the light transmitted through the area containing the fifth light receiving element strips are received by the same light receiving element. The light transmitted through the area containing the fourth light receiving element strips and the light transmitted through the area containing sixth light receiving element strips are received by the same light receiving element. Therefore, an arithmetic circuit for calculating the sum signal does not need to be disposed, and the numbers of the light receiving elements can be reduced. Thus, the simplified, scaled-down apparatus and the cost reduction can be realized.

In the invention, it is preferable that the light reflector is an optical recording medium having a land and a groove, and the apparatus is further provided with:

a determining unit for determining whether the condensed position where the light emitted from the light source is condensed onto the optical recording medium by the condensing unit is located on the land or groove, and a switching unit for switching signal processing methods for detecting the amount of tilt responding to the determined result by the determining unit.

According to the invention, the determining unit determines whether the condensed position where the light emitted from the light source is condensed onto the optical recording medium by the condensing unit is located on the land or groove, and the switching unit switches the signal processing methods for detecting the amount of tilt responding to the determined result. Therefore, even when the light is condensed onto either the land or groove, the accurate amount of tilt can be detected with no influence of the variations in light quantity of the reflected light because of the difference between the diffraction pattern of the land and the diffraction pattern of the groove.

In the invention, it is preferable that the condensing unit includes an objective lens and a lens holding member for holding the objective lens, wherein the optical device is mounted on the lens holding member so as to have an axis on the elongation of the axis of the objective lens.

According to the invention, the objective lens and the optical device are disposed integrally. Thus, the position adjustment and mounting of the optical device to the objective lens is easy and the time and operating procedures for adjusting the optical device can be reduced.

In the invention, it is preferable that an opening is formed in the optical device which opening is shaped so as to have a length in the direction orthogonal to the straight line of connecting the axis of the light reflector to the condensed position where the light emitted from the optical axis is condensed onto the light reflector by the condensing unit longer than a length in the direction parallel to the straight line.

According to the invention, in the optical device, exclusive of the optical device strip, the length along the straight line of connecting the axis of the light reflector to the condensed position where the light emitted from the optical axis is condensed onto the light reflector by the condensing unit is made longer than the length in the direction perpendicular to the straight line. Thus, the light spot diameter of the light condensed by the condensing unit is shielded by the optical device strip. This helps cancel out reduction in the numerical aperture (NA) in the direction perpendicular to the straight line. Consequently, an increase in the light spot diameter proportional to $\lambda/NA$ can be prevented.

In the invention, it is preferable that the optical device is formed of a light filter for attenuating the light intensity.

According to the invention, the light filter is used for the optical device. The light filter is available at low cost, thus contributing to the cost reduction.

BRIEF DESCRIPTION OF DRAWINGS

Other and further objects, features, and advantages of the invention will be more explicit from the following detailed description taken with reference to the drawings wherein:

FIG. 3 is a diagram illustrating a condensed position 25 on a light reflector 24 from above the light reflector 24 in plan;

FIG. 6 is a partial cross section simplifiedly illustrating the state in which the optical recording medium 24 is tilting at an angle of $\theta 1$ in the tilt sensing apparatus 21;

FIG. 11 is a partial cross section simplifiedly illustrating the state in which an optical recording medium 24 is tilting in the tangential direction at an angle of $\theta 2$ in a tilt sensing apparatus 52 of a third embodiment of the invention;

FIGS. 12A and 12B are plan views illustrating the state of the light transmitting through an optical device 22;

BEST MODE FOR CARRYING OUT THE INVENTION

Figure 1:
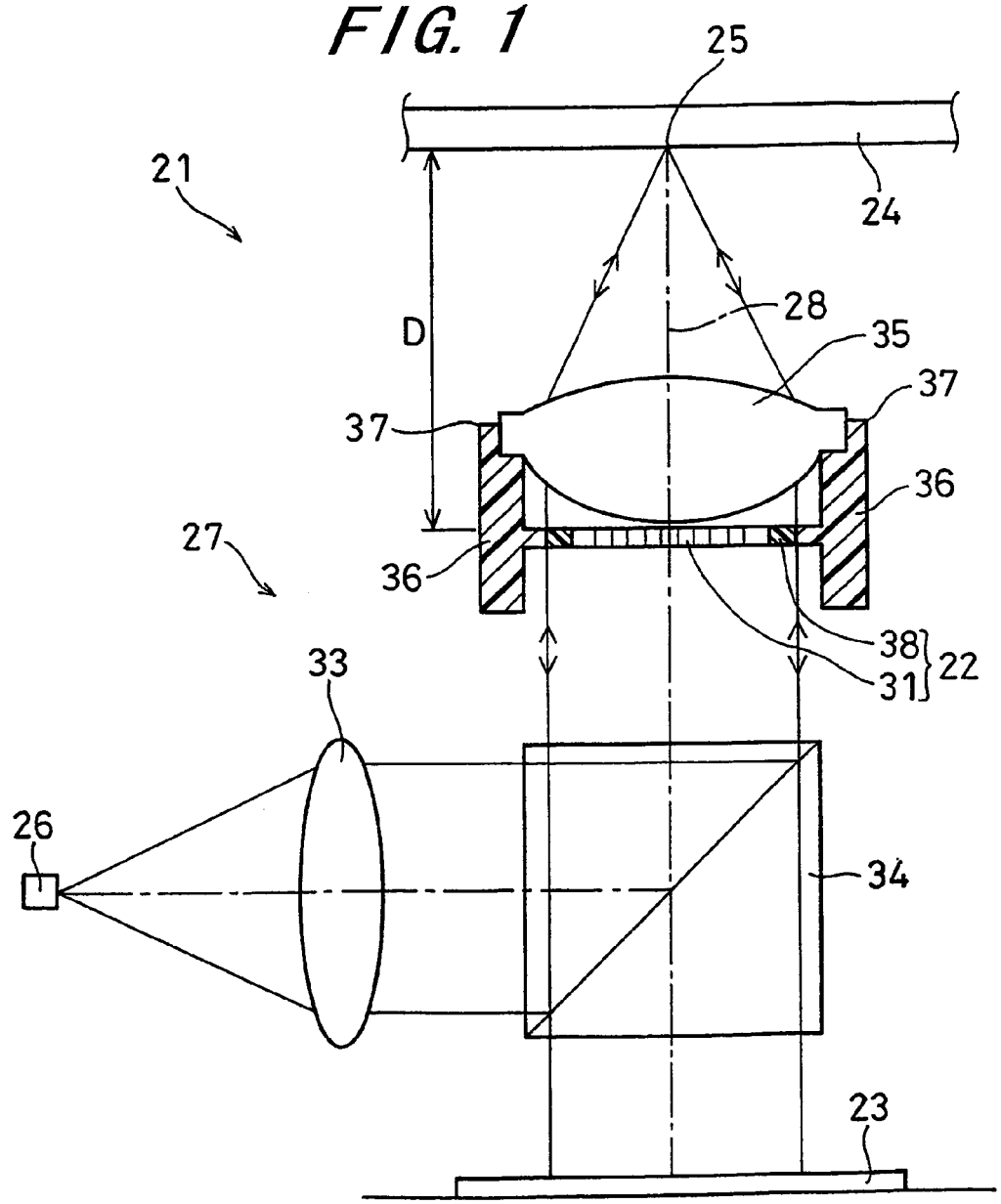
FIG. 1 is a partial cross section illustrating the simplified configuration of a tilt sensing apparatus 21 of a first embodiment of the invention.

Now referring to the drawings, preferred embodiments of the invention are described below.

Figure 2:
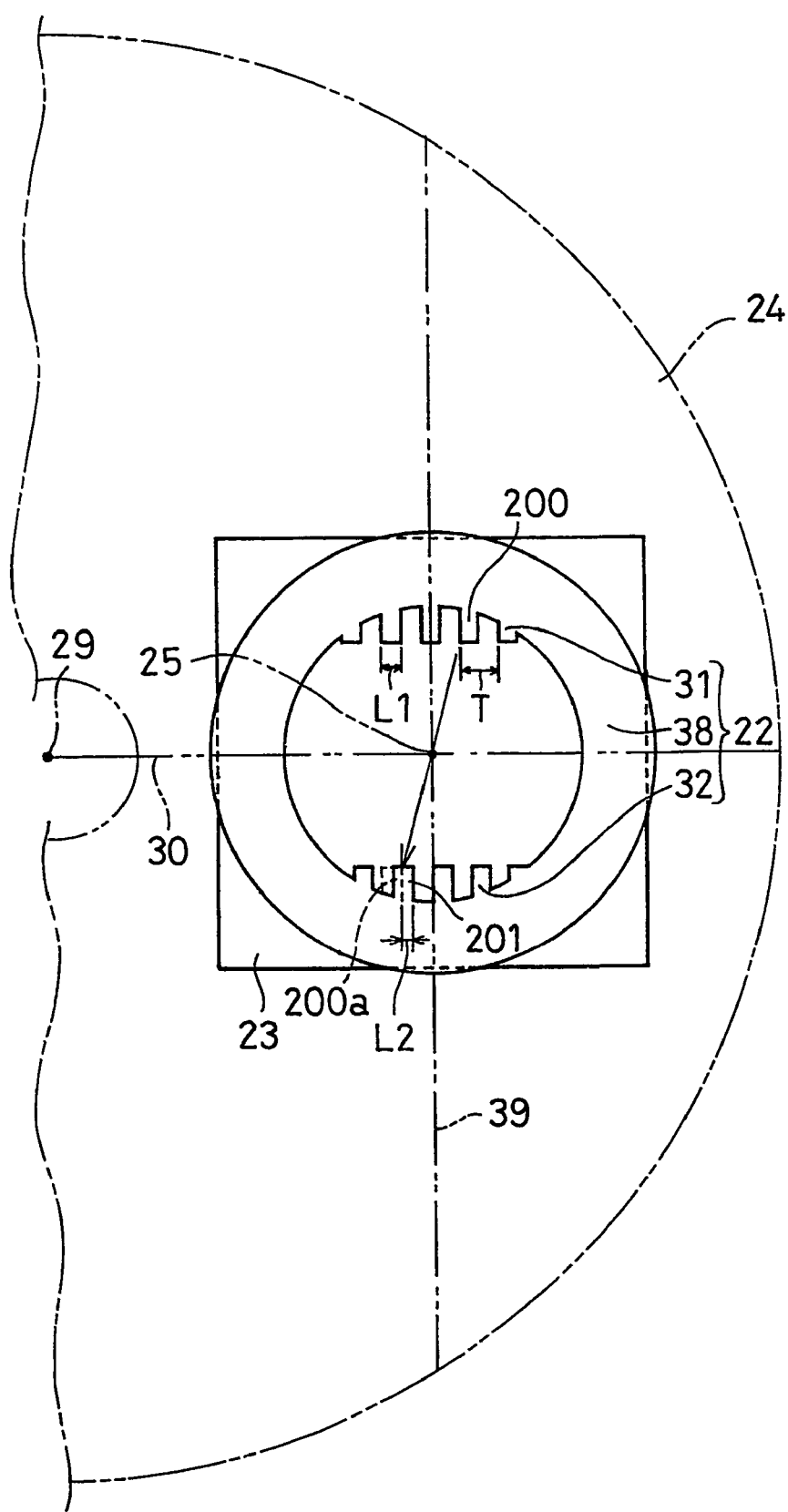
FIG. 2 is a plan view illustrating an optical device 22 and a light sensing unit 23 provided in the tilt sensing apparatus 21.

FIG. 1 is a partial cross section illustrating the simplified configuration of a tilt sensing apparatus 21 of a first embodiment of the invention. FIG. 2 is a plan view illustrating an optical device 22 and a light sensing unit 23 provided in the tilt sensing apparatus 21 shown in FIG. 1. FIG. 3 is a diagram illustrating a condensed position 25 onto a light reflector 24 from above the light reflector 24 in plan.

The tilt sensing apparatus 21 includes a light source 26 for emitting light; a disk-shaped light reflector 24 for reflecting the light emitted from the light source 26; a condensing unit 27 disposed between the light source 26 and the light reflector 24 for condensing the light emitted from the light source 26 onto the light reflector 24; an optical device 22 disposed in the condensing unit 27 for varying the light quantity of the output light emitted from the light source 26 and the reflected light reflected from the light reflector 24, the optical device 22 provided with first and second optical device strips 31 and 32 formed so as to have a predetermined shift from the positions of axial symmetry about an optical axis 28 in the direction of a straight line 30 of connecting an axis 29 of the light reflector 24 to a condensed position 25 where the light emitted from the light source 26 is condensed onto the light reflector 24 by the condensing unit 27; and a light sensing unit 23 for sensing the reflected light reflected from the light reflector 24 and varied in light quantity by the optical device 22.

The light source 26 is provided with a laser chip for emitting a wavelength of 780 nm, for example, to the light reflector 24.

The light reflector 24 is the optical recording medium 24, for example. The optical recording medium 24 has a thin, disk shape having a diameter of 8 to 12 cm, and it is formed in which aluminium is deposited on one surface of a polycarbonate substrate and a resin protection layer is deposited over the aluminium-deposited layer. For the optical recording medium 24, there are optical disks such as a compact disk and a digital versatile disk, which are random-accessible and easily handled, being widely used as recording media.

The condensing unit 27 includes a collimating lens 33, a beam splitter 34, an objective lens 35, the optical device 22, and a lens holding member 36. The collimating lens 33 forms the light emitted from the light source 26 into parallel light. The beam splitter 34 reflects the light emitted from the light source 26 and it transmits the reflected light from the optical recording medium 24. The objective lens 35 condenses the light emitted from the light source 26 onto the information recording surface on the optical recording medium 24 to form a light spot on the information recording surface. The lens holding member 36 is a synthetic resin member having a cylindrical shape, which holds the objective lens 35 on one end part 37 and is mounted with the optical device 22 so as to have the axis near the light source 26 of the objective lens 35 on the elongation of the axis of the objective lens 35. In this manner, since the objective lens 35 and the optical device 22 are disposed integrally, the position adjustment of the optical device 22 to the objective lens 35 is easy and the time and operating procedures for adjusting the position of the optical device 22 can be reduced. In addition, the lens holding member 36 is supported by an objective lens actuator, not shown in the drawing, provided in the tilt sensing apparatus 21.

The optical device 22 includes an optical device main body 38 and the first and second optical device strips 31 and 32, which is made of a light shielding material such as a synthetic resin thin plate and varies the light quantity of the transmitting light by the first and second optical device strips 31 and 32. The first and second optical device strips 31 and 32 have an approximately rectangular cross section orthogonal to the optical axis 28, which are formed in plurals as extending from the optical device main body 38 at a predetermined array pitch T in the direction of the straight line 30 of connecting the axis 29 of the optical recording medium 24 to the condensed position 25 where the light emitted from the light source 26 is condensed onto the optical recording medium 24 by the condensing unit 27 shown in FIG. 3. Furthermore, the first and second optical device strips 31 and 32 have a length L1 which is a half of the array pitch T in the direction of the straight line 30 of connecting the axis 29 of the optical recording medium 24 to the condensed position 25 where the light emitted from the light source 26 is condensed onto the optical recording medium 24 by the condensing unit 27.

Here, a single first optical device strip 200 is focused attention among the plurality of first optical device strips 31. The light transmitted through the optical device 22 and condensed onto the optical recording medium 24 by the objective lens 35 is reflected by the optical recording medium 24 toward the position of axial symmetry with respect to the incident position of the objective lens 35 and the optical axis 28. Therefore, the light transmitted through the single first optical device strip 200 is reflected by the optical recording medium 24 at a position 200a of axial symmetry about the optical axis 28. A single second optical device strip 201 among the plurality of second optical device strips 32 is formed to have a shift L2 being a quarter of the array pitch T from a position 200a of axial symmetry about the optical axis 28, the position 200a is the position where the light transmitted through the first optical device strip 200 is reflected. In this manner, the shift L2 is formed to be a quarter of the array pitch T, which the first optical device strips 31 and the second optical device strips 32 have in the direction of the straight line 30 of connecting the axis 29 of the optical recording medium 24 to the condensed position 25 where the light emitted from the light source 26 is condensed onto the optical recording medium 24 by the condensing unit 27.

The first and second optical device strips 31 and 32 are formed to have an approximately rectangular cross section orthogonal to the optical axis 28. Accordingly, the modulation factor of the light quantity to the amount of tilt in the optical recording medium 24 becomes greater, and thus the detection accuracy is improved. In addition, they are arranged at regular intervals, whereby the light quantity is varied linearly corresponding to the amount of tilt in the optical recording medium 24. Thus, the amount of tilt in the optical recording medium 24 can be detected accurately and easily.

The light sensing unit 23 is a light receiving element formed of a photodiode, which receives the reflected light from the optical recording medium 24, converts it into the current corresponding to the light quantity, and obtains the detection signal of the reflected light.

Here, the direction of the optical recording medium 24 tilting is defined as follows. The straight line 30 shown in FIG. 3 of connecting the axis 29 of the optical recording medium 24 to the condensed position 25 where the light emitted from the light source 26 is condensed onto the optical recording medium 24 by the condensing unit 27 and the elongation of the straight line 30 are called radial direction, and the amount of tilt in the radial direction is called radial tilt. The direction of a straight line 39 orthogonal to the straight line 30 and passing through the condensed position 25 is called tangential direction, and the amount of tilt in the tangential direction is called tangential tilt.

Hereafter, variations in light quantity will be described, which are generated by the light emitted from the light source 26 and the light reflected from the optical recording medium 24 transmitting through the optical device 22.

Figure 4A:
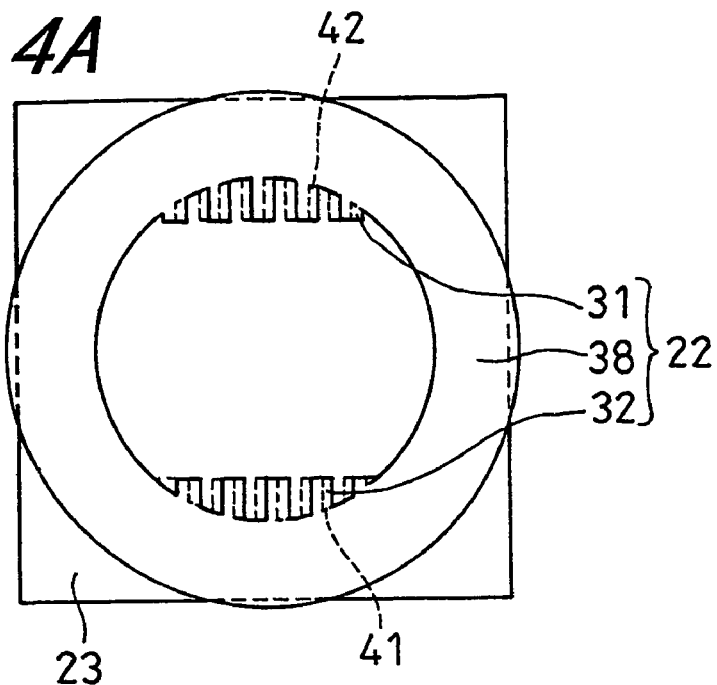
FIGS. 4A and 4B are plan views illustrating the state of the light transmitting through the optical device 22.
Figure 4B:
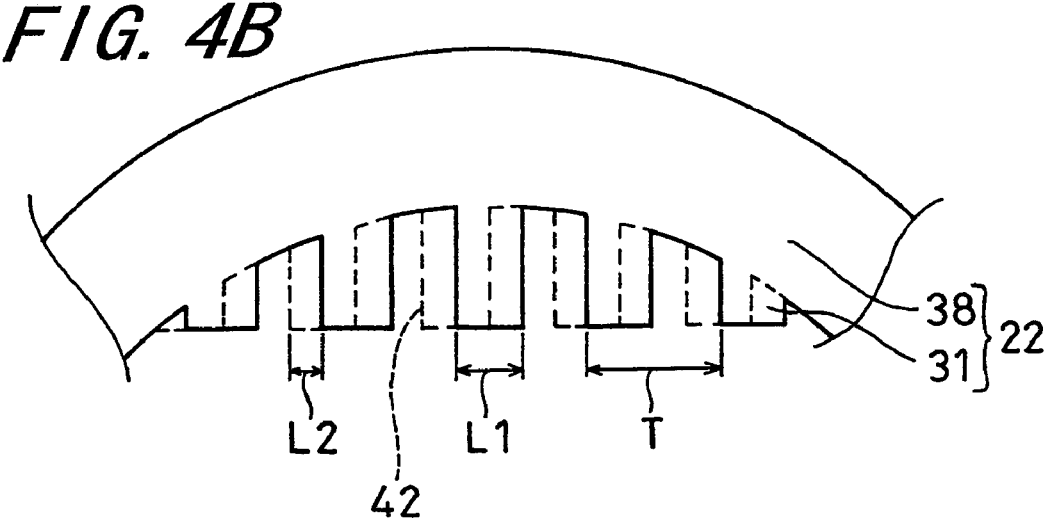
Figure 5:
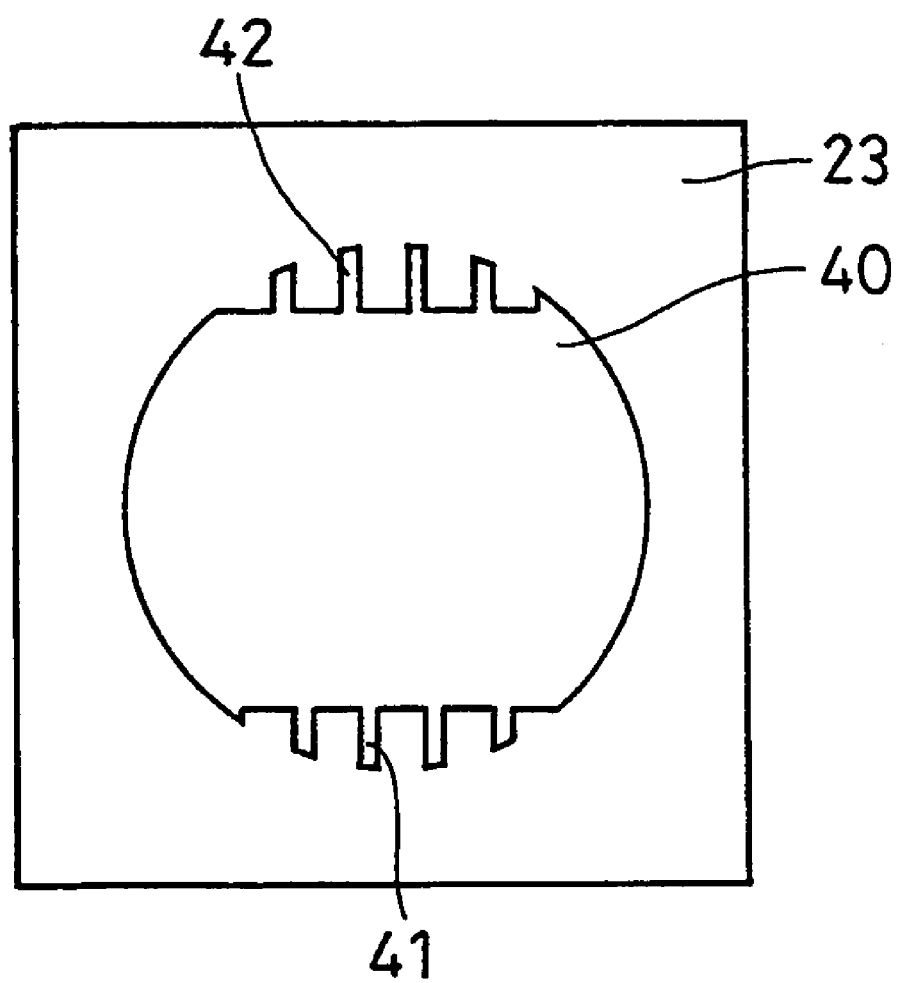
FIG. 5 is a plan view illustrating a reflected light 40 to be received on a light sensing unit 23.

FIGS. 4A and 4B are plan views illustrating the state of the light transmitting through the optical device 22. FIG. 5 is a plan view illustrating a reflected light 40 to be received on the light sensing unit 23. When the optical recording medium 24 is untilting, the light entered the optical device 22 is reduced in light quantity by the first and second optical device strips 31 and 32 provided in the optical device 22 for transmission, and it is condensed onto the optical recording medium 24 by the objective lens 35. The light reflected by the optical recording medium 24 toward the position of axial symmetry with respect to the incident position on the objective lens 35 and the optical axis 28 transmits through the objective lens 35, and it again passes through the optical device 22. The first optical device strips 31 and the second optical device strips 32 are formed to have the shift L2 (a quarter of the array pitch T as shown in FIG. 2) from the positions of axial symmetry about the optical axis 28. Thus, a light 41 passed through the first optical device strips 31 and further reflected by the optical recording medium 24 transmits through the position shifted only by the shift L2 to the second optical device strips 32. A light 42 passed through the second optical device strips 32 and further reflected by the optical recording medium 24 similarly transmits through the position shifted only by the shift L2 to the first optical device strips 31. In this manner, the light 41 transmitted through the first optical device strips 31 and the second optical device strips 32 and the light 42 transmitted through the second optical device strips 32 and the first optical device strips 31 are varied in light quantity by transmitting through the optical device strips twice. Accordingly, the reflected light 40 transmitted through the optical device 22 twice is received by the light sensing unit 23 as shown in FIG. 5 so as to contain the lights 41 and 42 reduced in light quantity by the first and second optical device strips 31 and 32.

Figure 7A:
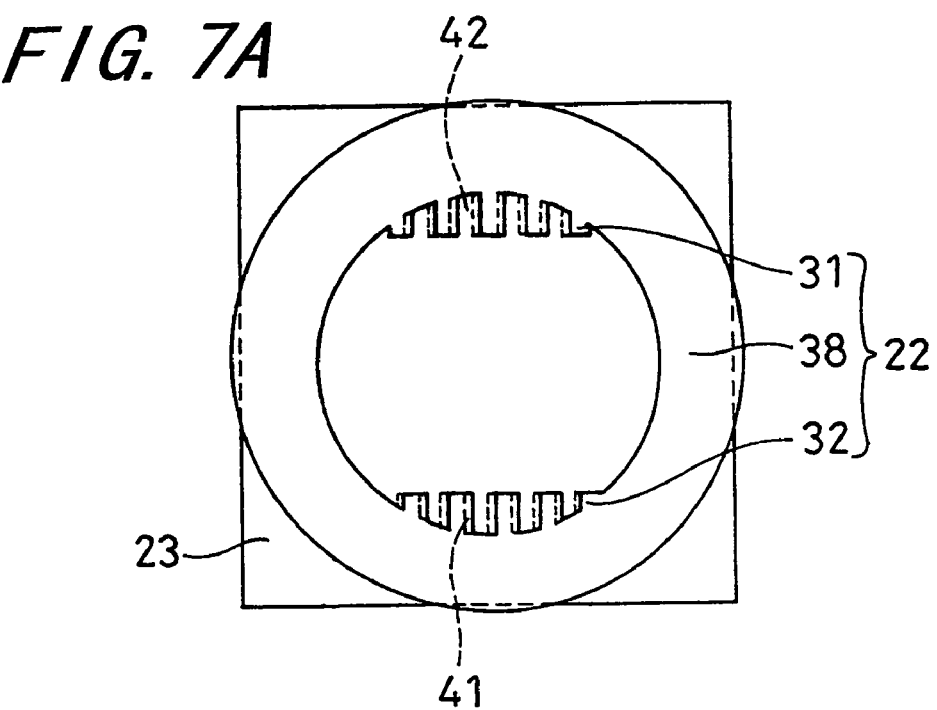
FIGS. 7A and 7B are plan views illustrating the state of the light transmitting through the optical device 22 in the tilt sensing apparatus 21.
Figure 7B:
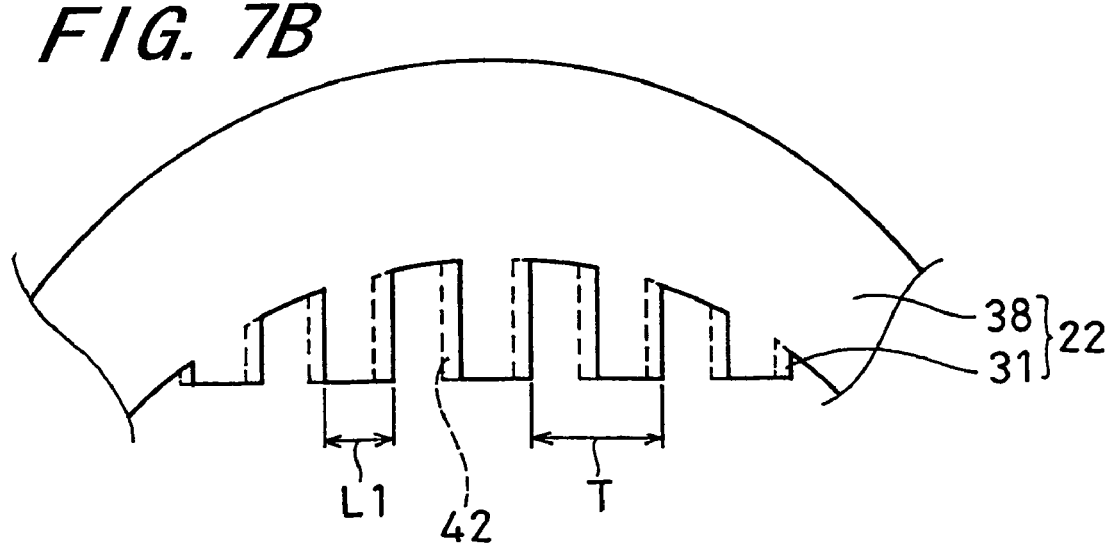
Figure 8:
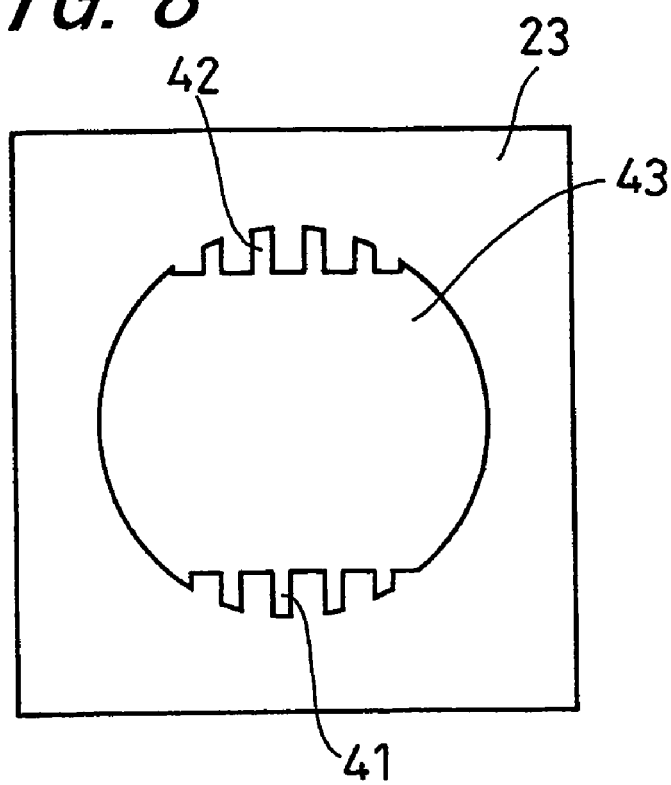
FIG. 8 is a plan view illustrating a reflected light 43 to be received by the light sensing unit 23.

Next, the case of the optical recording medium 24 tilting in the radial direction will be described. FIG. 6 is a schematic sectional view illustrating the state in which the optical recording medium 24 is tilting at an angle of $\theta 1$ in the tilt sensing apparatus 21. FIGS. 7A and 7B are plan views illustrating the state of the light transmitting through the optical device 22 in the tilt sensing apparatus 21 shown in FIG. 6. FIG. 8 is a plan view illustrating a reflected light 43 to be received by the light sensing unit 23.

As shown in FIG. 6, the optical recording medium 24 is tilting in the radial direction at an angle of $\theta 1$ counterclockwise on the paper of FIG. 6 (hereafter, it is referred to as tilting to the upper right for convenience). Thus, the optical path of the light condensed onto the optical recording medium 24 by the objective lens 35 and reflected from the optical recording medium 24 is shifted in the right direction on the paper of FIG. 6 as compared with the reflected light when untilting, and the position incident on the optical device 22 is also shifted in the right direction. This angle $\theta 1$ expresses the radial tilt described before. This reduces the area to block the light when the light emitted from the light source 26 and reflected by the optical recording medium 24 transmits though the first and second optical device strips 31 and 32. Therefore, the reflected light 43 having the light quantity greater than that of the reflected light 40 in the case of the optical recording medium 24 untitling is received by the light sensing unit 23. Reversely, when the optical recording medium 24 is tilting in the radial direction at an angle of $\theta 1$ clockwise on the paper of FIG. 6 (hereafter, it is referred to as tilting to the upper left for convenience), the reflected light from the optical recording medium 24 is shifted in the left direction on the paper of FIG. 6, and the position incident on the optical device 22 is also shifted in the left direction. This increases the area to block the light when the light emitted from the light source 26 and reflected by the optical recording medium 24 transmits through the first and second optical device strips 31 and 32. Therefore, the reflected light having the light quantity smaller than that of the reflected light 40 in the case of the optical recording medium 24 untilting is received by the light sensing unit 23.

As described above, the light quantity to be received by the light sensing unit 23 is varied corresponding to the tilt in the optical recording medium 24. Thus, the tilt sensing signal Pg expressing the radial tilt can be expressed by $Pg=P-P_0$, where the detection signal for the reflected light detected by the light sensing unit 23 is P when the optical recording medium 24 is tilting, and the detection signal for the reflected light detected by the light sensing unit 23 when untilting is $P_0$. The tilt sensing signal Pg in the radial direction is zero when untilting, it is positive when tilting to the upper right, and it is negative when tilting to the upper left. Accordingly, the radial tilt can be detected from the tilt sensing signal Pg.

Here, the detection range of the amount of tilt in the tilt sensing apparatus 21 will be described. Suppose the focal length of the objective lens is D (m), the amount of tilt in the optical recording medium 24 is $\theta$ (rad). The shift of the position where the reflected light reaches on the optical device 22 when the optical recording medium 24 is tilting to the position where the reflected light reaches on the optical device 22 when untilting is $2D\theta$. Since the array pitch of the first and second optical device strips 31 and 32 is T, the shift of the reflected light that the light quantity detected by the light sensing unit 23 shifts from the maximum value to the minimum value is T/2. Therefore, the tilt sensing range Δθ is expressed by Equation (1).

$$\Delta\theta = T/4D \quad (1)$$

The detection range of the amount of tilt can be determined by the Equation (1). The sift L2 of the first optical device strip 31 to the second optical device strip 32 is a quarter of the array pitch T. Thus, the light quantity received by the light sensing unit 23 takes the maximum value when the position where the reflected light from the optical recording medium 24 reaches on the first and second optical device strips 31 and 32 is shifted by a quarter from the positions of axial symmetry about the optical axis 28 in one of the direction points of the straight line 30 of connecting the axis 29 of the optical recording medium 24 to the condensed position 25 where the light emitted from the light source 26 is condensed onto the optical recording medium 24 by the condensing unit 27, whereas it takes the minimum value when shifted by a quarter in the other of the direction points. Accordingly, the tilt can be detected accurately regardless of the direction of the optical recording medium 24 tilting to the upper right or upper left.

Figure 9:
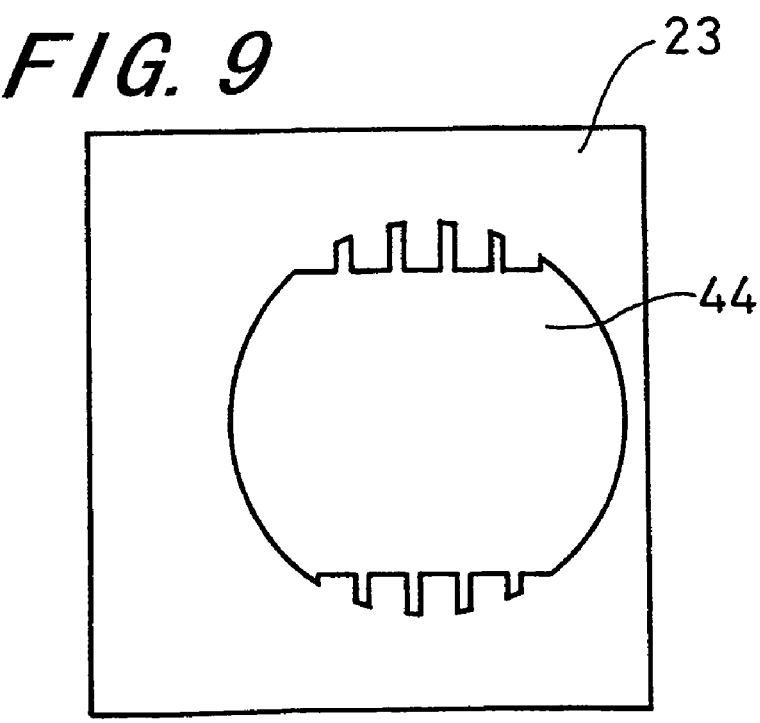
FIG. 9 is a plan view illustrating a reflected light 44 on the light sensing unit 23 when an objective lens 35 is moved by tracking control.

FIG. 9 is a plan view illustrating a reflected light 44 on the light sensing unit 23 when the objective lens 35 is moved by tracking control. In the tilt sensing apparatus 21, the objective lens actuator moves the lens holding member 36 for holding the objective lens 35 in the radial direction when tracking control is performed. When the lens holding member 36 is moved, the optical device 22 is also moved with it, but the light sensing unit 23 is not moved. Thus, the reflected light 44 on the light sensing unit 23 is moved corresponding to the direction of the objective lens 35 moved. As described above, since the optical device 22 and the objective lens 35 are moved integrally, the incident position of the reflected light on the optical device 22 is not moved and the light quantity of the reflected light is not varied regardless of the movement of the objective lens 35. Accordingly, even when the objective lens 35 has been moved by tracking control, the amount of tilt in the optical recording medium 24 can be detected.

Figure 10:
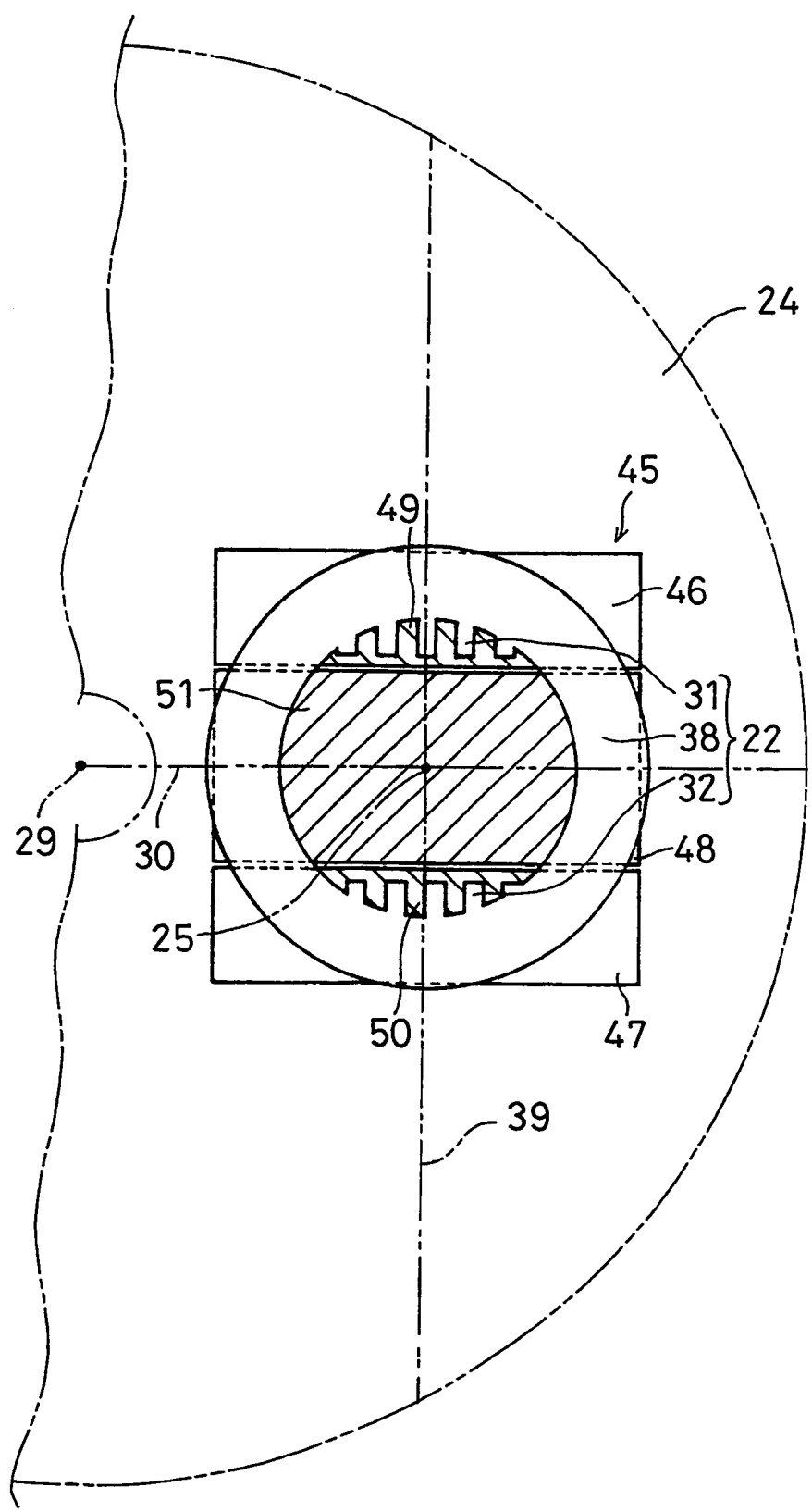
FIG. 10 is a plan view illustrating the simplified configuration of a light sensing unit 45 provided in a tilt sensing apparatus of a second embodiment of the invention.

FIG. 10 is a plan view illustrating the simplified configuration of a light sensing unit 45 provided in a tilt sensing apparatus of a second embodiment of the invention. The light sensing unit 45 of the embodiment is similar to the light sensing unit 23 provided in the tilt sensing apparatus 21 of the first embodiment, and the corresponding portions are designated the same reference numerals and signs, omitting the description. It should be noted that the light sensing unit 45 includes three light receiving elements, first, second and third light receiving elements 46, 47 and 48 that have parting lines in the direction parallel to a straight line 30 of connecting an axis 29 of a optical recording medium 24 to a condensed position 25 where the light emitted from a light source 26 is condensed onto the optical recording medium 24 by a condensing unit 27 and are arranged in the direction orthogonal to the straight line 30.

The first light receiving element 46 receives the light transmitted through an area 49 containing the first optical device strips 31. The second light receiving element 47 receives the light transmitted through an area 50 containing the second optical device strips 32. The third light receiving element 48 receives the light transmitted through a remaining area 51 containing the first optical device strips 31 and the second optical device strips 32.

In the light sensing unit 23 provided in the tilt sensing apparatus 21 of the first embodiment, all the light quantities of the reflected light received are used as the detection signals, and the difference between the detection signals when the optical recording medium 24 is tilting and when it is untilting is operated to determine the radial tilt in the optical recording medium 24. In this operating method, the detection signals are varied under the influence of the light diffracted by the optical recording medium 24, and thus the detection accuracy of the radial tilt is further improved by the following method with the use of the detection signals by the three light receiving elements 46, 47 and 48. In the light sensing unit 45, the first light receiving element 46 receives the light transmitted through the area 49 to detect the detection signal P1, and the second light receiving element 47 receives the light transmitted through the area 50 to detect the detection signal P2. The tilt sensing signal Pg1 can be determined by Equation (2) that subtracts the sum signal $(P_01+P_02)$ of the detection signals $P_01$ and $P_02$, which are received by the first and second light receiving elements 46 and 47 when untilting, from the sum signal (P1+P2) of the detection signals P1 and P2.

$$Pg1 = (P1+P2) - (P_01+P_02) \quad (2)$$

Accordingly, the influence of the diffracted light by the optical recording medium 24 can be reduced, which affects the operation of the radial tilt in the optical recording medium 24. In addition, the third light receiving element 48, not used for increasing detection accuracy, is split into plurals, and the detection signals detected by each of the light receiving elements can be used for detecting focus error signals or tracking error signals.

However, the method for detecting the tilt sensing signal Pg1 is affected by variations in the light intensity of the reflected light caused by output variations in the laser provided in the light source 26 and variations in the reflectance of the optical recording medium 24. The sum signal (P1+P2) is varied in accordance with the variations in the light intensity of the reflected light. Thus, the sum signal (P1+P2) is varied and the accurate radial tilt sometimes cannot be detected even though the radial tilt in the optical recording medium 24 is the same.

Then, the third light receiving element 48 receives the light transmitted through the area 51 to detect the detection signal P3, and the detection signal Pa that the influence of the variations in the light intensity is cancelled can be obtained by Equation (3) that divides the sum signal (P1+P2) by the detection signal P3.

$$Pa = (P1+P2)/P3 \quad (3)$$

Here, the sum signal (P1+P2) and the detection signal P3 have a proportional relationship to the light quantity, and thus the influence of the variations in the light intensity can be cancelled.

When the optical recording medium 24 is untilting, the detection signal $P_03$ of the light transmitted through the area 51, which is detected by the third light receiving element 48, is similarly used to cancel the influence of the variations in the light intensity and then the constant Pb can be obtained by Equation (4).

$$Pb = (P_01+P_02)/P_03 \quad (4)$$

The constant Pb is a value that the variations in the light intensity have been canceled, being a constant value when the optical recording medium 24 is untilting as described above. Therefore, it can be used as the reference value for detecting the radial tilt in the optical recording medium 24. From the detection signal Pa that the influence of the variations in the light intensity has been cancelled, the tilt sensing signal Pg2 can be determined quantitatively with no influence of the variations in the light intensity, the tilt sensing signal Pg2 is an index of the radial tilt in the optical recording medium 24 by Equation (5) that subtracts the constant Pb.

$$Pg2 = Pa - Pb = (P1+P2)/P3 - (P_o1+P_o2)/P_o3 \quad (5)$$

Furthermore, the tilt error signal Pe that detects only the tilt direction to the radial direction can be determined as follows. First, determined is the constant g that the sum signal ($P_o1+P_o2$) of the detection signal $P_o1$ by the first light receiving element 46 and the detection signal $P_o2$ by the second light receiving element 47 is equal to the detection signal $P_o3$ by the third light receiving element 48 when the optical recording medium 24 is untilting. The constant g can be obtained by Equation (6).

$$g = P_o3/(P_o1+P_o2) \quad (6)$$

Next, the tilt error signal Pe can be determined by Equation (7) that subtracts the detection signal P3 by the third light receiving element 48 from [g(P1+P2)] obtained by multiplying the sum signal (P1+P2) of the detection signals by the first and second light receiving elements 46 and 47 by the constant g when the optical recording medium 24 is tilting.

$$Pe = g(P1+P2) - P3 \quad (7)$$

Based on whether the tilt error signal Pe obtained by the Equation (7) is positive or negative, the direction of the optical recording medium 24 tilting can be determined.

In this manner, the influence of the variations in the light intensity due to the light diffraction and the variations in reflectance caused by the optical recording medium 24 can be cancelled based on the detection signals detected by each of the light receiving elements 46, 47 and 48. Thus, the accurate amount of tilt in the optical recording medium 24 can be obtained regardless of the variations in the light intensity of the reflected light.

Figure 13:
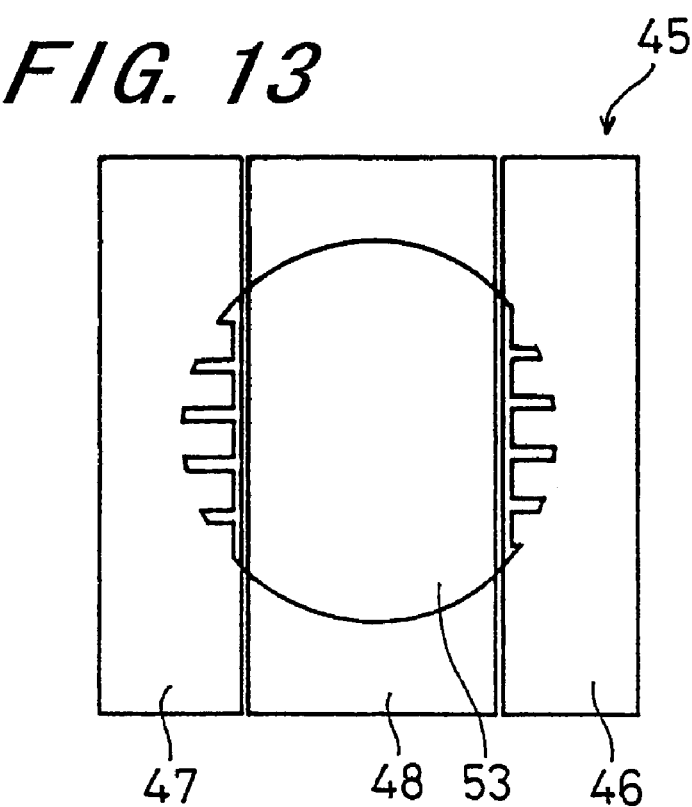
FIG. 13 is a plan view illustrating a reflected light 53 to be received by a light sensing unit 45 when the optical recording medium 24 is untilting.
Figure 14:
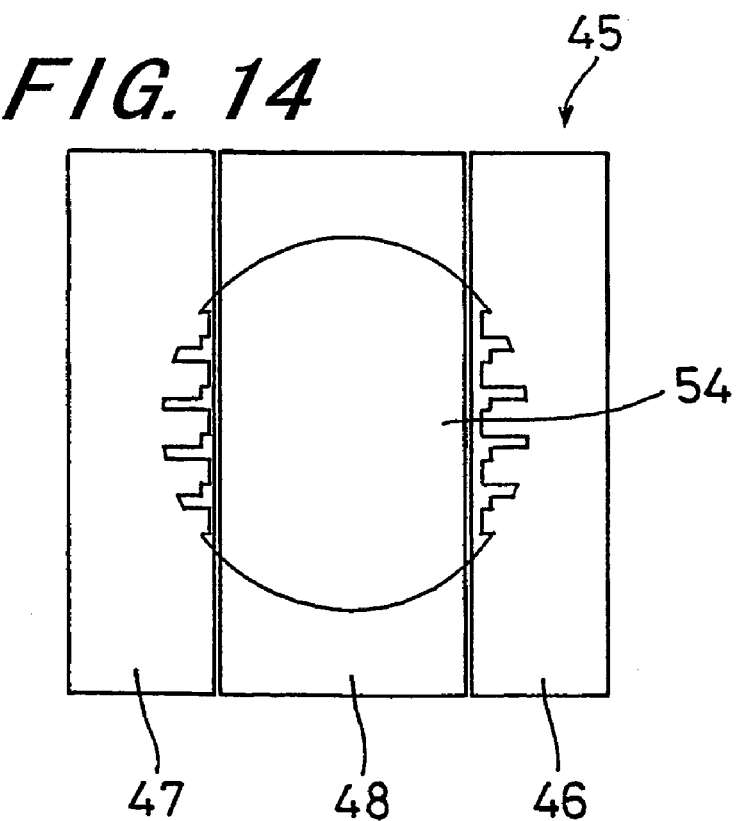
FIG. 14 is a plan view illustrating a reflected light 54 to be received by the light sensing unit 45 when the optical recording medium 24 is tilting.

FIG. 11 is a partial cross section simplifiedly illustrating the state of an optical recording medium 24 tilting in the tangential direction at an angle of θ2 in a tilt sensing apparatus 52 of a third embodiment of the invention. FIGS. 12A and 12B are plan views illustrating the state of the light transmitting through an optical device 22. FIG. 13 is a plan view illustrating a reflected light 53 to be received by a light sensing unit 45 when the optical recording medium 24 is untilting. FIG. 14 is a plan view illustrating a reflected light 54 to be received by the light sensing unit 45 when the optical recording medium 24 is tilting.

The tilt sensing apparatus 52 of the third embodiment shown in FIG. 11 is similar to the tilt sensing apparatus 21 of the first embodiment, and the corresponding portions are designated the same reference numerals and signs, omitting the description. It should be noted that the apparatus is provided with the same light sensing unit 45 as that in the second embodiment and the optical recording medium 24 is tilting in the tangential direction at an angle of θ2. The angel of θ2 expresses the tangential tilt described before.

The optical recording medium 24 provided in the tilt sensing apparatus 52 is tilting to the upper right in the tangential direction at an angel of θ2. The optical path of a light 55 transmitted through the optical device 22 and further reflected by the optical recording medium 24 is shifted in the right direction on the paper of FIG. 11, and the position incident on the optical device 22 is also shifted in the right direction on the papers of FIGS. 12A and 12B. As shown in FIG. 14, the reflected light 54 received by the light sensing unit 45 is increased in light quantity to be received by the first light receiving element 46 and is decreased in light quantity to be received by the second light receiving element 47 as compared with the reflected light 53 when the optical recording medium 24 is untilting shown in FIG. 13. Reversely, the optical path of the reflected light when the optical recording medium 24 is tilting to the upper left in the tangential direction at an angle of θ2 is shifted in the left direction and the position incident on the optical device 22 is also shifted in the left direction. Accordingly, the light quantity to be received by the first light receiving element 46 is decreased and the light quantity to be received by the second light receiving element 47 is increased.

In this manner, the light quantities to be received by the first and second light receiving elements 46 and 47 are varied corresponding to the tangential tilt in the optical recording medium 24. Therefore, the tilt sensing signal Pg3, which is the index of the tangential tilt, can be expressed by Equation (8) using the detection signal P1 by the first light receiving element 46 and the detection signal P2 by the second light receiving element 47.

$$Pg3 = P1 - P2 \quad (8)$$

The tilt sensing signal Pg3 in the tangential direction is zero when untilting, it is positive when tilting to the upper right, and it is negative when tilting to the upper left. Thus, the tangential tilt can be determined from the tilt sensing signal Pg3. In addition, the detection signals P1 and P2 are divided by the detection signal detected by the third light receiving element 48, whereby the tilt sensing signal with no influence of the variations in the light intensity of the reflected light may be determined. Furthermore, it is acceptable that the third light receiving element 48 is split into plurals to be used for detecting tracking error signals.

Moreover, the detection of the tilt sensing signal in the tangential direction can also be detected by using a light sensing unit formed of two light receiving elements that have a parting line in the direction parallel to a straight line 30 of connecting the an axis 29 of the optical recording medium 24 to a condensed position 25 where the light emitted from a light source 26 is condensed onto the optical recording medium 24 by a condensing unit 27 and are arranged in the direction orthogonal to the straight line 30.

Figure 15:
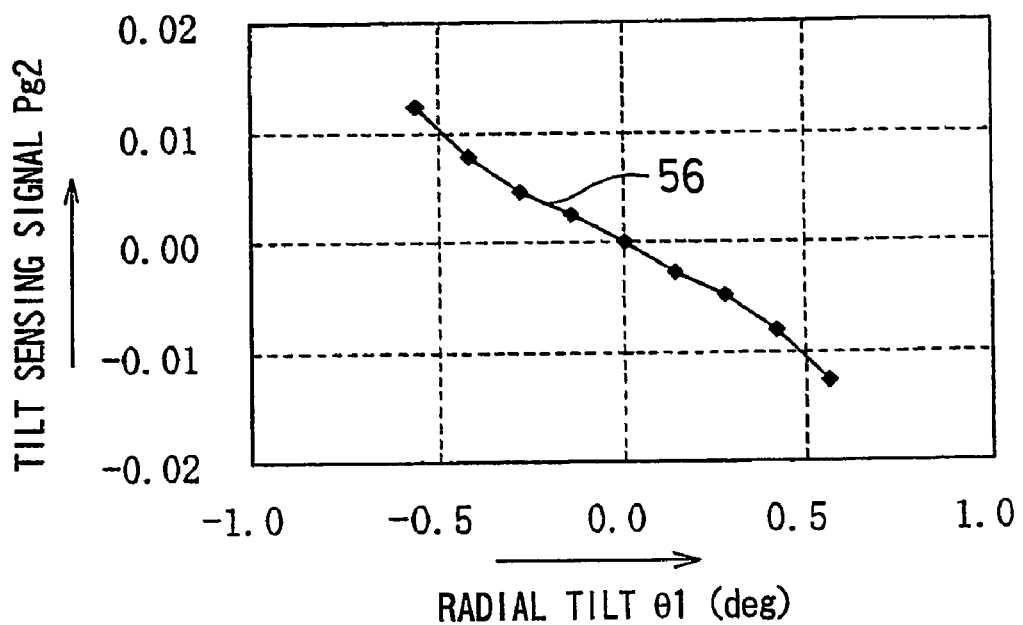
FIG. 15 is a diagram illustrating the relationship between the tilt sensing signal Pg2 and the radial tilt $\theta 1$ in the radial direction.
Figure 16:
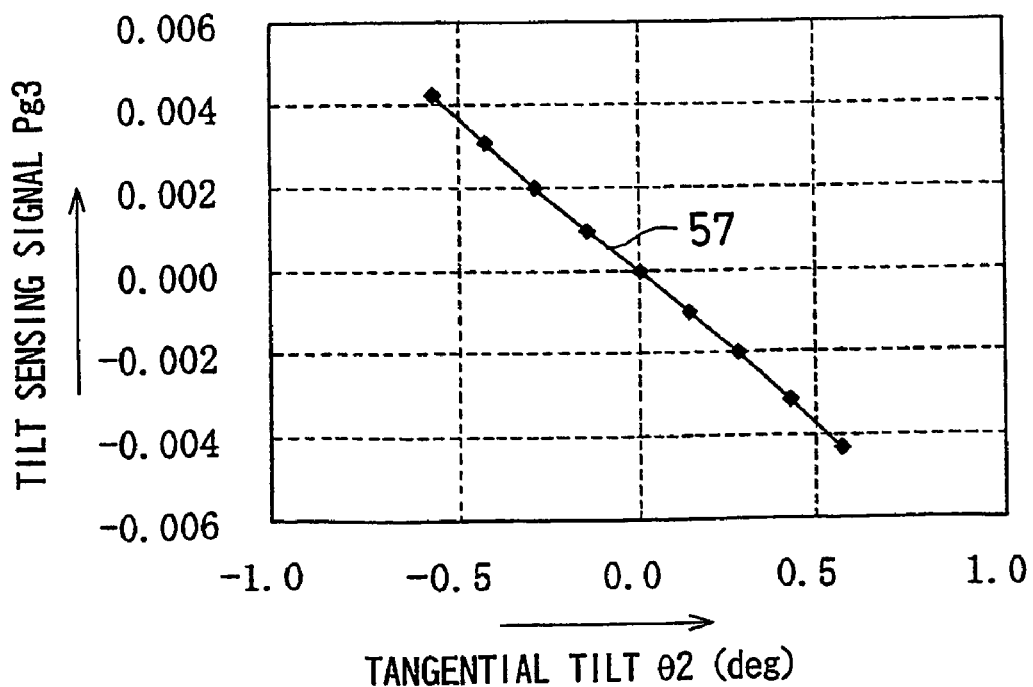
FIG. 16 is a diagram illustrating the relationship between the tilt sensing signal Pg3 and the tangential tilt $\theta 2$ in the tangential direction.

FIG. 15 is a diagram illustrating the relationship between the tilt sensing signal Pg2 and the radial tilt θ1 in the radial direction. FIG. 16 is a diagram illustrating the relationship between the tilt sensing signal Pg3 and the tangential tilt θ2 in the tangential direction. The angle θ1 expressing the radial tilt and the angle θ2 expressing the tangential tilt are shown as the unit is converted from radian (rad) to degree (deg).

A first line 56 shown in FIG. 15 is the result that the tilt sensing apparatus of the second embodiment was used to determine the relationship between the radial tilt in the optical recording medium 24 and the tilt sensing signal Pg2. In addition, a second line 57 shown in FIG. 16 is the result that the tilt sensing apparatus 52 of the third embodiment was used to determine the relationship between the tangential tilt in the optical recording medium 24 and the tilt sensing signal Pg3. The angles θ1 and θ2 expressing the amount of tilt in the optical recording medium 24 are set such that the value when the optical recording medium 24 is tilting to the upper right is negative and the value when it is tilting to the upper left is positive in both the radial direction and the tangential direction. The first line 56 and the second line 57 show that the relationships between the amount of tilt in the optical recording medium 24 and the tilt sensing signals Pg2 and Pg3 in the radial direction and the tangential direction are varied linearly. Accordingly, the tilt sensing signals Pg2 and Pg3 are determined, whereby the amount of tilt in the optical recording medium 24 can be detected accurately in both the radial direction and the tangential direction.

Figure 17:
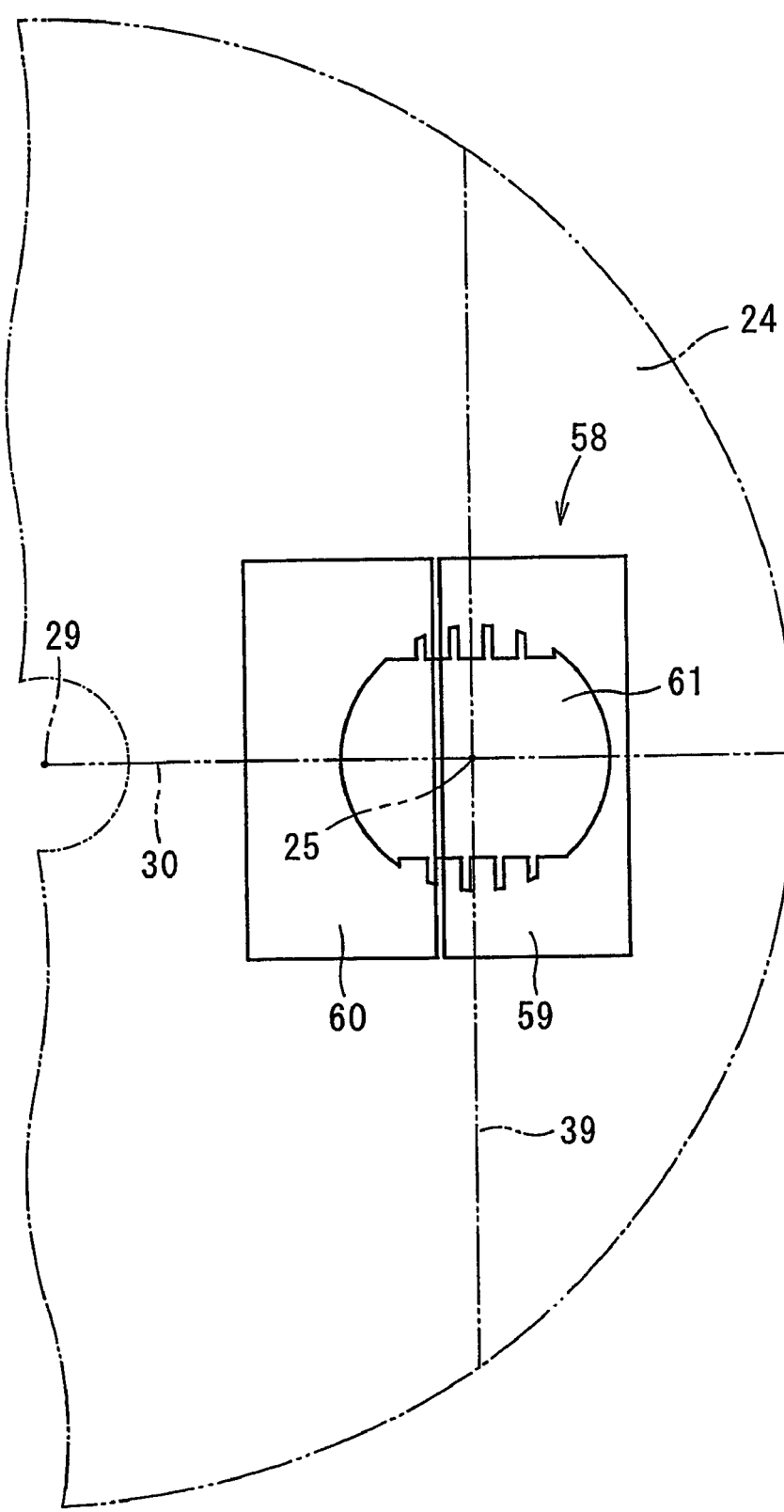
FIG. 17 is a plan view illustrating the simplified configuration of a light sensing unit 58 provided in a tilt sensing apparatus of a fourth embodiment of the invention.

FIG. 17 is a plan view illustrating the simplified configuration of a light sensing unit 58 provided in a tilt sensing apparatus of a fourth embodiment of the invention. The light sensing unit 58 of the embodiment is similar to the light sensing unit 23 provided in the tilt sensing apparatus 21 of the first embodiment, and the corresponding portions are designated the same reference numerals and signs, omitting the description. It should be noted that the light sensing unit 58 is formed of fourth and fifth light receiving element 59 and 60 that have a parting line in the direction orthogonal to a straight line 30 of connecting an axis 29 of an optical recording medium 24 to a condensed position 25 where the light emitted from a light source 26 is condensed onto the optical recording medium 24 by a condensing unit 27 and are disposed in the direction of the straight line 30.

The light sensing unit 58 receives a reflected light 61 in the state in which an objective lens 35 is shifted in the right direction from the reference position predetermined by tracking control. When the objective lens 35 is moved in the right direction, the area of a reflected light 61 to be received by the fourth light receiving element 59 is increased and the area of the reflected light 61 to be received by the fifth light receiving element 60 is decreased. Reversely, when the objective lens 35 is moved in the left direction, the area of the reflected light to be received by the fourth light receiving element 59 is decreased and the area of the reflected light to be received by the fifth light receiving element 60 is increased. As described above, the light quantities to be received by the fourth and fifth light receiving elements 59 and 60 are varied corresponding to the movement of the objective lens 35. Thus, the lens shift signal Ps expressing the movement of the objective lens 35 can be expressed by Equation (9), where the detection signal detected by the fourth light receiving element 59 is P4 and the detection signal detected by the fifth light receiving element 60 is P5.

$$Ps = P4 - P5 \quad (9)$$

The lens shift signal Ps is zero when the objective lens 35 is located at the predetermined reference position, it is positive when moved in the right direction from the reference position, and it is negative when moved in the left direction from the reference position. Accordingly, the direction of the objective lens 35 moved can be detected from the lens sift signal Ps.

In this manner, the two light receiving elements are disposed in the direction of the lens moved, and thus the direction of the objective lens moved with tracking control can be detected based on the difference between the detection signals by the discrete light receiving elements.

Figure 18:
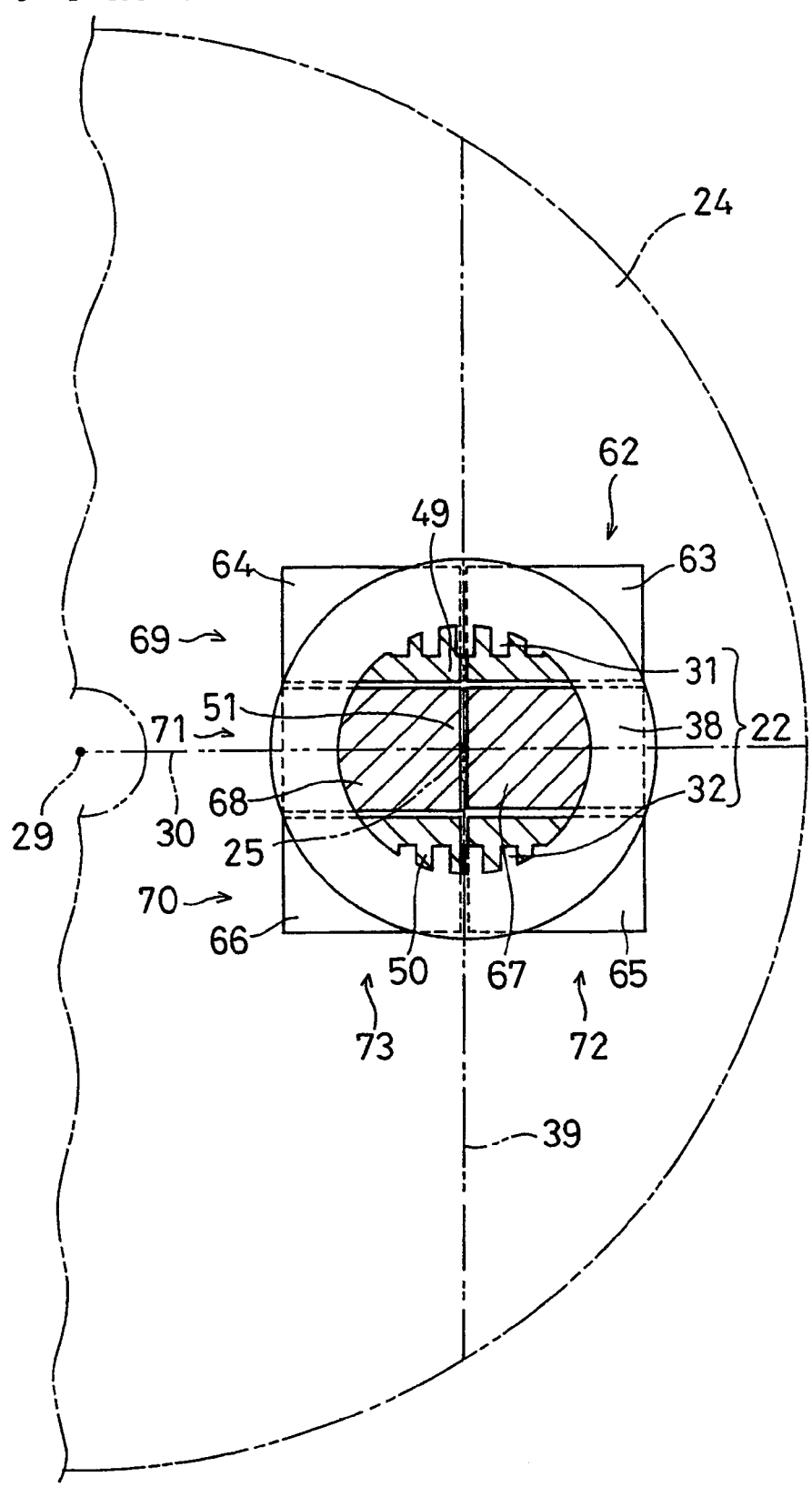
FIG. 18 is a plan view illustrating the simplified configuration of a light sensing unit 62 provided in a tilt sensing apparatus of a fifth embodiment of the invention.

FIG. 18 is a plan view illustrating the simplified configuration of a light sensing unit 62 disposed in a tilt sensing apparatus of a fifth embodiment of the invention. The light sensing unit 62 of the embodiment is similar to the light sensing unit 23 provided in the tilt sensing apparatus 21 of the first embodiment, and the corresponding portions are designated the same reference numerals and signs, omitting the description. It should be noted that the light sensing unit 62 is formed of six light receiving elements that three rows are arranged in the direction orthogonal to a straight line 30 of connecting an axis 29 of an optical recording medium 24 to a condensed position 25 where the light emitted from a light source 26 is condensed onto the optical recording medium 24 by a condensing unit 27 and two columns are arranged in the direction parallel to the straight line 30.

The light sensing unit 62 is formed of six light receiving elements 63, 64, 65, 66, 67 and 68 in which two light receiving elements forming each row make one group to form three groups of light receiving elements. The detection signals obtained from the three groups of light receiving elements can be considered to correspond to the detection signals obtained from the first, second and third light receiving elements 46, 47 and 48 shown in FIG. 10. The detection signals detected by a first light receiving element group 69 formed of the sixth and seventh light receiving elements 63 and 64 for receiving the light transmitted through an area 49 correspond to the detection signal P1. The detection signals detected by a second light receiving element group 70 formed of the eighth and ninth light receiving elements 65 and 66 for receiving the light transmitted through an area 50 correspond to the detection signal P2. The detection signals detected by a third light receiving element group 71 formed of the tenth and eleventh light receiving elements 67 and 68 for receiving the light transmitted through an area 51 correspond to the detection signal P3. The detection signals detected by the third light receiving element group 71 are not used for reducing the errors due to the influence of the light diffracted by the optical recording medium 24. The detection signals detected by the first and second light receiving element groups 69 and 70 are utilized to detect the amount of tilt in the optical recording medium 24 by the Equation (2) for determining the tilt sensing signal Pg1 expressing the radial tilt and the Equation (8) for determining the tilt sensing signal Pg3 expressing the tangential tilt.

Additionally, two light receiving elements of each column make one group except the tenth and eleventh light receiving elements 67 and 68 of the second row affected by the light diffracted by the optical recording medium 24, and two light receiving element groups can be formed. The detection signals obtained from the two light receiving element groups can be considered to correspond to the detection signals obtained from the fourth and fifth light receiving elements 59 and 60 shown in FIG. 17. More specifically, the detection signals detected by a fourth light receiving element group 72 formed of the sixth and eighth light receiving elements 63 and 65 correspond to the detection signal P4. The detection signals detected by a fifth light receiving element group 73 formed of the seventh and ninth light receiving elements 64 and 66 correspond to the detection signal P5. Therefore, the detection signals detected by the fourth light receiving element group 72 and the fifth light receiving element group 73 are utilized to detect the movement of the objective lens 35 with tracking control by the Equation (9) for determining the lens shift signal Ps.

Furthermore, the detection signals by the tenth and eleventh light receiving elements 67 and 68, which are not utilized in detecting the amount of tilt by the Equations (2) and (8) and the movement of the objective lens 35 by the Equation (9), can be utilized for detecting the tracking error signal. Moreover, it is acceptable that the tilt sensing signal and the lens shift signal, which are obtained by utilizing the detection signals by the tenth and eleventh light receiving elements 67 and 68 and are not affected by the variations in the light intensity of the reflected light, are utilized to detect the amount of tilt in the optical recording medium 24 and lens shifts.

In this manner, the amount of tilt in the optical recording medium 24 and the movement of the objective lens 35 due to tracking can be detected by the same light sensing unit 62.

Thus, the configuration of the apparatus can be simplified, the time and operating procedures for adjusting the position of the optical device 22 can be reduced, and costs can be curtailed.

Figure 19:
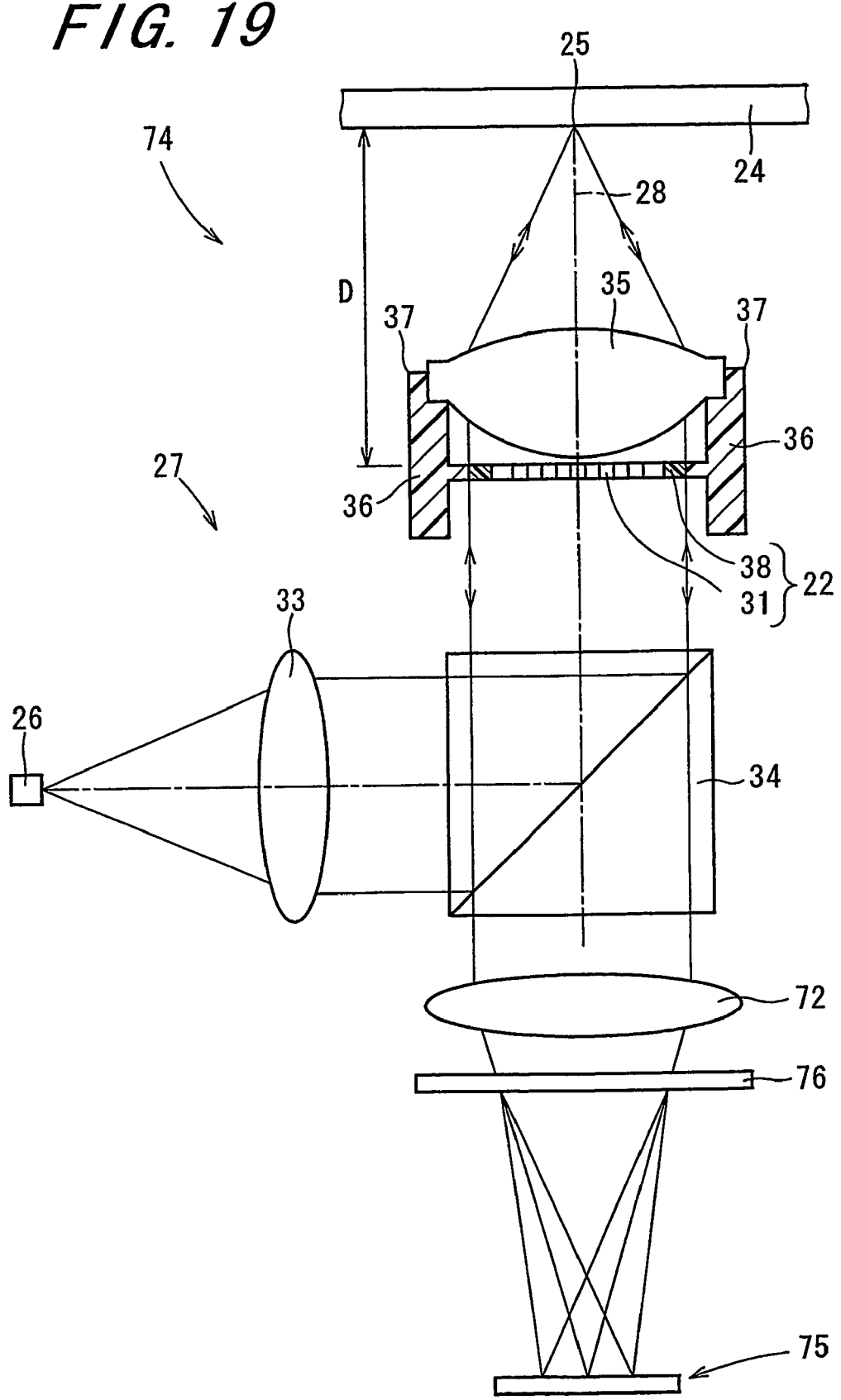
FIG. 19 is a partial cross section illustrating the simplified configuration of a tilt sensing apparatus 74 of a sixth embodiment of the invention.

FIG. 19 is a partial cross section illustrating the simplified configuration of a tilt sensing apparatus 74 of a sixth embodiment of the invention. The tilt sensing apparatus 74 of the embodiment is similar to the tilt sensing apparatus 21 of the first embodiment, and the corresponding portions are designated the same reference numerals and signs, omitting the description. It should be noted that the tilt sensing apparatus 74 has a diffraction grating 76 and a condenser lens 72 between an optical device 22 and a light sensing unit 75. In FIG. 19, the light sensing unit 75 is shown by a receiving element for convenience.

Figure 20:
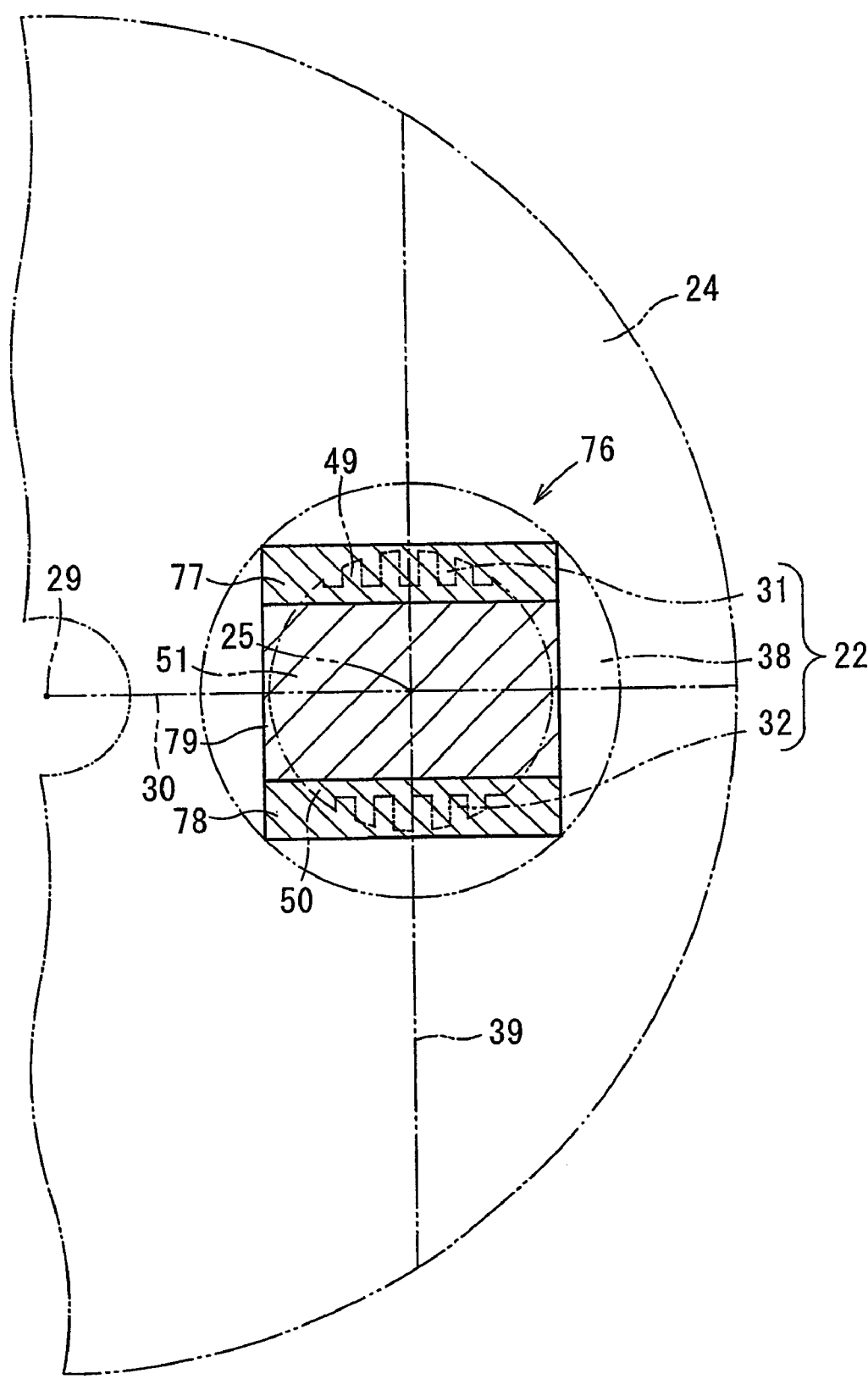
FIG. 20 is a plan view illustrating a diffraction grating 76 provided in the tilt sensing apparatus 74.
Figure 21:
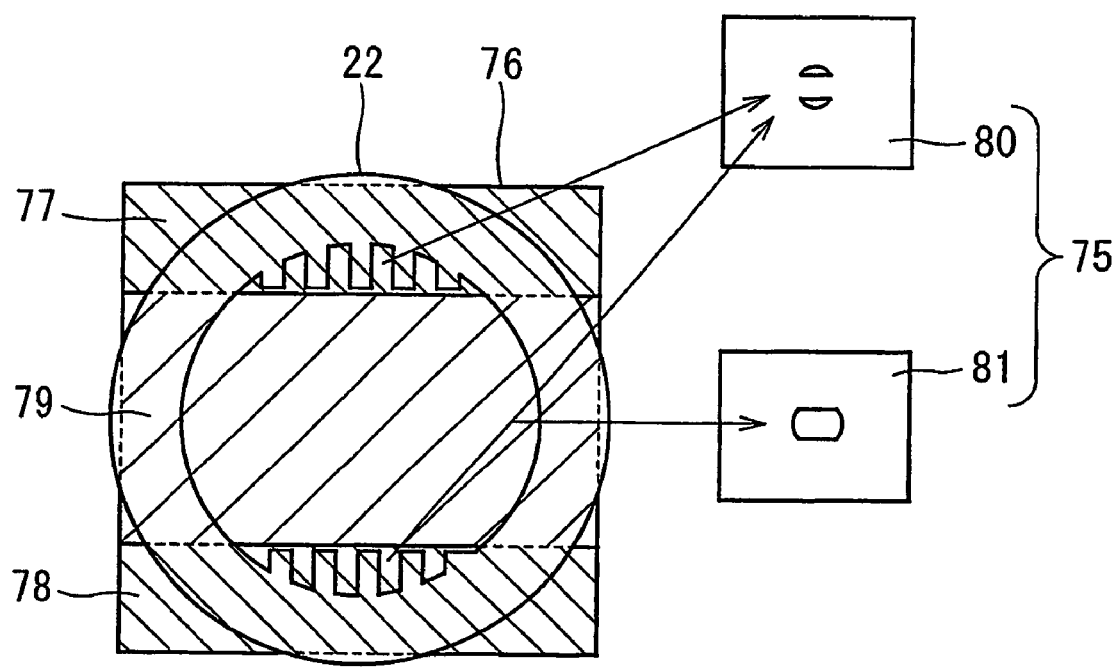
FIG. 21 is a diagram illustrating the optical relationship between the diffraction grating 76 and a light sensing unit 75.

FIG. 20 is a plan view illustrating an example of the diffraction grating 76 provided in the tilt sensing apparatus 74. FIG. 21 is a diagram illustrating the optical relationship between the diffraction grating 76 and a light sensing unit 75. The diffraction grating 76 includes three diffraction regions, first, second and third diffraction regions 77, 78 and 79 that are arranged in a row in the direction orthogonal to a straight line 30 of connecting an axis 29 of an optical recording medium 24 to a condensed position 25 where the light emitted from a light source 26 is condensed onto the optical recording medium 24 by a condensing unit 27. Among the first, second and third diffraction regions 77, 78 and 79, the first diffraction region 77 where the light transmitted through an area 49 containing first optical device strips 31 enters and the second diffraction region 78 where the light transmitted through an area 50 containing second optical device strips 32 enters have the same grating shape.

As shown in FIG. 21, the light sensing unit 75 includes a twelfth light receiving element 80 that is a light receiving element for receiving the diffracted light by the first diffraction region 77 where the light transmitted through the area 49 containing the first optical device strips 31 enters and the diffracted light by the second diffraction region 78 where the light transmitted through the area 50 containing the second optical device strips 32 enters, a thirteenth light receiving element 81 that is a light receiving element for receiving the diffracted light by the third diffraction region 79 where the light transmitted thorough a remaining area 51 containing the first and second optical devices 31 and 32 enters.

The reflected light transmitted through the optical device 22, reflected by the optical recording medium 24 and again transmitted through the optical device 22 transmits through a beam splitter 34 and the condenser lens 72 and enters the diffraction grating 76. The light transmitted through the area 49 containing the first optical device strips 31 enters the first diffraction region 77, and the light transmitted through the area 50 containing the second optical device strips 32 enters the second diffraction region 78. The first diffraction region 77 and the second diffraction region 78 have the same grating shape. Thus, the light transmitted through the area 49 containing the first optical device strips 31 and the light transmitted through the area 50 containing the second optical device strips 32 are diffracted at the same angle, and they are received on the twelfth light receiving element 80. The light transmitted through the remaining area 51 containing the first and second optical device strips 31 and 32 enters the third diffraction region 79, it is diffracted at an angle different from the lights entered the first and second diffraction regions 77 and 78, and it is received on the thirteenth light receiving element 81.

The detection signal detected by the twelfth light receiving element 80 corresponds to the sum signal (P1+P2) of the detection signal P1 detected by the first light receiving element 46 and the detection signal P2 detected by the second light receiving element 47 shown in FIG. 10. The detection signal detected by the thirteenth light receiving element 81 corresponds to the detection signal P3 detected by the third light receiving element 48. Accordingly, the amount of tilt in the optical recording medium 24 can be determined by the Equation (5) for determining the tilt sensing signal Pg2 expressing the radial tilt.

According to the embodiment, for example, an arithmetic circuit for calculating the sum signal does not need to be disposed, and the numbers of the light receiving elements can be reduced. Therefore, the simplified, scaled-down apparatus and the cost reduction can be realized.

Furthermore, when an optical recording medium having a land and a groove capable of recording information on both the land and the groove is used as the optical recording medium, the diffraction pattern is varied depending on whether the condensed position of the light emitted from the light source 26 is located on the land or groove due to the difference in width between the land and the groove. Therefore, even when the amount of tilt in the optical recording medium is equal, the light quantity of the reflected light is varied and the tilt sensing signals are different. On this account, when the optical recording medium described above is used, the amount of tilt will be detected as follows.

Figure 22:
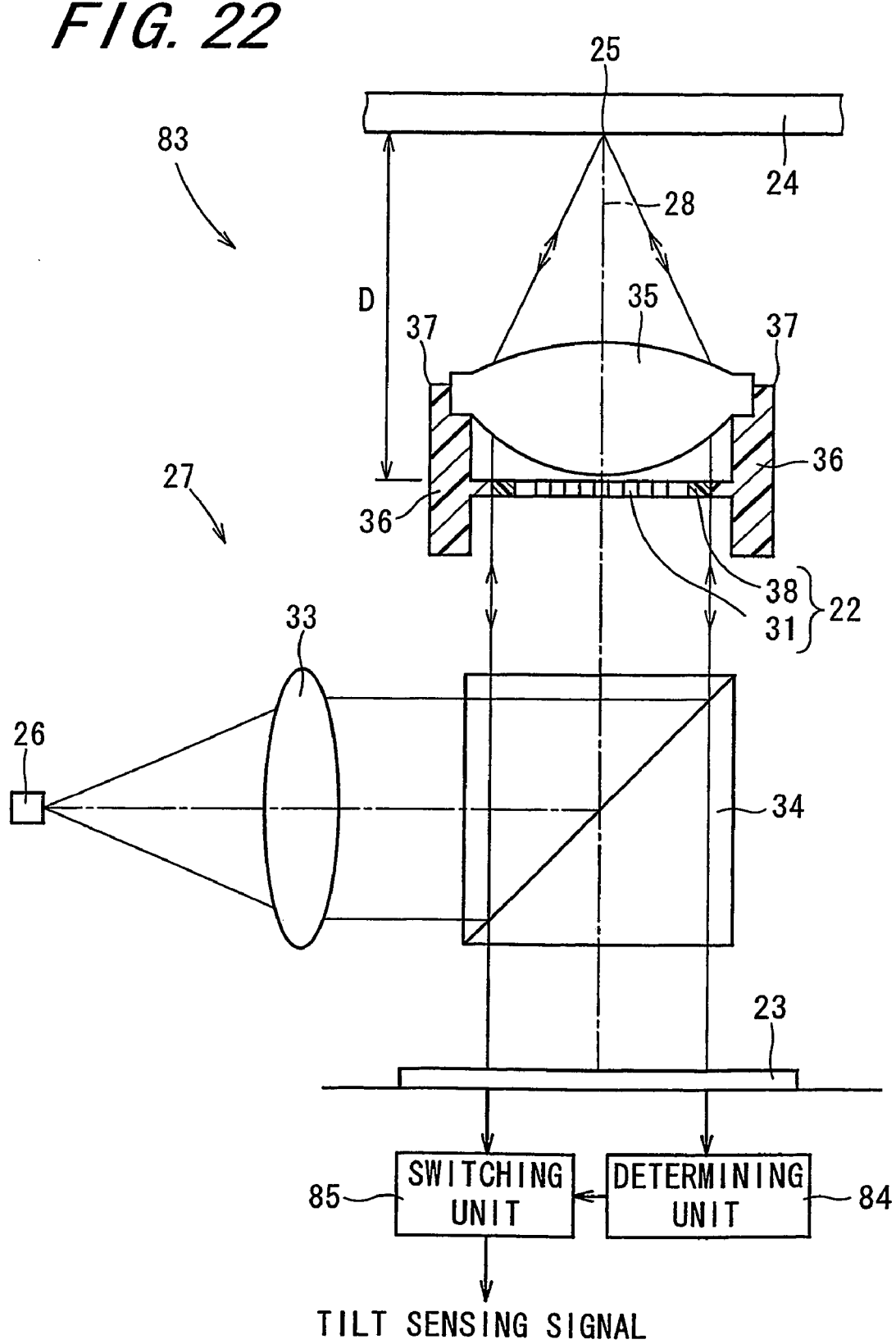
FIG. 22 is a schematic diagram illustrating the simplified configuration of a tilt sensing apparatus 83 of a seventh embodiment of the invention.

FIG. 22 is a schematic view illustrating the simplified configuration of a tilt sensing apparatus 83 of a seventh embodiment of the invention. The tilt sensing apparatus 83 of the embodiment is similar to the tilt sensing apparatus 21 of the first embodiment, and the corresponding portions are designated the same reference numerals and signs, omitting the description. It should be noted that the tilt sensing apparatus 83 is further provided with a determining unit 84 for determining whether the condensed position where the light emitted from a light source 26 is condensed onto an optical recording medium 24 by a condensing unit 27 is located on the land or groove, and a switching unit 85 for switching the signal processing for detecting the amount of tilt responding to the results by the determining unit 84.

For example, in an optical disk which is so designed that there exists a difference in width between its land and groove, the quantity of reflected light varies according to whether the light condensed position is located on the land or the groove. Thus, the determining unit 84 determines whether the light condensed position is located on the land or groove by checking the difference in the quantity of reflected light. Moreover, the switching unit 85 serves to switch signal processing methods, i.e., calculation methods based upon signals outputted from the determining unit 84.

Suppose the detection signal detected by the light sensing unit 23 is P in the case of the optical recording medium tilting, the detection signal is $P_0d$ when the condensed position is located on the land, and the detection signal is $P_0g$ when the condensed position is located on the groove in the case of optical recording medium untilting. The tilt sensing signal Pg4 expressing the radial tilt when the condensed position is located on the land can be determined by Equation (10). The tilt sensing signal Pg5 expressing the radial tilt when the condensed position is located on the groove can be determined by Equation (11).

$$Pg4 = P - P_0d \tag{10}$$

$$Pg5 = P - P_0g \tag{11}$$

Accordingly, in either the case of condensing the light on the land or groove, the accurate amount of tilt can be detected with no influence of the variations in light quantity of the reflected light due to the difference between the diffraction pattern of the land and the diffraction pattern of the groove.

Figure 23:
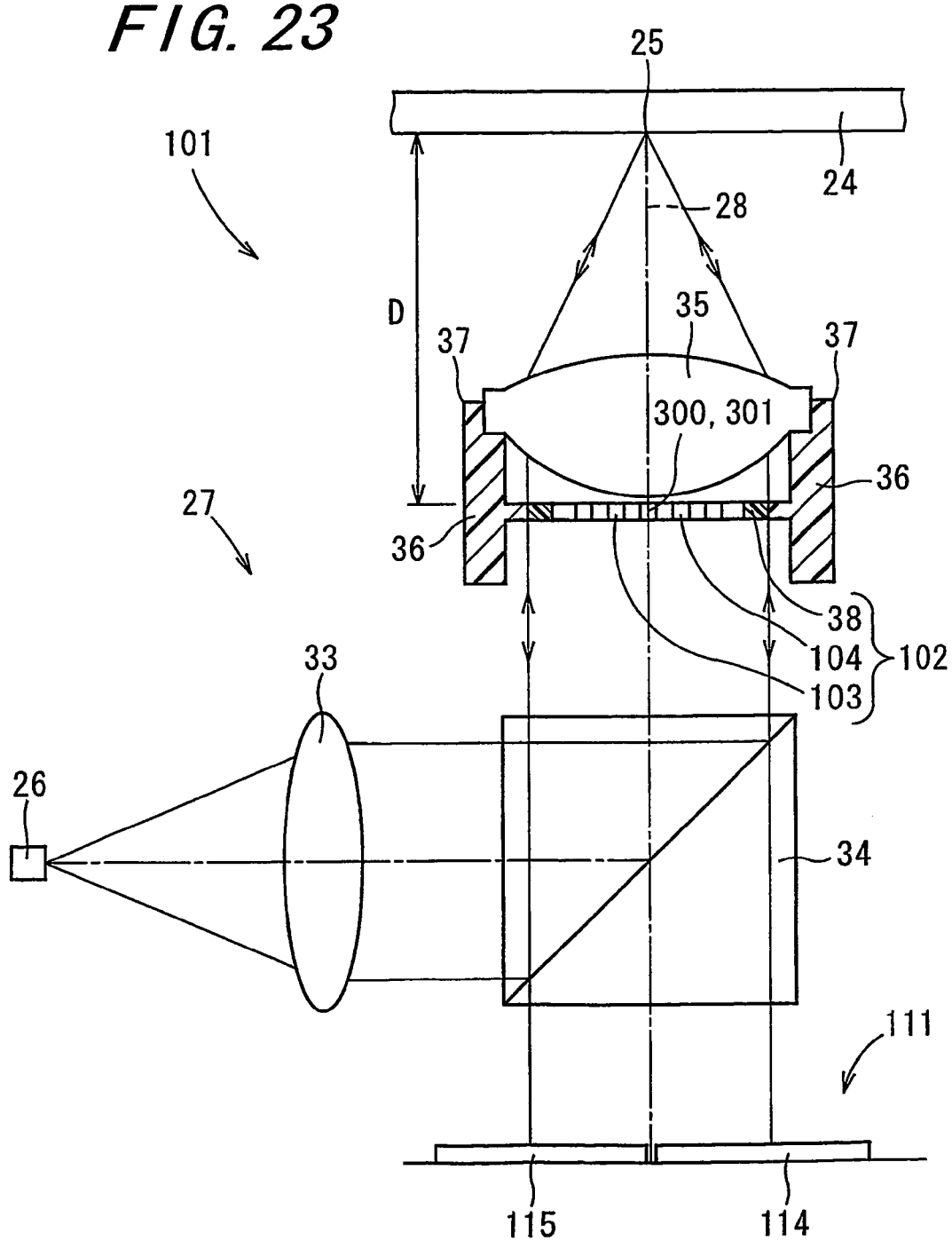
FIG. 23 is a partial cross section illustrating the simplified configuration of a tilt sensing apparatus 101 of an eighth embodiment of the invention.
Figure 24:
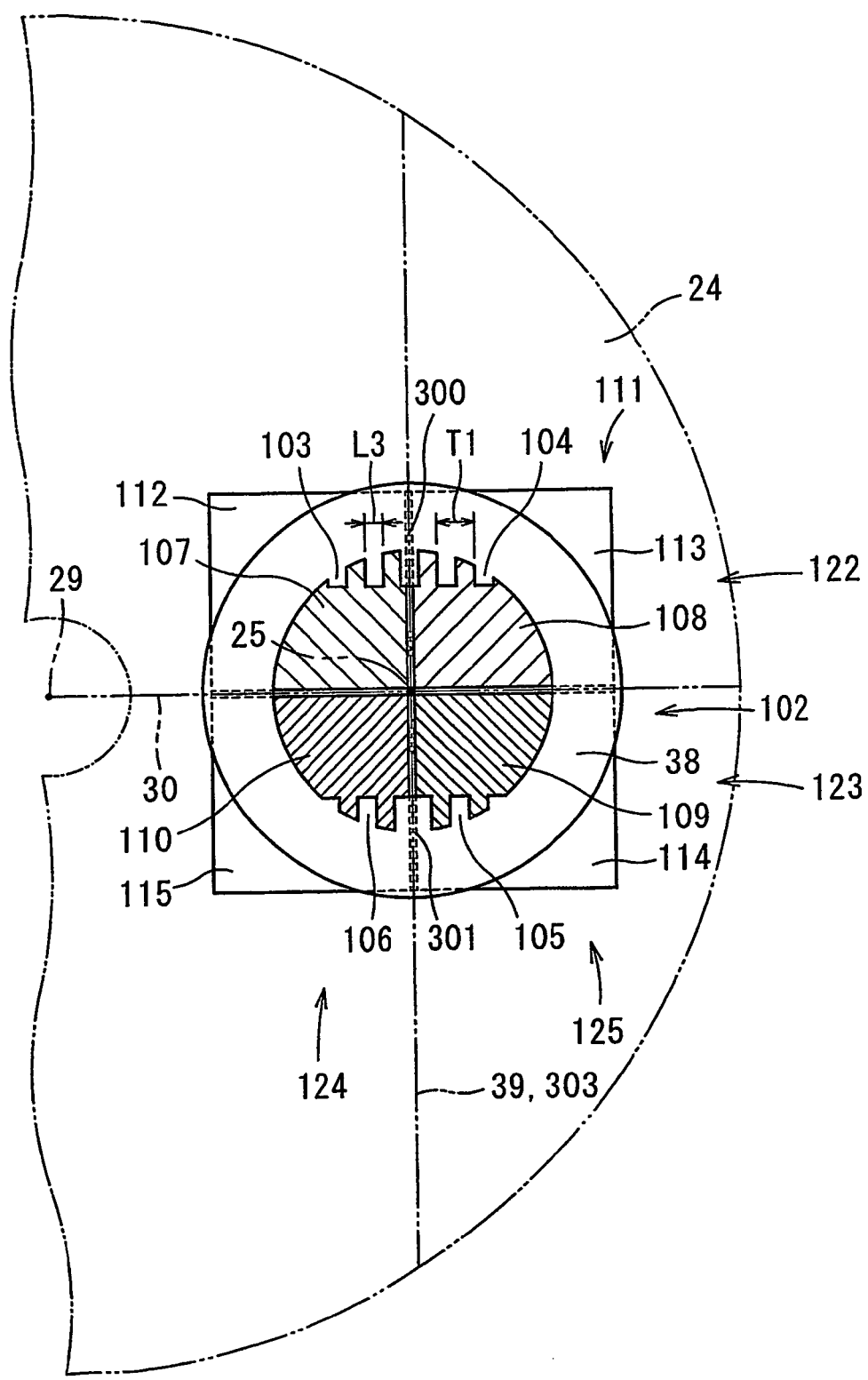
FIG. 24 is a plan view illustrating an optical device 102 and a light sensing unit 111 provided in the tilt sensing apparatus 101 shown in FIG. 23.
Figure 25A:
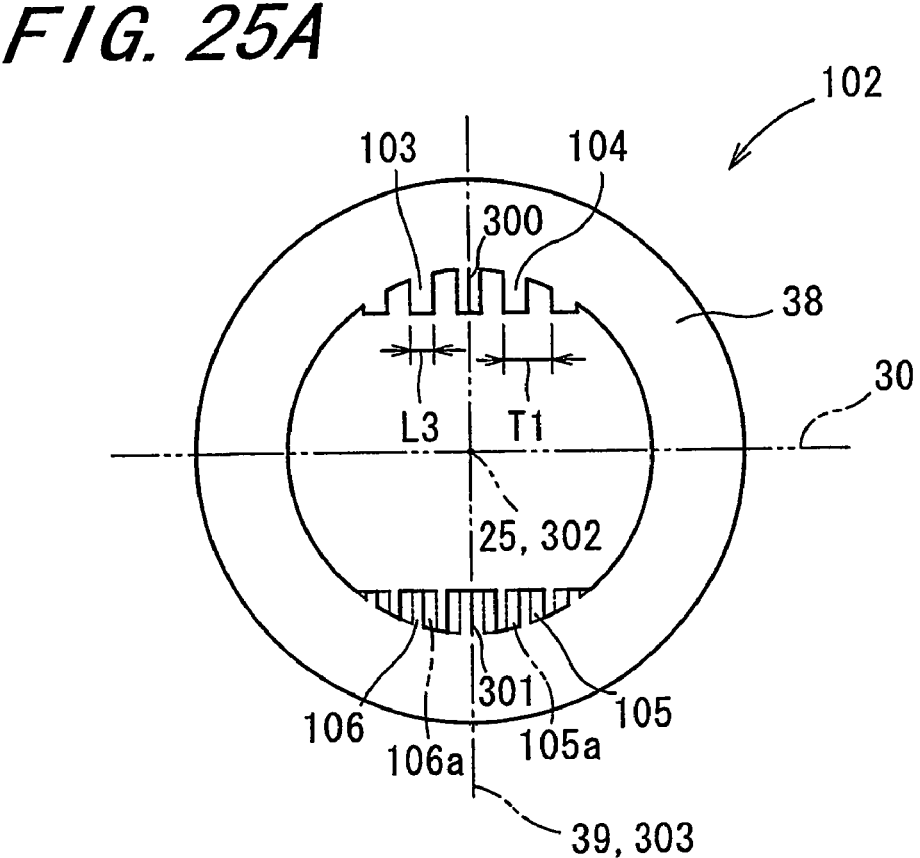
FIGS. 25A and 25B are plan views illustrating the simplified configuration of the optical device 102.
Figure 25B:
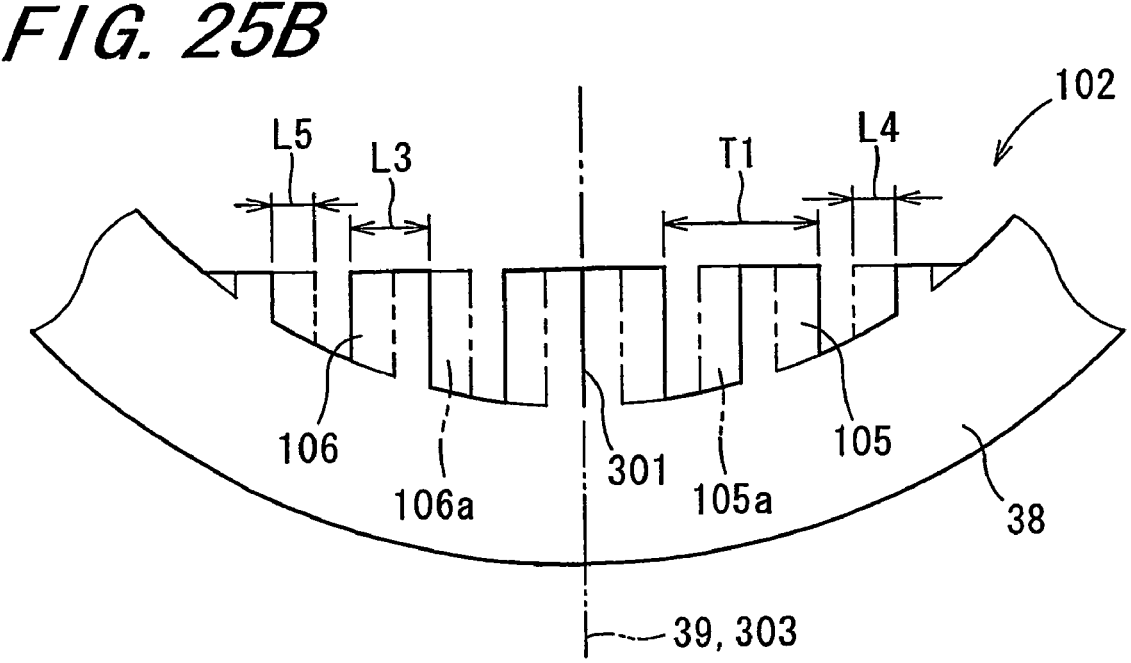

FIG. 23 is a partial cross section illustrating the simplified configuration of a tilt sensing apparatus 101 of an eighth embodiment of the invention. FIG. 24 is a plan view illustrating an optical device 102 and a light sensing unit 111 provided in the tilt sensing apparatus 101 shown in FIG. 23. FIGS. 25A and 25B are plan views illustrating the simplified configuration of the optical device 102. The tilt sensing apparatus 101 of the embodiment is similar to the tilt sensing apparatus 21 of the first embodiment, and the corresponding portions are designated the same reference numerals and signs, omitting the description. It should be noted that the optical device 102 provided in the tilt sensing apparatus 101 includes four optical device strips, third, fourth, fifth and sixth optical device strips 103, 104, 105 and 106.

The third, fourth, fifth and sixth optical device strips 103, 104, 105 and 106 have an approximately rectangular cross section orthogonal to an optical axis 28, and they are formed in plurals as extending from an optical device main body 38 at a predetermined array pitch T1 in the direction of a straight line 30 of connecting an axis 29 of an optical recording medium 24 to a condensed position 25 where the light emitted from a light source 26 is condensed onto the optical recording medium 24 by a condensing unit 27. A border line 300 between the third optical device strips 103 and the fourth optical device strips 104 and a border line 301 between the fifth optical device strips 105 and the sixth optical device strips 106 are shown overlapped with the optical axis 28 in FIG. 23, and they are shown orthogonal to the straight line 30 and overlapped with a straight line 39 passing through the condensed position 25 in FIGS. 24, 25A and 25B.

Additionally, the third, fourth, fifth and sixth optical device strips 103, 104, 105 and 106 have a length L3 which is a half of the array pitch T1 in the direction of the straight line 30. In FIGS. 25A and 25B, the fifth and sixth optical device strips are depicted by phantom lines 105a and 106a, suppose the third optical device strips 103, the fifth optical device strips 105, the fourth optical device strips 104 and the sixth optical device strips 106 are formed at the positions of axial symmetry about the optical axis 28 with no shift as the third optical device strips 103 to the fifth optical device strips and the fourth optical device strips 104 to the sixth optical device strips 106. Furthermore, the third optical device strips 103 and the fifth optical device strips 105 are formed to have a shift L4 being a quarter of the array pitch T1 at the positions of axial symmetry about the optical axis 28 in one of the direction points of the straight line 30. Moreover, the fourth optical device strips 104 and the sixth optical device strips 106 are formed to have a shift L5 being a quarter of the array pitch T1 at the positions of axial symmetry about the optical axis 28 in the other of the direction points of the straight line 30. Here, the third and fourth optical device strips 103 and 104, as well as the fifth and sixth optical device strips 105 and 106, are so formed as to be axisymmetrical about a straight line 303 which passes through the center 302 of the optical device 22 and is perpendicular to the straight line 30 of connecting the axis 29 of the optical recording medium 24 to the condensed position 25 where the light emitted from the light source is condensed onto the recording medium 24 by the condensing unit 27.

According to the optical device of such the configuration, the light quantities reduced by the third optical device strips 103 and the fifth optical device strips 105 are varied from the light quantities reduced by the fourth optical device strips 104 and the sixth optical device strips 106 in the variations to the amount of tilt. Therefore, the amount of tilt in the optical recording medium 24 can be detected by the light quantities reduced by the third optical device strips 103 and the fifth optical device strips 105 and the light quantities reduced by the fourth optical device strips 104 and the sixth optical device strips 106.

In addition, the third, fourth, fifth and sixth optical device strips 103, 104, 105 and 106 are formed to have an approximately cross section orthogonal to the optical axis 28. Thus, the modulation factor of the light quantity becomes greater to the amount of tilt in the optical recording medium 24, and the detection accuracy is enhanced. Furthermore, the third, fourth, fifth and sixth optical device strips 103, 104, 105 and 106 are arranged at regular intervals. Thus, the light transmitting through an area 107 containing the third optical device strips 103, the light transmitting through an area 109 containing the fifth optical device strips 105, the light transmitting through an area 108 containing the fourth optical device strips 104, and the light transmitting through an area 110 containing the sixth optical device strips 106 are varied linearly and separately corresponding to the amount of tilt in the optical recording medium 24. Consequently, the amount of tilt in the optical recording medium 24 can be detected accurately. Moreover, the third and fourth optical device strips 103 and 104, as well as the fifth and sixth optical device strips 105 and 106, are so formed as to be axisymmetrical about the straight line 303. Therefore, the light quantities reduced by the third and fifth optical device strips 103 and 105 are allowed to be equal to the light quantities reduced by the fourth and sixth optical device strips 104 and 106 when the optical recording medium 24 is untilting.

The light sensing unit 111 includes four light receiving elements, fifteenth, sixteenth, seventeenth and eighteenth light receiving elements 112, 113, 114 and 115 that have parting lines in the direction parallel to the straight line 30 of connecting the axis 29 of the optical recording medium 24 to the condensed position 25 where the light emitted from the light source 26 is condensed onto the optical recording medium 24 by the condensing unit 27 and in the direction orthogonal to the straight line 30 and are arranged in a matrix shape. The fifteenth light receiving element 112 receives the light transmitted through the area 107 containing the third optical device strips 103. The sixteenth light receiving element 113 receives the light transmitted through the area 108 containing the fourth optical device strips 104. The seventeenth light receiving element 114 receives the light transmitted through the area 109 containing the fifth optical device strips 105. The eighteenth light receiving element 115 receives the light transmitted through the area 110 containing the sixth optical device strips 106.

Figure 26A:
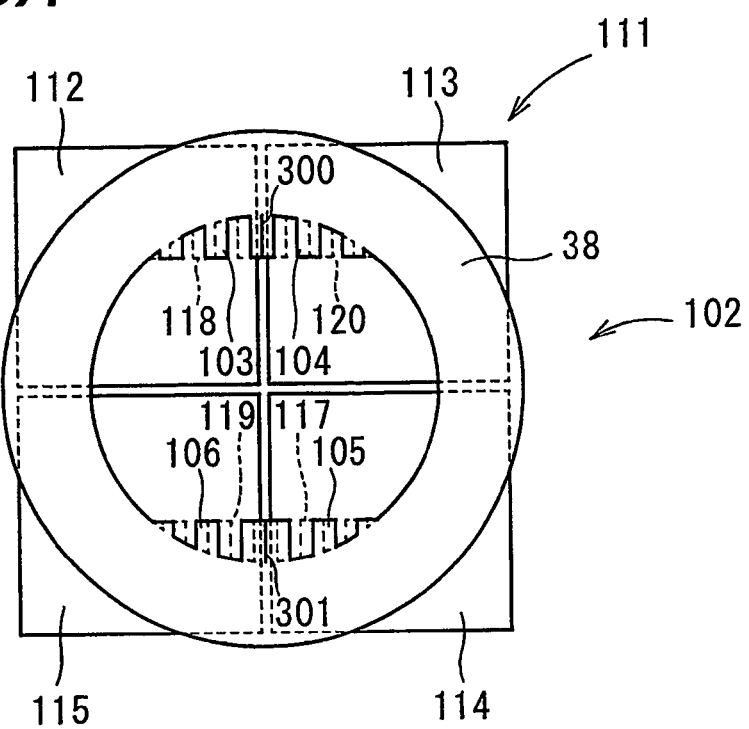
FIGS. 26A and 26B are plan views illustrating the state of the light transmitting through the optical device 102.
Figure 26B:
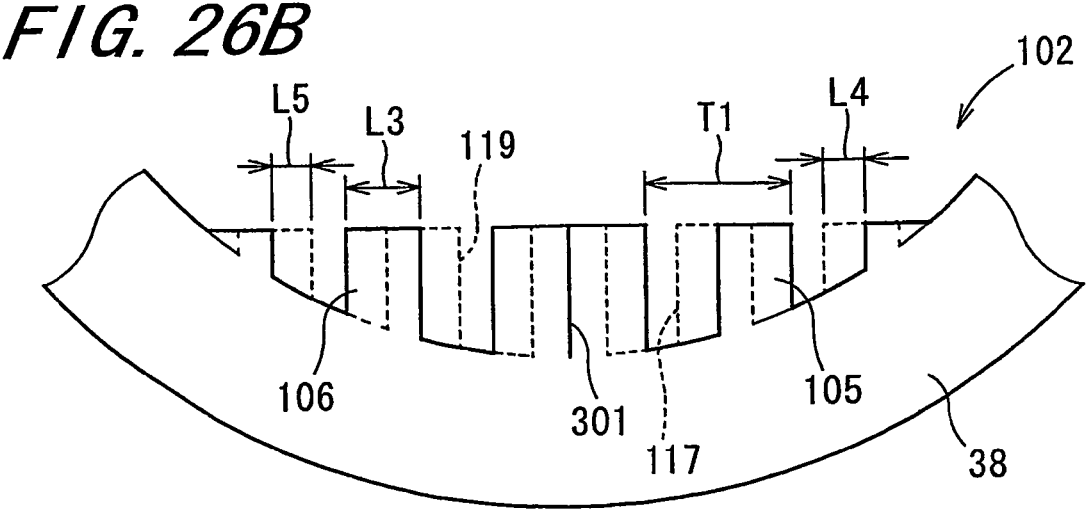
Figure 27:
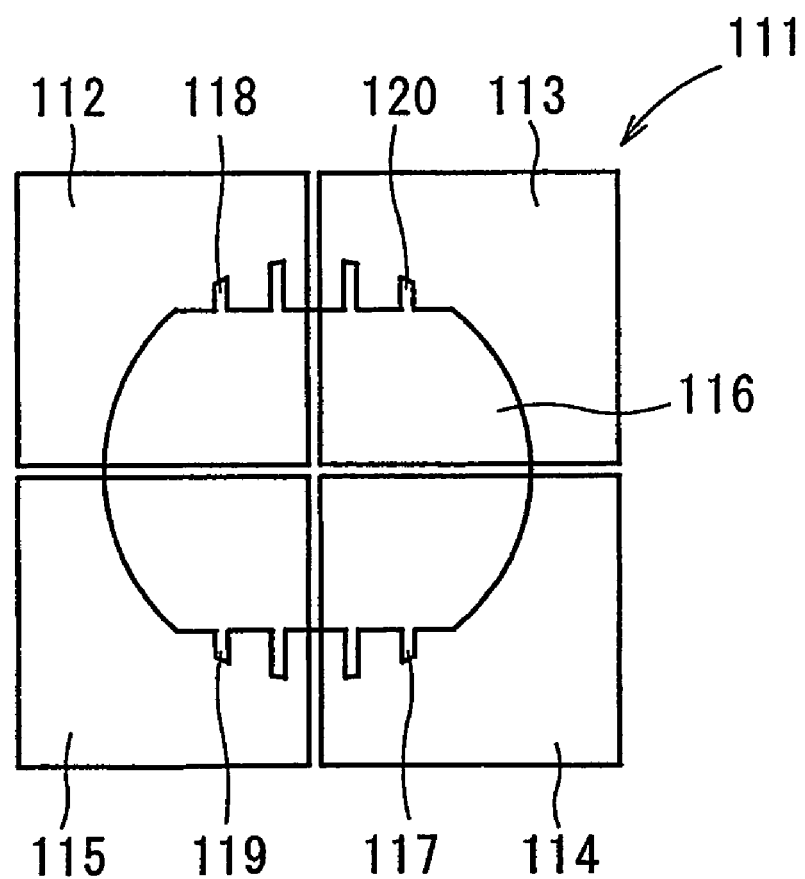
FIG. 27 is a plan view illustrating a reflected light 116 to be received by the light sensing unit 111.

Hereafter, variations in light quantity will be described, which are generated because the light emitted from the light source 26 and the light reflected from the optical recording medium 24 transmit through the optical device 22. FIGS. 26A and 26B are plan views illustrating the state of the light transmitting through the optical device 102. FIG. 27 is a plan view illustrating a reflected light 116 to be received on the light sensing unit 111. When the optical recording medium 24 is untilting, the light entered the optical device 102 is reduced in light quantity by the third, fourth, fifth and sixth optical device strips 103, 104, 105 and 106 disposed in the optical device 102 for transmission, and it is condensed onto the optical recording medium 24 by the objective lens 35.

The light reflected by the optical recording medium 24 at the position of axial symmetry with respect to the incident position on the objective lens 35 and the optical axis 28 transmits through the objective lens 35, and it again transmits through the optical device 102. The third optical device strips 103 and the fifth optical device strips 105 are formed to have the shift L4 (a quarter of the array pitch T1 as shown in FIGS. 25A and 25B) at the positions of axial symmetry about the optical axis 28 in one of the direction points of the straight line 30. On this account, a light 117 transmitted through the third optical device strips 103 and further reflected by the optical recording medium 24 passes through at the position shifted only by the shift L4 to the fifth optical device strips 105. A light 118 transmitted through the fifth optical device strips 105 and further reflected by the optical recording medium 24 similarly passes through at the position shifted only by the shift L4 to the third optical device strips 103.

Additionally, the fourth optical device strips 104 and the sixth optical device strips 106 are formed to have the shift L5 (a quarter of the array pitch T1 in FIGS. 25A and 25B) at the positions of axial symmetry about the optical axis 28 in the other of the direction points of the straight line 30. On this account, a light 119 transmitted through the fourth optical device strips 104 and further reflected by the optical recording medium 24 passes through at the position shifted only by the L5 to the sixth optical device strips 106. A light 120 transmitted through the sixth optical device strips 106 and further reflected by the optical recording medium 24 similarly passes through at the positions shifted only by L5 to the fourth optical device strips 104.

In this manner, the light 117 transmitted through the third optical device strips 103 and the fifth optical device strips 105, the light 118 transmitted through the fifth optical device strips 105 and the third optical device strips 103, the light 119 transmitted through the fourth optical device strips 104 and the sixth optical device strips 106, and the light 120 transmitted through the sixth optical device strips 106 and the fourth optical device strips 104 are varied in light quantity by transmitting through the optical device strip twice. Therefore, the reflected light 116 transmitted through the optical device 102 twice includes the lights 117, 118, 119 and 120 decreased in light quantity by the third, fourth, fifth and sixth optical device strips 103, 104, 105 and 106, and it is received by the light sensing unit 111 as shown in FIG. 27.

Figure 28:
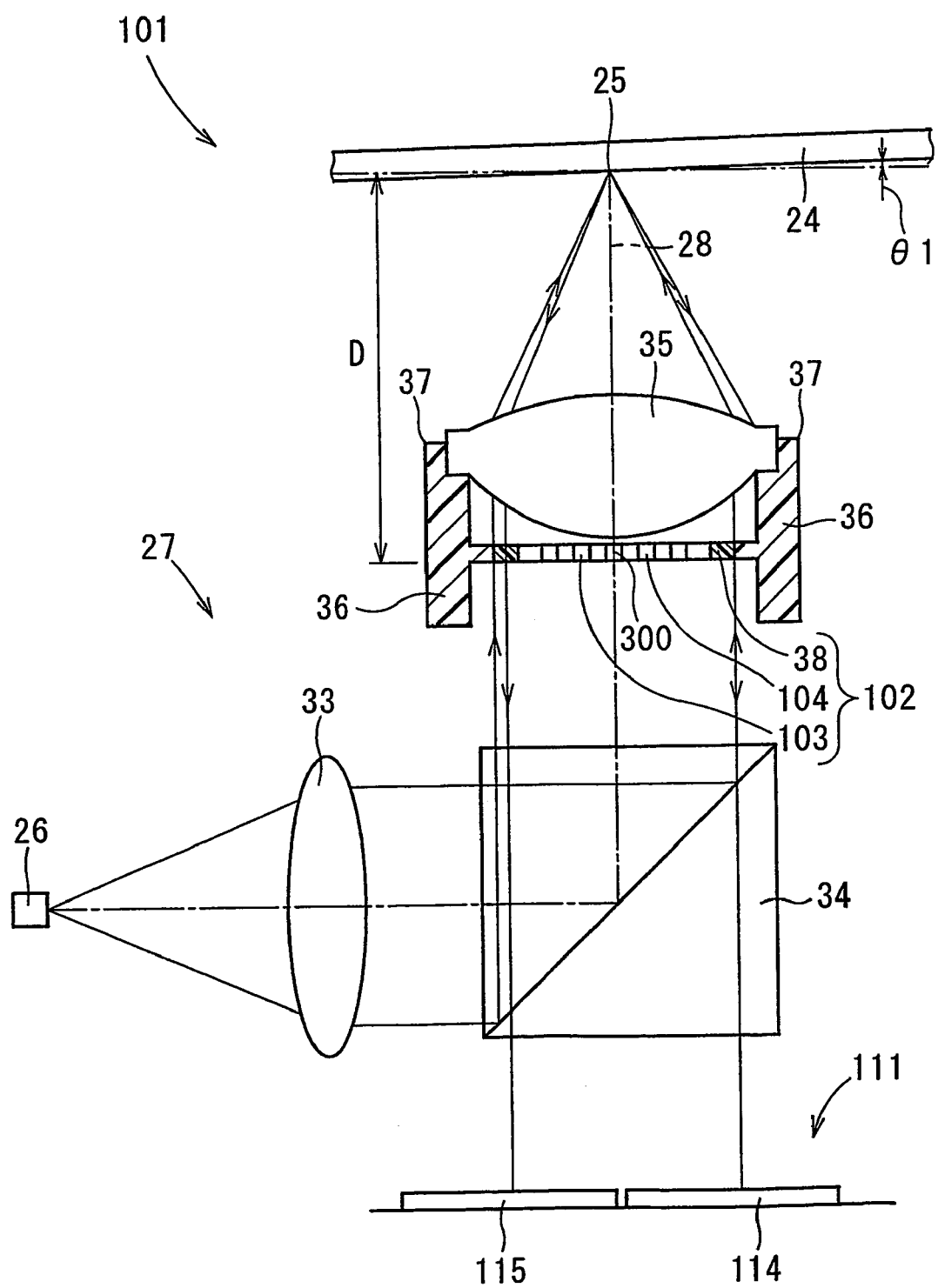
FIG. 28 is a partial cross section simplifiedly illustrating the state in which an optical recording medium 24 is tilting at an angle of $\theta 1$ in the tilt sensing apparatus 101.
Figure 29A:
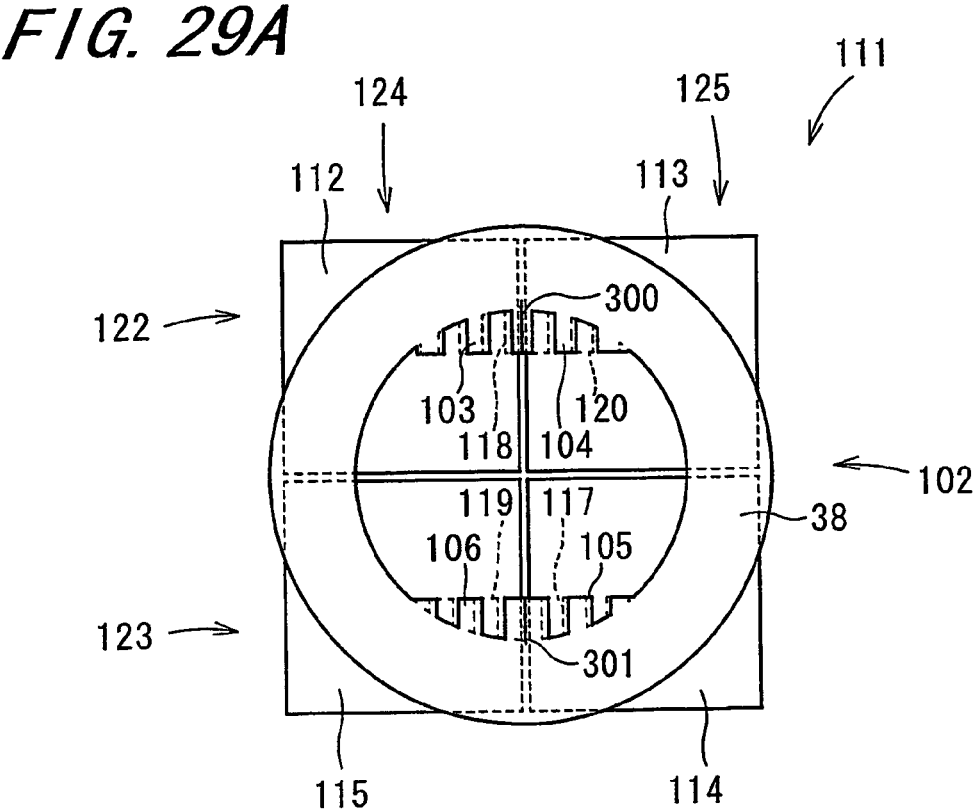
FIGS. 29A and 29B are plan views illustrating the state of the light transmitting through the optical device 102 in the tilt sensing apparatus 101 shown in FIG. 28.
Figure 29B:
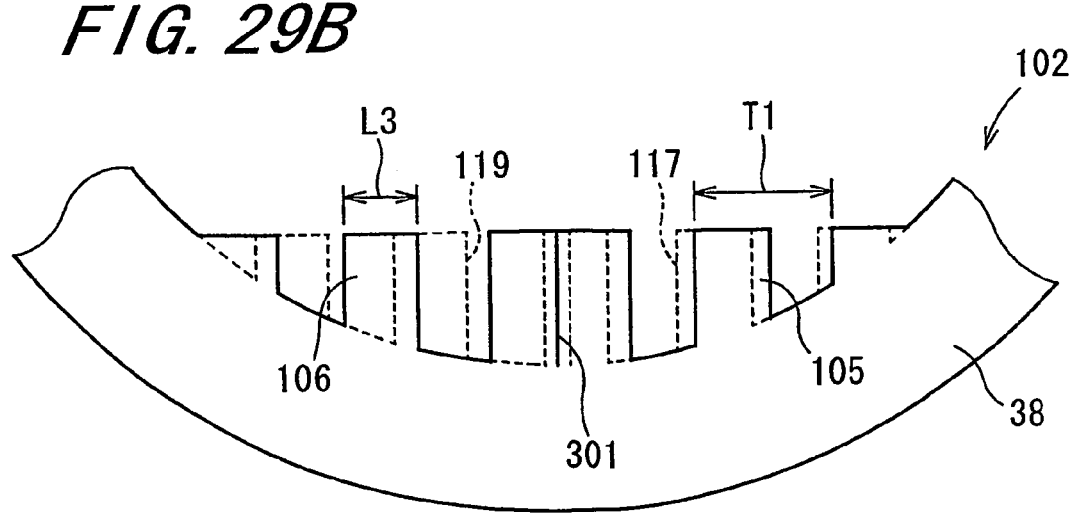
Figure 30:
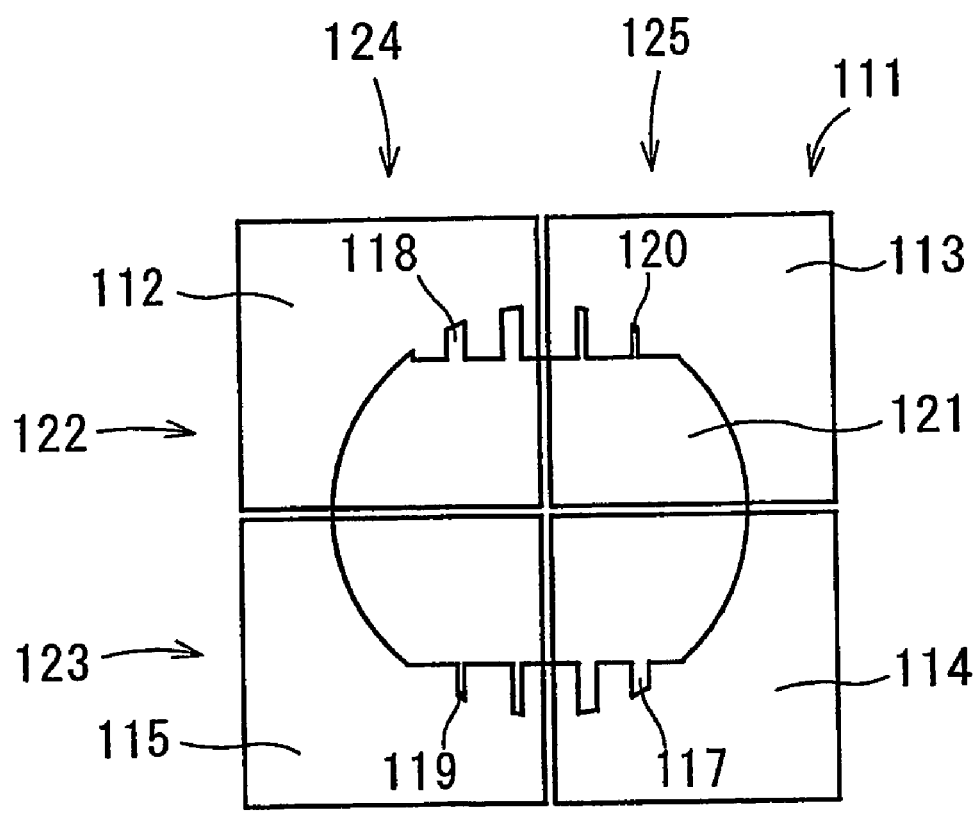
FIG. 30 is a plan view illustrating a reflected light 121 to be received by the light sensing unit 111.

Next, the case of the optical recording medium 24 tilting in the radial direction will be described. FIG. 28 is a partial cross section simplifiedly illustrating the state in which the optical recording medium 24 is tilting at an angle of θ1 in the tilt sensing apparatus 101. FIGS. 29A and 29B are plan views illustrating the state of the light transmitting through the optical device 102 in the tilt sensing apparatus 101 shown in FIG. 28. FIG. 30 is a plan view illustrating a reflected light 121 to be received by the light sensing unit 111.

Because the optical recording medium 24 is tilting to the upper right at an angle of θ1, the optical path of the light condensed onto the optical recording medium 24 by the objective lens 35 and reflected from the optical recording medium 24 is shifted in the right direction on the paper of FIG. 28 as compared with the case of the reflected light when the optical recording medium 24 is untilting, and the position incident on the optical device 102 is also shifted in the right direction. Therefore, the light emitted from the light source 26 and reflected by the optical recording medium 24 is reduced in the area to block the light in transmitting through the third and fifth optical device strips 103 and 105. Accordingly, the light quantity of the reflected light to be received by the fifteenth and seventeenth light receiving elements 112 and 114 is greater than that in the case of the optical recording medium 24 untilting. Furthermore, the light emitted from the light source 26 and reflected by the optical recording medium 24 is increased in the area to block the light in transmitting through the fourth and sixth optical device strips 104 and 106. Therefore, the light quantity of the reflected light to be received by the sixteenth and eighteenth light receiving elements 113 and 115 is smaller than that in the case of the optical recording medium 24 untilting.

Reversely, when the optical recording medium 24 is tilting to the upper left at an angle of θ1, the reflected light from the optical recording medium 24 is shifted in the left direction on the paper of FIG. 28, and the position incident on the optical device is also shifted in the left direction. Therefore, the light emitted from the light source 26 and reflected by the optical recording medium 24 is increased in the area to block the light in transmitting through the third and fifth optical device strips 103 and 105. Accordingly, the light quantity of the reflected light to be received by the fifteenth and seventeenth light receiving elements 112 and 114 is smaller than that in the case of the optical recording medium 24 untilting. Moreover, the light emitted from the light source 26 and reflected by the optical recording medium 24 is reduced in the area to block the light in transmitting through the fourth and sixth optical device strips 104 and 106. Accordingly, the light quantity of the reflected light to be received by the sixteenth and eighteenth light receiving elements 113 and 115 is greater than that in the case of the optical recording medium 24 untilting.

As described above, the light quantity to be received by the light sensing unit 111 is varied corresponding to the tilt in the optical recording medium 24. Thus, suppose the detection signal of the reflected light detected by the fifteenth light receiving element 112 is P6, the detection signal of the reflected light detected by the sixteenth light receiving element 113 is P7, the detection signal of the reflected light detected by the seventeenth light receiving element 114 is P8, and the detection signal of the reflected light detected by the eighteenth light receiving element 115 is P9 when the optical recording medium 24 is tilting. The tilt sensing signal Pg6 expressing the radial tilt can be determined by Equation (12).

$$Pg6 = (P6+P8) - (P7+P9) \qquad (12)$$

When the optical recording medium 24 is untilting, the respective light quantities received by the fifteenth, sixteenth, seventeenth and eighteenth light receiving elements 112, 113, 114 and 115 are the same. Therefore, the respective detection signals detected by the light receiving elements are equal, and thus the tilt sensing signal Pg6 is zero. Additionally, the tilt sensing signal Pg6 is positive when the optical recording medium 24 is tilting to the upper right, and it is negative when the optical recording medium 24 is tilting to the upper left. When the optical recording medium 24 is untilting, the tilt sensing signal Pg6 is zero. Thus, the tilt sensing signal when the optical recording medium 24 is untilting is utilized to determine the radial tilt from the tilt sensing signal with no offset adjustment of the tilt sensing signal.

Here, the third, fourth, fifth and sixth optical device strips 103, 104, 105 and 106 have the array pitch T1 and the shift of the reflected light is (T1)/2 in which the light quantity detected by the light sensing unit 111 varies from the maximum value to the minimum value. Thus, the tilt sensing range $\Delta\theta$ in the tilt sensing apparatus 101 can be expressed by Equation (13).

$$\Delta\theta=(T1)/4D \quad (13)$$

The third optical device strips 103 and the fifth optical device strips 105 have the shift L4 being a quarter of the array pitch T1 in one of the direction points of the straight line 30 of connecting the axis 29 of the optical recording medium 24 to the condensed position 25 where the light emitted from the light source 26 is condensed onto the optical recording medium 24 by the condensing unit 27. The fourth optical device strips 104 and the sixth optical device strips 106 have the shift L5 being a quarter of the array pitch T1 in the other of the direction points of the straight line 30. Therefore, the light quantities received by the fifteenth and seventeenth light receiving elements 112 and 114 take the maximum value when the position where the reflected light from the optical recording medium 24 reaches on the third and fifth optical device strips 103 and 105 is shifted by a quarter in the one of the direction points of the straight line 30, and they take the minimum value when shifted by a quarter in the other of the direction points. Furthermore, the light quantities received by the sixteenth and eighteenth light receiving elements 113 and 115 take the minimum value when shifted by a quarter in one of the direction points of the straight line 30, and they take the maximum value when shifted by a quarter in the other of the direction points. Accordingly, the amount of tilt can be detected accurately regardless of the direction of the optical recording medium 24 tilting to the upper right or upper left.

In addition, the light sensing unit 111 configures two groups of light receiving elements, sixth and seventh light receiving element groups 122 and 123 as two light receiving elements forming each row are formed into one group. The light quantities received by the sixth and seventh light receiving element groups 122 and 123 are varied corresponding to the amount of tilt in the optical recording medium 24 in the tangential direction as similar to the light quantities received by the first and second light receiving elements 46 and 47 forming the light sensing unit 45 in the third embodiment shown in FIG. 11. Therefore, each of the detection signals (P6+P7) and (P8+P9) by the two light receiving element groups 122 and 123 is utilized to determine the tilt sensing signal Pg7 in the tangential direction by Equation (14).

$$Pg7=(P6+P7)-(P8+P9) \quad (14)$$

Furthermore, the light sensing unit 111 configures two groups of light receiving elements, eighth and ninth light receiving element groups 124 and 125 as two light receiving element forming each column are formed into one group. The light quantities received by the eighth and ninth light receiving element groups 124 and 125 are varied corresponding to the movement of the objective lens 35 by tracking control as similar to the light quantities received by the fourth and fifth light receiving elements 59 and 60 forming the light sensing unit 58 in the fourth embodiment shown in FIG. 17. Accordingly, the detection signals (P6+P9) detected by the eighth light receiving element group 124 and the detection signals (P7+P8) detected by the ninth light receiving element group 125 are utilized to determine the lens shift signal Ps1 expressing the movement of the objective lens 35 by Equation (15).

$$Ps1=(P6+P9)-(P7+P8) \quad (15)$$

Figure 31:
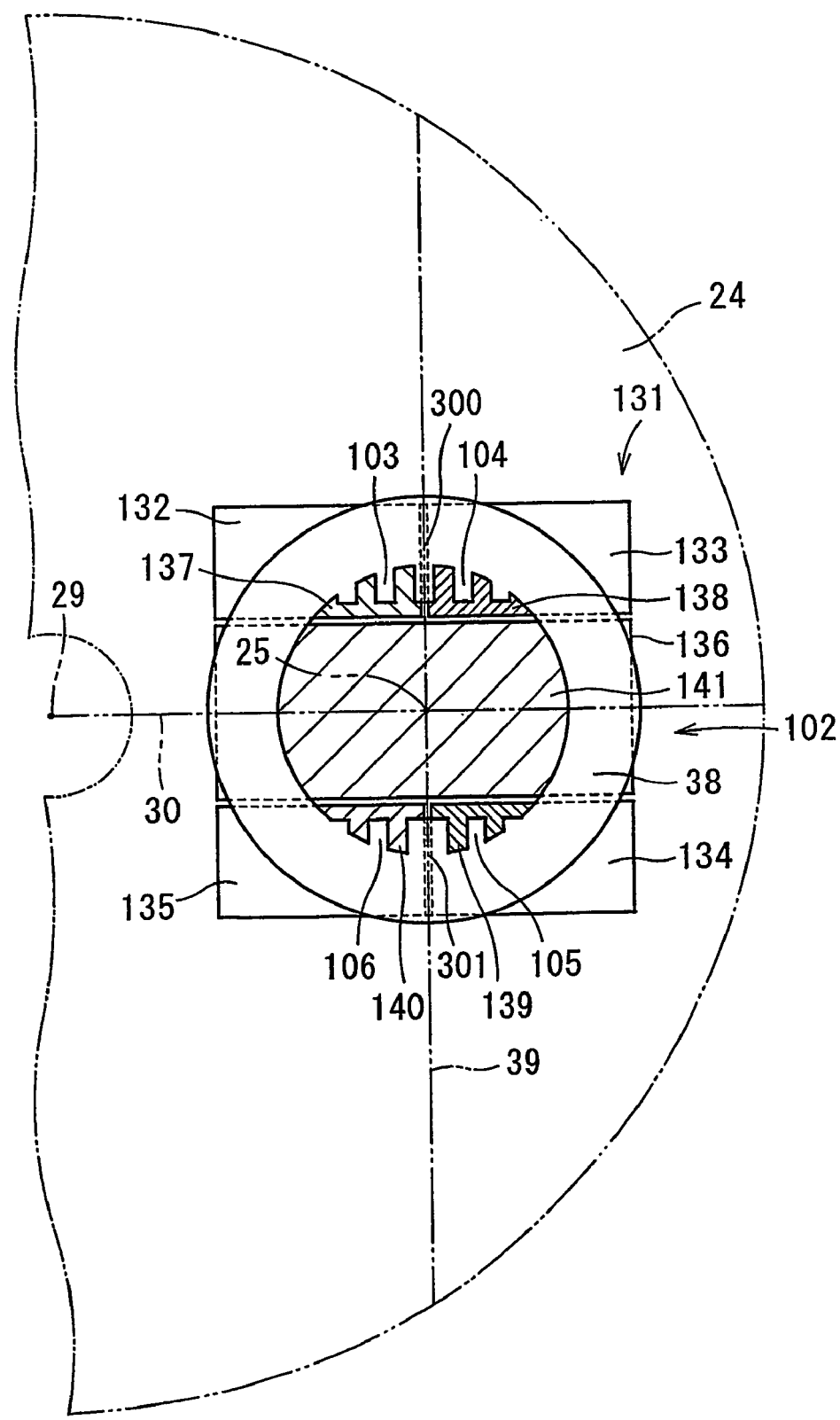
FIG. 31 is a plan view illustrating the simplified configuration of a light sensing unit 131 provided in a tilt sensing apparatus of a ninth embodiment of the invention.

FIG. 31 is a plan view illustrating the simplified configuration of a light sensing unit 131 provided in a tilt sensing apparatus of a ninth embodiment of the invention. The light sensing unit 131 provided in the tilt sensing apparatus of the embodiment is similar to the light sensing unit 111 of the eighth embodiment, and the corresponding portions are designated the same reference numerals and signs, omitting the description. It should be noted that the light sensing unit 131 includes three light receiving elements that have parting lines in the direction parallel to a straight line 30 of connecting an axis 29 of the an optical recording medium 24 to a condensed position 25 where the light emitted from a light source 26 is condensed onto the optical recording medium 24 by a condensing unit 27 and are disposed in the direction orthogonal to the straight line 30. Among three light receiving elements, one light receiving element is split into two parts by a parting line orthogonal to the straight line 30 so as to receive the light transmitted through the area containing third and fourth optical device strips 103 and 104. Another light receiving element is split into two parts by the parting line orthogonal to the straight line 30 so as to receive the light transmitted through the area containing fifth and sixth optical device strips 105 and 106. Thus, the light sensing unit 35 includes five light receiving elements, nineteenth, twentieth, twenty-first, twenty-second and twenty-third light receiving elements 132, 133, 134, 135 and 136.

The nineteenth light receiving element 132 receives the light transmitted through an area 137 containing the third optical device strips 103. The twentieth light receiving element 133 receives the light transmitted through an area 138 containing the fourth optical device strips 104. The twenty-first light receiving element 134 receives the light transmitted through an area 139 containing the fifth optical device strips 105. The twenty-second light receiving element 135 receives the light transmitted through an area 140 containing the sixth optical device strips 106.

In the light sensing unit 111 provided in the tilt sensing apparatus. 101 of the eighth embodiment, all the light quantities of the reflected light to be received are used as the detection signals to determine the amount of tilt in the optical recording medium 24 and the lens shifts. According to this operating method, the detection signals are varied under the influence of the light diffracted by the optical recording medium 24. Thus, the detection signals by the nineteenth, twentieth, twenty-first and twenty-second light receiving elements 132, 133, 134 and 135 are used to further enhance the detection accuracy of the amount of tilt in the optical recording medium 24 and the lens shifts.

Suppose the detection signal of the reflected light detected by the nineteenth light receiving element 132 is P1, the detection signal of the reflected light detected by the twentieth light receiving element 133 is P12, the detection signal of the reflected light detected by the twenty-first light receiving element 134 is P13, and the detection signal of the reflected light detected by the twenty-second light receiving element 134 is P14. The tilt sensing signal Pg8 expressing the radial tilt is determined by Equation (16), the tilt sensing signal Pg9 expressing the tangential tilt is determined by Equation (17), and the lens shift signal Ps2 expressing the movement of an objective lens 35 is determined by Equation (18).

$$Pg8=(P11+P13)-(P12+P14) \quad (16)$$

$$Pg9=(P11+P12)-(P13+P14) \quad (17)$$

$$Ps2=(P11+P14)-(P12+P13) \quad (18)$$

Accordingly, the influence of the diffracted light by the optical recording medium 24 can be reduced. In addition, the Equations (16) to (18) are affected by the variations in the light intensity of the reflected light caused by the output variations in the laser provided in the light source 26 and the variations in the reflectance of the optical recording medium 24. On this account, the detection signal that the sum signals (P11+P13), (P12+P14), (P11+P12), (P13+P14), (P11+P14) and (P12+P13) are divided by the detection signal P15 detected by the twenty-third light receiving element 136 for receiving the light transmitted through a remaining area 141 containing the third, fourth, fifth and sixth optical device strips 103, 104, 105 and 106 is utilized, whereby the influence of the variations in the light intensity can be cancelled.

Here, the lens shift signal Ps1 detected in the tilt sensing apparatus 101 of the eighth embodiment, and the lens shift signal Ps2 detected in the tilt sensing apparatus of the ninth embodiment include the influence of position shifts of the reflected light due to the tilt of the optical recording medium 24 as well. On this account, the lens shift signals Ps1 and Ps2 need to be corrected.

Suppose the lens shift signals after corrected are Ps4 and Ps5, and the correction coefficient is a. The lens shift signals Ps4 and Ps5 can be determined by Equations (19) and (20).

$$Ps4 = Ps1 - a \times Pg6 \tag{19}$$

$$Ps5 = Ps2 - a \times Pg8 \tag{20}$$

Here, the correction coefficient is equivalent to a proportionality constant of the influence of position shifts of the reflected light due to the tilt of the optical recording medium 24 upon the lens shift signals. If it is assumed that the values of the lens shift signals Ps1 and Ps2 are Ps 10 and Ps 20, respectively, in the absence of lens shifts but in the presence of radial tilts, the correction coefficient can be determined by Equation (21) below:

$$a = Ps10/Pg6 \text{ (or } a = Ps20/Pg8) \tag{21}$$

Figure 32:
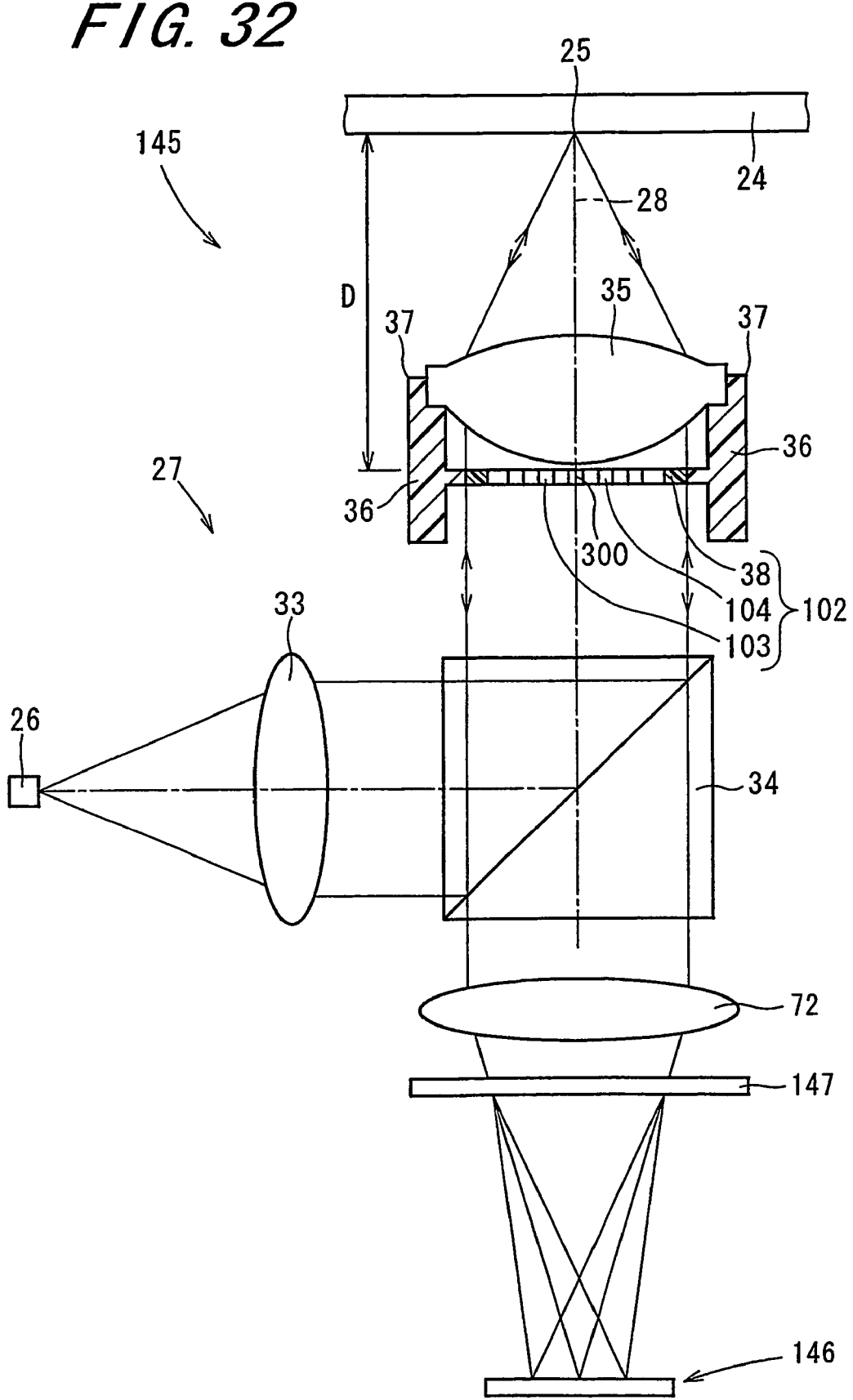
FIG. 32 is a partial cross section illustrating the simplified configuration of a tilt sensing apparatus 145 of a tenth embodiment of the invention.

FIG. 32 is a partial cross section illustrating the simplified configuration of a tilt sensing apparatus 145 of a tenth embodiment of the invention. The tilt sensing apparatus 145 of the embodiment is similar to the tilt sensing apparatus 101 of the eighth embodiment, and the corresponding portions are designated the same reference numerals and signs, omitting the description. It should be noted that the tilt sensing apparatus 145 has a diffraction grating 147 and the condenser lens 72 between an optical device 102 and a light sensing unit 146. In FIG. 32, the light sensing unit 146 is shown by a receiving element for convenience.

Figure 33:
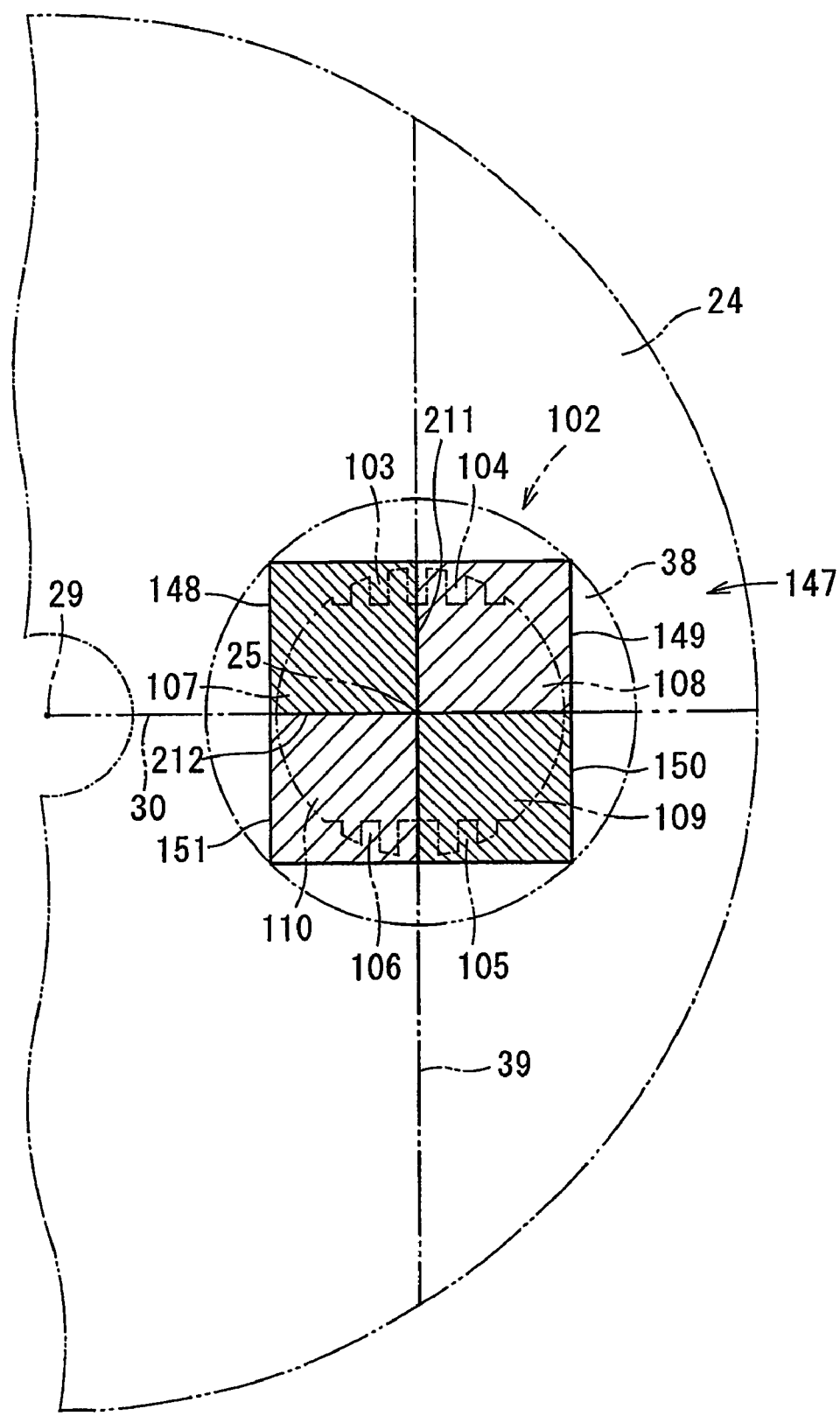
FIG. 33 is a plan view illustrating a diffraction grating 147 provided in the tilt sensing apparatus 145.
Figure 34:
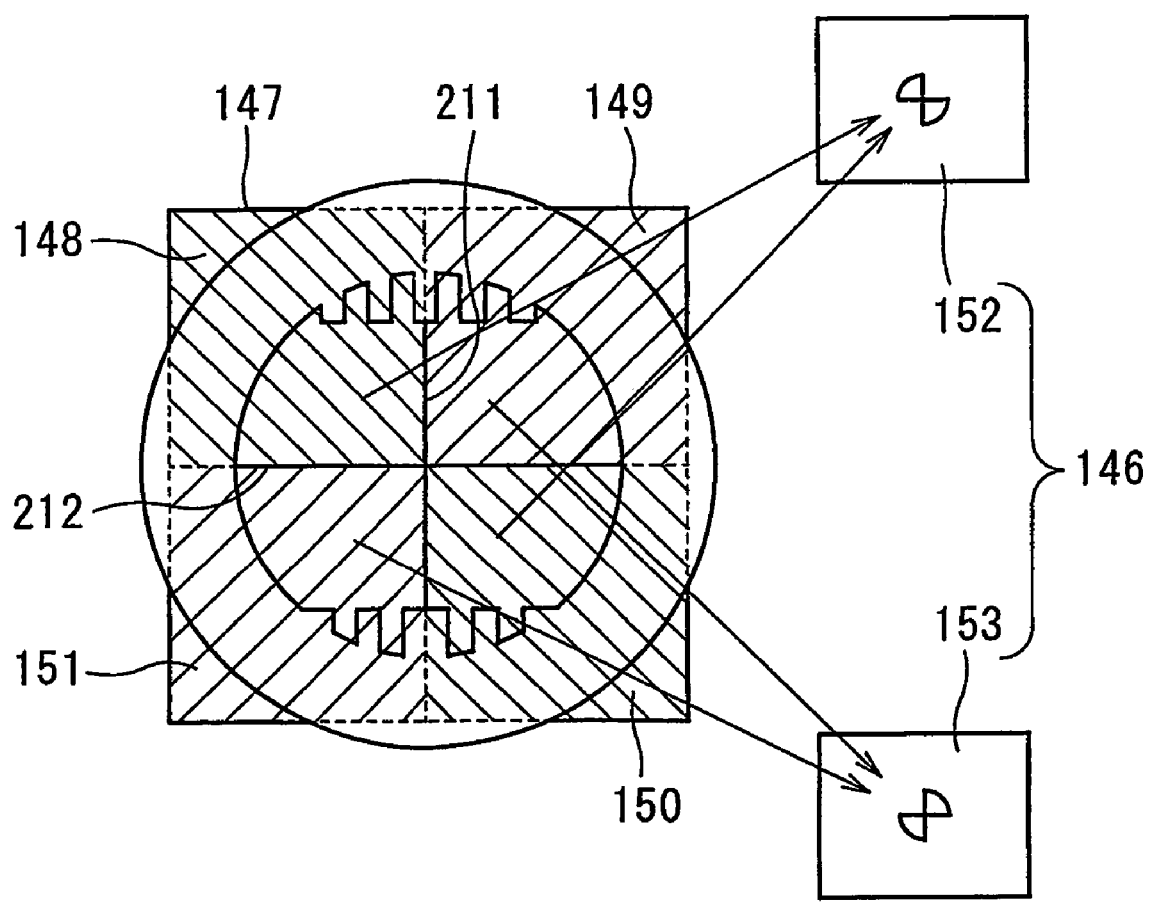
FIG. 34 is a diagram illustrating the optical relationship between the diffraction grating 147 and a light sensing unit 146.

FIG. 33 is a plan view illustrating the diffraction grating 147 provided in the tilt sensing apparatus 145. FIG. 34 is a diagram illustrating the optical relationship between the diffraction grating 147 and a light sensing unit 146. The diffraction grating 147 has four diffraction regions, fourth, fifth, sixth and seventh diffraction regions 148, 149, 150 and 151 arranged in a matrix of two lines and two columns and having parting lines 211 and 212 in the direction parallel to a straight line 30 of connecting an axis 29 of an optical recording medium 24 to a condensed position 25 where the light emitted from a light source 26 is condensed onto the optical recording medium 24 by a condensing unit 27 and in the direction orthogonal to the straight line 30. The grating shape of the diffraction grating 147 is defined by setting the diffraction pattern of each diffraction region in such a manner as to attain desired signals. For example, grating shapes of the adjacent diffraction regions are different from each other. The diffraction grating 147 is further formed so that the grating shape of the fourth diffraction region 148 where the light transmitted through an area 107 containing third optical device strips 103 enters is equal to the grating shape of the sixth diffraction region 150 where the light transmitted through an area 109 containing fifth optical device strips 105 enters. The grating shape of the fifth diffraction region 149 where the light transmitted through an area 108 containing fourth optical device strips 104 enters is formed equal to the grating shape of the seventh diffraction region 151 where the light transmitted through an area 110 containing sixth optical device strips 106 enters. In FIGS. 33 and 34, parting lines 211 and 212 are shown overlapped with the straight line 30 and a straight line 39 orthogonal to the straight line 30 and passing through the condensed position 25. In addition, a border line 300 between the third optical device strips 103 and the fourth optical device strips 104 and a border line 301 between the fifth optical device strips 105 and the sixth optical device strips 106 are omitted for convenience.

As shown in FIG. 34, the light sensing unit 146 includes twenty-fourth and twenty-fifth light receiving elements 152 and 153. The twenty-fourth light receiving element 152 receives the light transmitted through the area 107 containing the third optical device strips 103 and diffracted by the fourth diffraction region 148 and the light transmitted through the area 109 containing the fifth optical device strips 105 and diffracted by the sixth diffraction region 150, among the lights reflected by the optical recording medium 24. The twenty-fifth light receiving element 153 receives the light transmitted through the area 108 containing the fourth optical device strips 104 and diffracted by the fifth diffraction region 149 and the light transmitted through the area 110 containing the sixth optical device strips 106 and diffracted by the seventh diffraction region 151, among the lights reflected by the optical recording medium 24.

The light transmitted through the optical device 102, reflected by the optical recording medium 24 and again transmitted through the optical device 102 passes through a beam splitter 34 and it enters the diffraction grating 147. The light entered the diffraction grating 147 is diffracted by the separate diffraction regions and it is received by the respective light receiving elements of the light sensing unit 146. The detection signals detected by the twenty-fourth and twenty-fifth light receiving elements 152 and 153 can be considered to correspond to the detection signals obtained by the fifteenth, sixteenth, seventeenth and eighteenth light receiving elements 112, 113, 114 and 115 shown in FIG. 24. The detection signal detected by the twenty-fourth light receiving element 152 corresponds to the sum signal (P6+P8), and the detection signal detected by the twenty-fifth light receiving element 153 corresponds to the sum signal (P7+P9). Thus, the radial tilt in the optical recording medium 24 can be detected by the Equation (12) for determining the tilt sensing signal Pg6 expressing the radial tilt.

Figure 35:
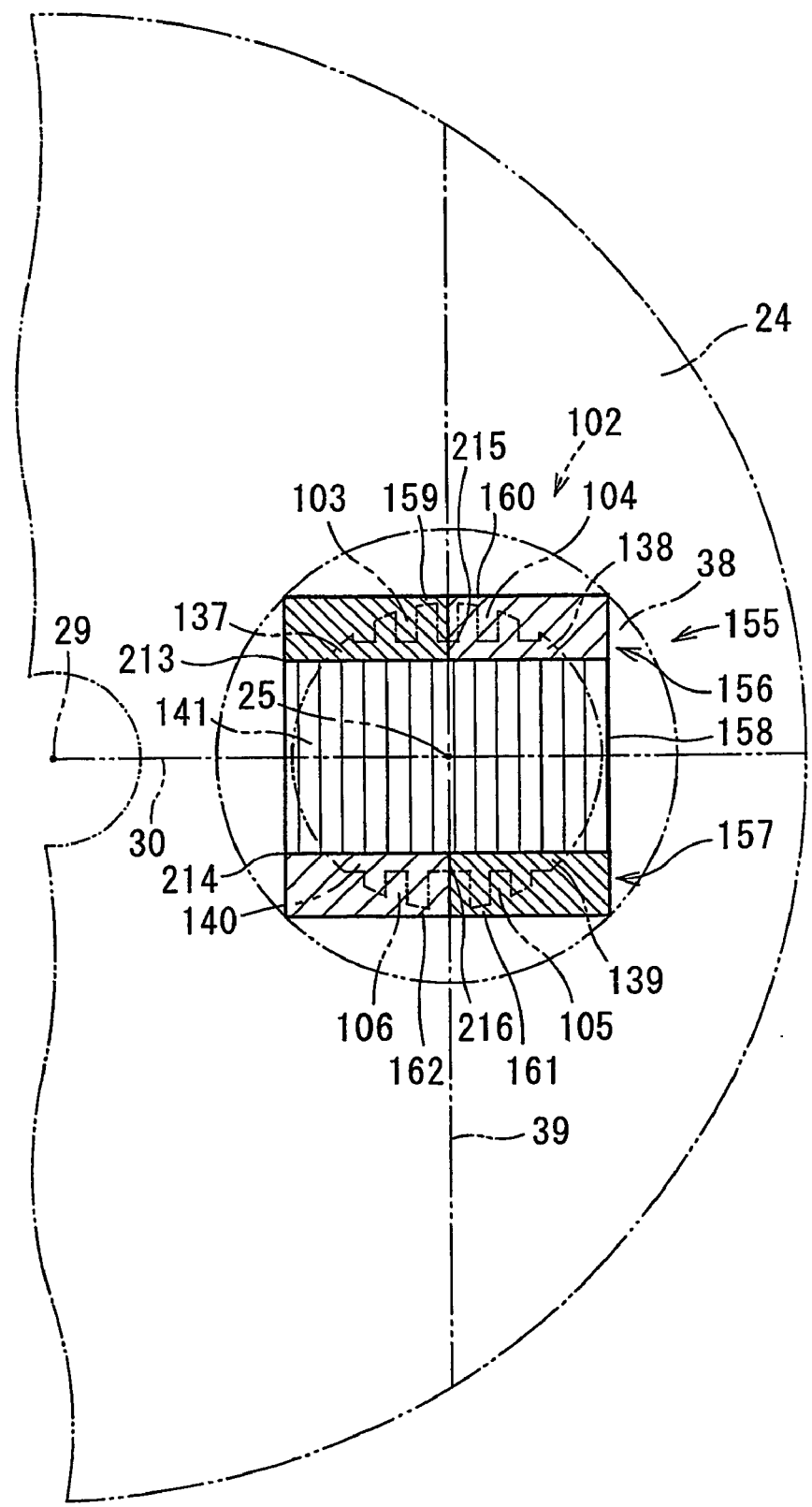
FIG. 35 is a plan view illustrating a diffraction grating 155 provided in a tilt sensing apparatus of an eleventh embodiment of the invention.

FIG. 35 is a plan view illustrating a diffraction grating 155 provided in a tilt sensing apparatus of an eleventh embodiment of the invention. The diffraction grating 155 is similar to the diffraction grating 147 provided in the tilt sensing apparatus 145 of the tenth embodiment, and the corresponding portions are designated the same reference numerals and signs, omitting the description. It should be noted that the diffraction grating 155 has three diffraction regions, eighth, ninth and tenth diffraction regions 156, 157 and 158 arranged in a column in the direction orthogonal to the straight line 30 and having parting lines 213 and 214 parallel to the straight line 30 of connecting an axis 29 of an optical recording medium 24 to a condensed position 25 where the light emitted from a light source 26 is condensed by a condensing unit 27. Among the eighth, ninth and tenth diffraction regions 156, 157 and 158, the eighth diffraction region 156 has two small diffraction regions, first and second small diffraction regions 159 and 160 disposed adjacently in the direction parallel to the straight line 30, so that the lights transmitted trough areas 137 and 138 containing third and fourth optical device strips 103 and 104 enter. The ninth diffraction region 157 has two small diffraction regions, third and fourth small diffraction regions 161 and 162 disposed adjacently in the direction parallel to the straight line 30, so that the lights transmitted through areas 139 and 140 containing fifth and sixth optical device strips 105 and 106 enter. Additionally, in FIG. 35, a parting line 215 between the first small diffraction region 159 and the second small diffraction region 160 and a parting line 216 between the third small diffraction region 161 and the fourth small diffraction region 162 are shown overlapped with a straight line 39 orthogonal to the straight line 30 and passing through the condensed position 25. Furthermore, a border line 300 between the third optical device strips 103 and the fourth optical device strips 104 and a border line 301 between the fifth optical device strips 105 and the sixth optical device strips 106 are omitted for convenience.

Figure 36:
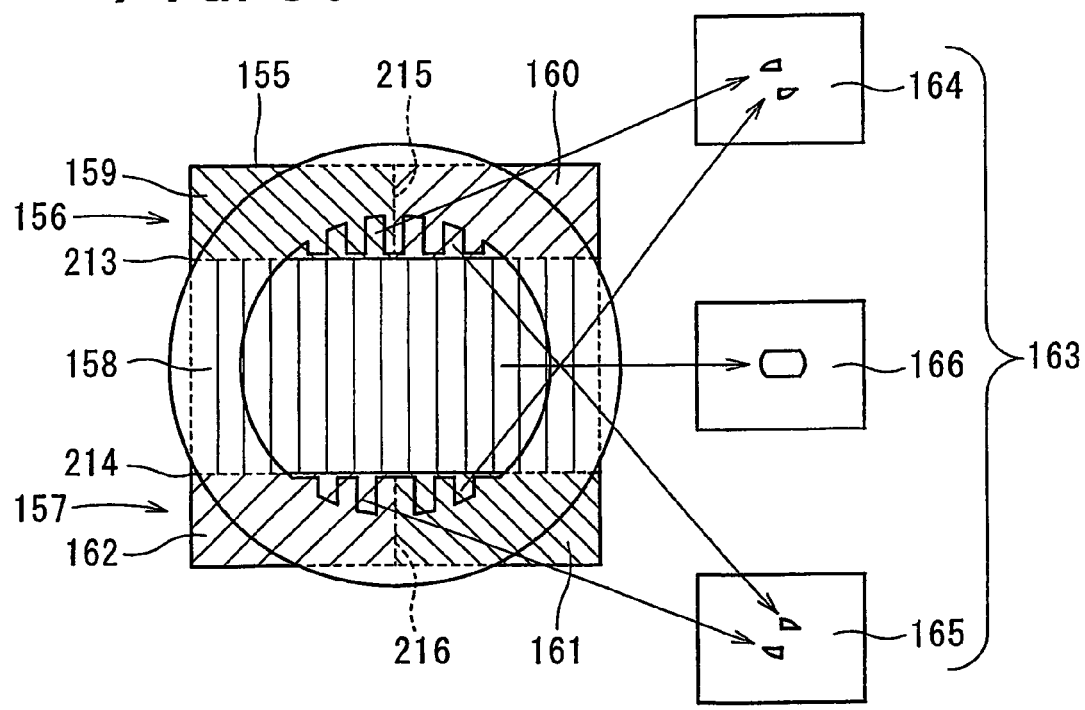
FIG. 36 is a diagram illustrating the optical relationship between the diffraction grating 155 and a light sensing unit 163.

FIG. 36 is a diagram illustrating the optical relationship between the diffraction grating 155 and a light sensing unit 163. The light sensing unit 163 includes twenty-sixth, twenty-seventh and twenty-eighth light receiving elements 164, 165 and 166. The twenty-sixth light receiving element 164 receives the diffracted light by the first small diffraction region 159 where the light transmitted through the area 137 containing the third optical device strips 103 enters and the diffracted light by the third small diffraction region 161 where the light transmitted through the area 139 containing the fifth optical device strips 105 enters. The twenty-seventh light receiving element 165 receives the diffracted light by the second small diffraction region 160 where the light transmitted through the area 138 containing the fourth optical device strips 104 enters and the diffracted light by the fourth small diffraction region 162 where the light transmitted through the area 140 containing the sixth optical device strip 106 enters. The twenty-eighth light receiving element 166 receives the diffracted light by the tenth diffraction region 158 where the light transmitted through a remaining area 141 containing the third, fourth, fifth and sixth optical device strips 103, 104, 105 and 106 enters.

The detection signals detected by the three light receiving elements 164, 165 and 166 can be considered to correspond to the detection signals detected by the nineteenth, twentieth, twenty-first, twenty-second and twenty-third light receiving element 132, 133, 134, 135 and 136 shown in FIG. 31. The detection signal detected by the twenty-sixth light receiving element 164. corresponds to the sum signal (P11+P13). The detection signal detected by the twenty-seventh light receiving element 165 corresponds to the sum signal (P12+P14). The detection signal detected by the twenty-eighth light receiving element 166 corresponds to the detection signal P15. Therefore, the radial tilt in the optical recording medium 24 can be determined by the Equation (16) for determining the tilt sensing signal Pg8 expressing the radial tilt.

Moreover, to detect the radial tilt, the detection signal P15 detected by the twenty-eighth light receiving element 166 is utilized to cancel the influence of the light intensity, and the tilt detection signal not subject to the variations in the intensity may be utilized.

According to the tenth and eleventh embodiments, an arithmetic circuit for calculating the sum signals does not need to be disposed, and the numbers of the light receiving elements can be decreased. Thus, the simplified, scaled-down apparatus and the cost reduction can be realized.

Figure 37:
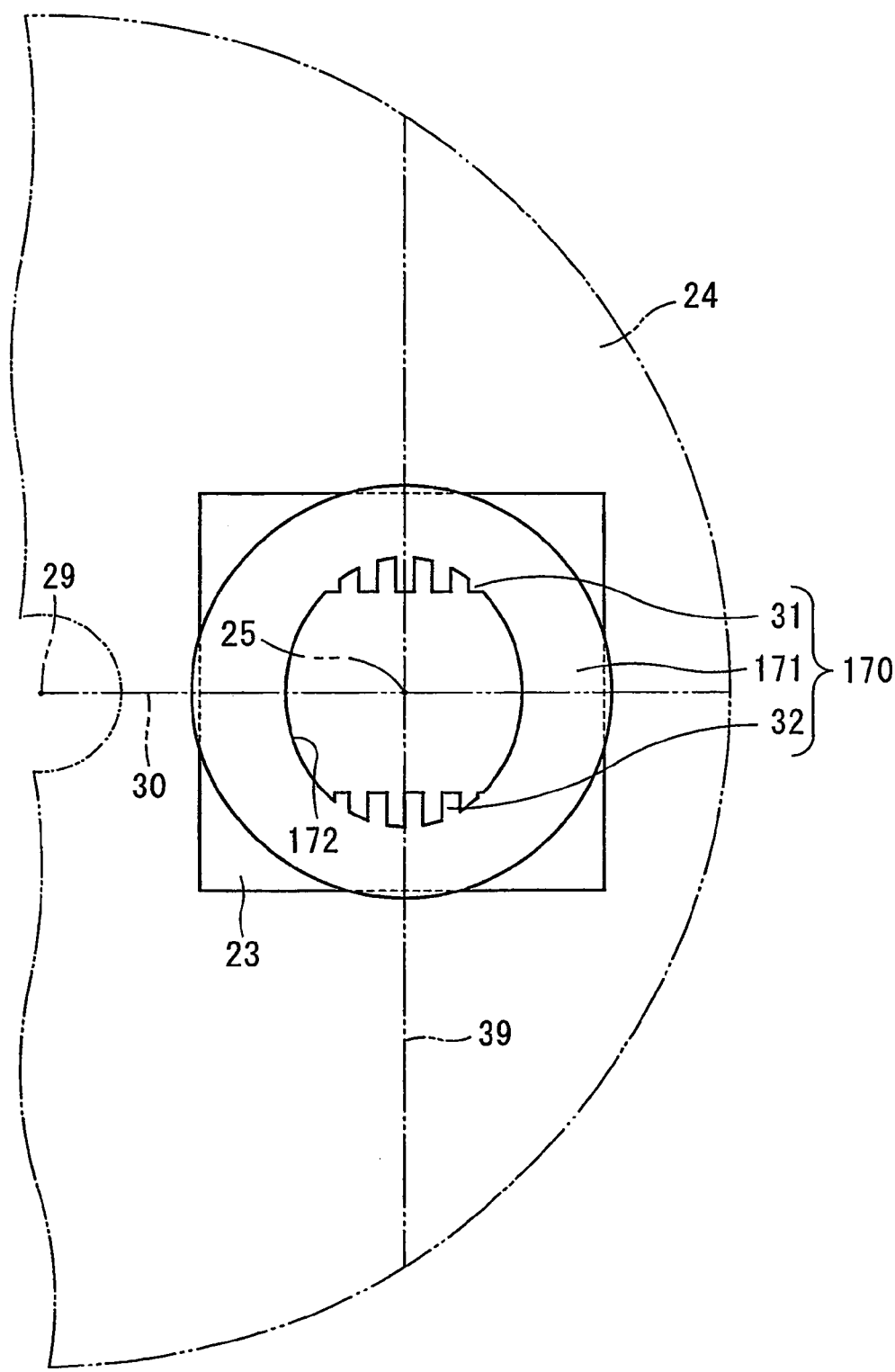
FIG. 37 is a plan view illustrating the simplified configuration of an optical device 170 provided in a tilt sensing apparatus of a twelfth embodiment of the invention.

FIG. 37 is a plan view illustrating the simplified configuration of an optical device 170 provided in a tilt sensing apparatus of a twelfth embodiment of the invention. The optical device 170 is similar to the optical device 22 of the first embodiment, and the corresponding portions are designated the same reference numerals and signs, omitting the description. It should be noted that an opening shape 172 formed in an optical device main body 171 has the length in the direction orthogonal to a straight line 30 of connecting an axis 29 of an optical recording medium 24 to a condensed position 25 where the light emitted from a light source 26 is condensed onto the optical recording medium 24 by a condensing unit 27 longer than the length in the direction parallel to the straight line 30.

In recording or reproducing information on the optical recording medium 24, the resolution is reduced when the light spot diameter condensed onto the optical recording medium 24 is greater than the optimal light spot diameter, and thus recording and reproducing properties are decreased. When the light spot diameter is smaller than the optimal light spot diameter, the resolution is increased and the recording and reproducing properties are enhanced, but even a very small tilt in the optical recording medium 24 causes shifts from the desired condensed position. On this account, it is necessary to keep the light spot diameter optimal to the optical recording medium 24.

In this embodiment, since light is shielded by the first and second optical device strips 31 and 32, the numerical aperture (NA) decreases in the tangential direction, and consequently the light spot diameter proportional to $\lambda/NA$ is increased only in the tangential direction. With this in view, the optical device 170 is preferably given an elliptic opening and is so designed that the tangential length is made longer than the radial length. By so doing, it is possible to cancel out the influence of reduction in NA resulting from light shielding carried out by the first and second optical device strips 31 and 32. Consequently, the light spot diameter can be prevented from increasing only in the tangential direction. Moreover, the optical device having the third through sixth optical device strips 103, 104, 105, and 106 may be so designed as to have an opening whose shape is the same as that in this embodiment.

Figure 38:
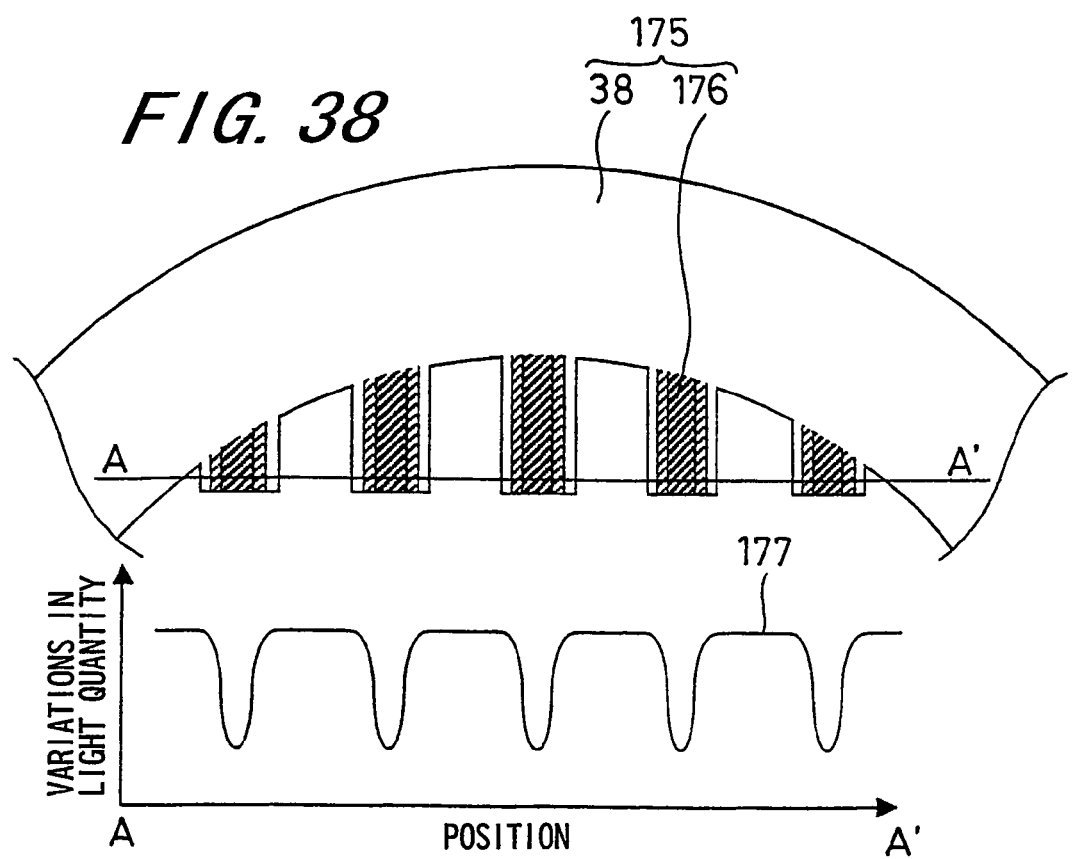
FIG. 38 is an enlarged view of the essential part illustrating the simplified configuration of an optical device 74 provided in a tilt sensing apparatus of a thirteenth embodiment of the invention.

FIG. 38 is an enlarged view of the essential part illustrating the simplified configuration of an optical device 175 provided in a tilt sensing apparatus of a thirteenth embodiment of the invention. The optical device 175 of the embodiment is similar to the optical device 22 provided in the tilt sensing apparatus 21 of the first embodiment, and the corresponding portions are designated the same reference numerals and signs, omitting the description. It should be noted that first and second optical device strips 31 and 32 provided in the optical device 175 are formed of a light filter 176.

The light transmittance distribution of the light filter 176 in the direction of a line A–A' shown in FIG. 38 is depicted by a third line 177 as the light quantity variations. In this manner, the light filter 176 can also block the light, and thus the light filter 176 can be used as optical device strips. Additionally, the light filter 176 is available at low cost, and therefore it can contribute to cost reduction. Furthermore, the light filter 176 may be used for the third, fourth, fifth and sixth optical device strips 103, 104, 105 and 106 provided in optical device 102 of the seventh embodiment.

As described above, according to the first to thirteenth embodiments, the tilt sensing apparatuses 21, 52, 74, 101 and 145 are the tilt sensing apparatus provided with the condensing unit 27, but they are not limited to this, which may be the tilt sensing apparatus provided with an irradiating unit and without the condensing unit. In addition, the light reflector 24 is the optical recording medium, but it is not limited to this. Those reflecting light can detect the amount of tilt.

Furthermore, the first, second, third, fourth, fifth and sixth optical device strips 31, 32, 103, 104, 105 and 106 are approximately rectangular. The first and second optical device strips 31 and 32 are formed so as to have the shift L2 from the positions of axial symmetry about the optical axis 28 which shift is a quarter of the array pitch in the direction of the straight line 30 of connecting the axis 29 of the optical recording medium 24 to the condensed position 25 where the light emitted from the light source 26 is condensed onto the optical recording medium 24 by the condensing unit 27. The third and fifth optical device strips 103 and 105 are formed to have the shift L4 being a quarter of the array pitch T1 in one of the direction points of the straight line 30. The fourth and sixth optical device strips 104 and 106 are formed to have the shift L5 being a quarter of the array pitch T1 in the other of the direction points of the straight line 30. However, the shapes, numbers, shift directions and shifts for each of the optical device strips may be set arbitrarily without limiting to these, as long as satisfying the conditions of forming them to shift from the positions of axial symmetry about the optical axis 28 in the direction of the straight line 30.

Moreover, the third through sixth optical device strips 103, 104, 105, and 106 are so formed as to be axisymmetrical about the straight line 303 which passes through the center 302 of the optical device 102 and is perpendicular to the straight line 30 of connecting the axis 29 of the optical recording medium 24 to the condensed position 25 where the light emitted from the light source is condensed onto the recording medium 24 by the condensing unit 27. The tilt sensing signal is zero when the optical recording medium 24 is untilting in the radial direction. However, they are not limited to this, which do not have the tilt sensing signal of zero when untilting. For example, in the case where the numbers of the third and fifth optical device strip 103 and 105 and the numbers of the fourth and sixth optical device strips 104 and 106 are set arbitrarily and the tilt sensing signal is not zero when the optical recording medium 24 is untilting in the radial direction, such the configuration is acceptable that the tilt sensing signal when the optical recording medium 24 is untilting is stored in a storing unit beforehand, the stored tilt sensing signal is operated by an arithmetic circuit from the detected tilt sensing signal, and the signal operated by the arithmetic circuit is used as the tilt sensing signal.

Additionally, according to the eighth to eleventh embodiments, the optical device 102 is configured to have four optical device strips, the third, fourth, fifth and sixth optical device strip 103, 104, 105 and 106. However, it is acceptable that the optical device is configured to have at least four optical device strips without limiting to this. At this time, the shapes, numbers, shift directions and shifts for each of the optical device strips may be set arbitrarily. Furthermore, the numbers of the light receiving elements in the light sensing unit may be set arbitrarily.

Figure 39:
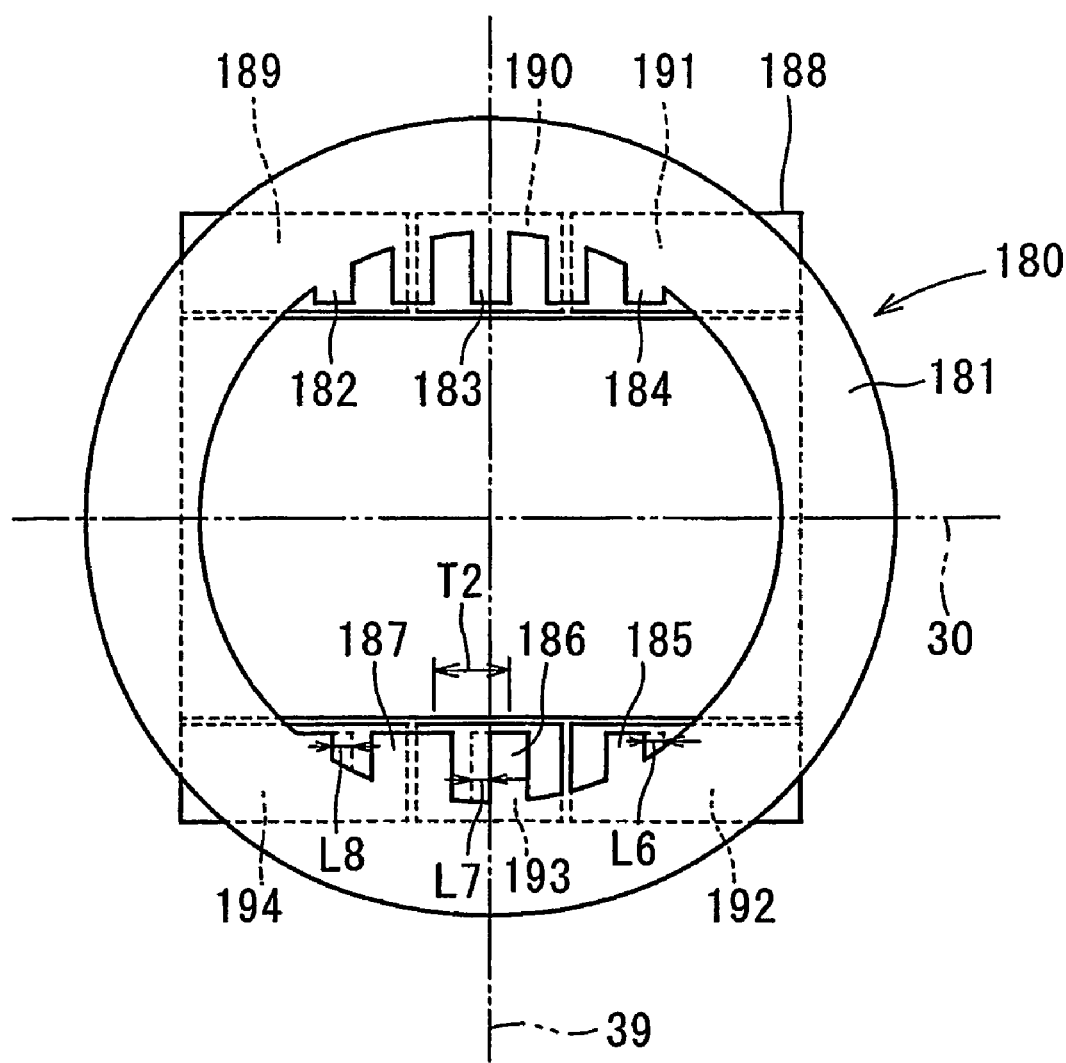
FIG. 39 is a plan view illustrating an optical device and a light sensing unit.
Figure 40:
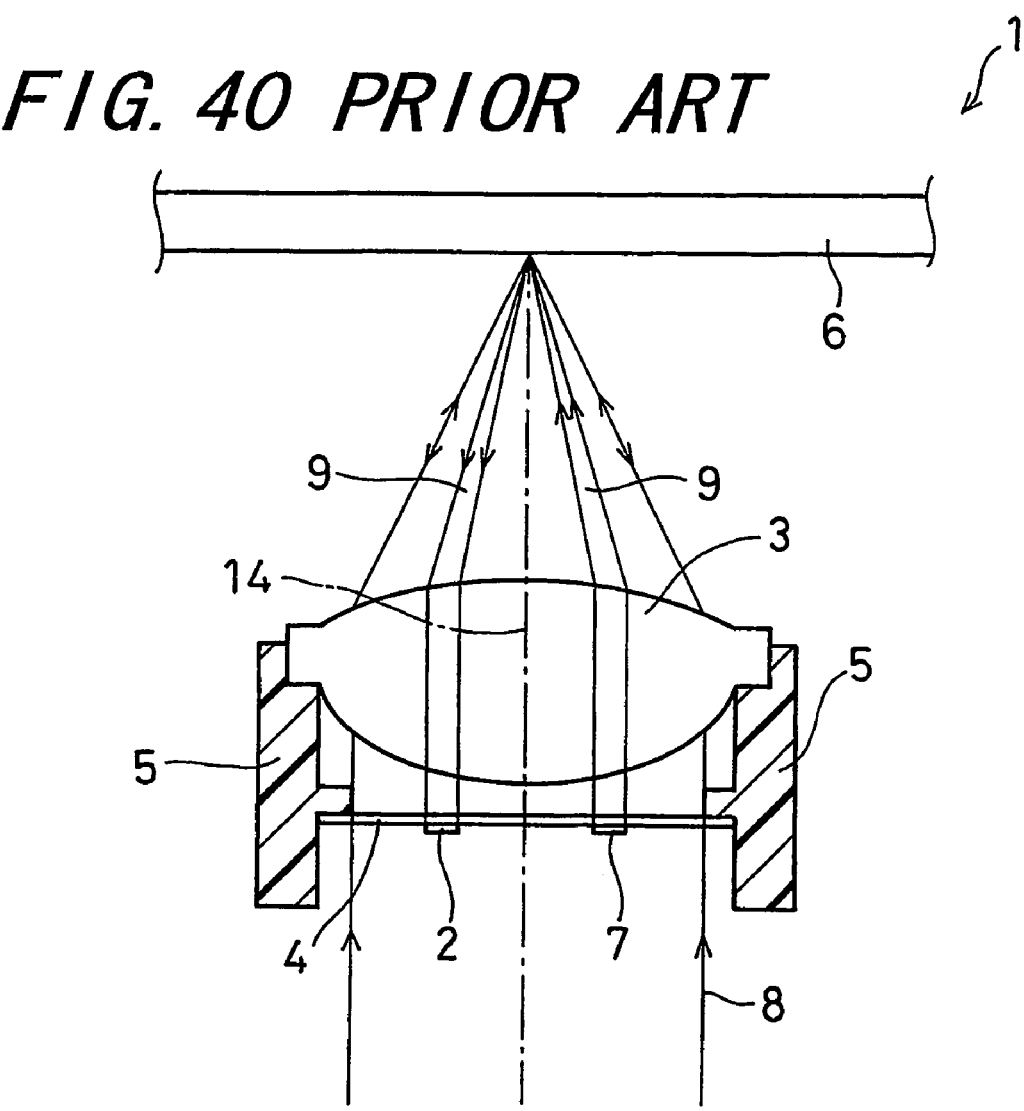
FIG. 40 is a partial cross section illustrating the simplified configuration of the traditional tilt sensing apparatus 1.
Figure 41:
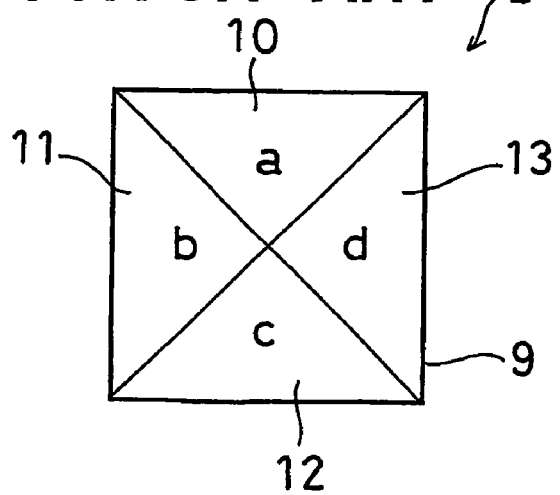
FIG. 41 is a plan view illustrating the simplified configuration of the light sensing unit 2 provided in the traditional tilt sensing apparatus 1.
Figure 42:
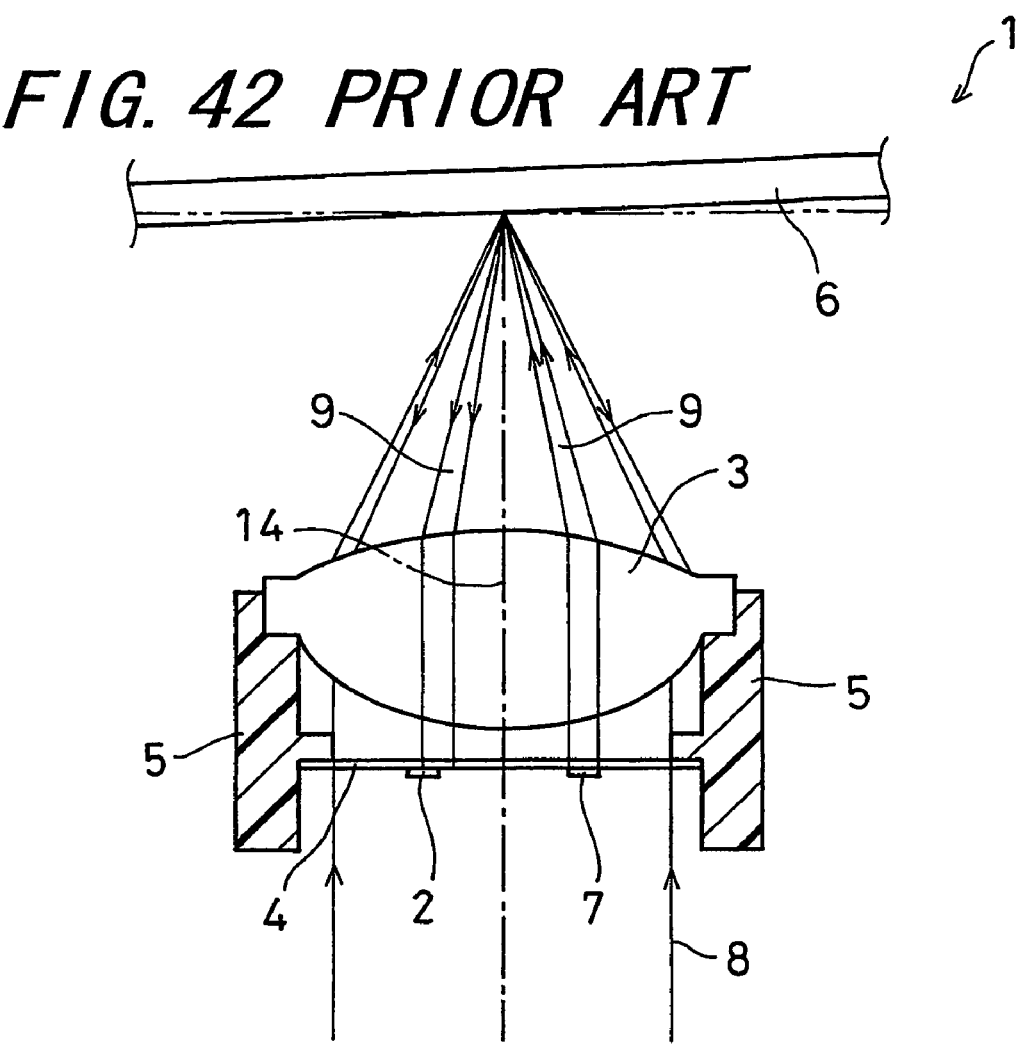
FIG. 42 is a partial cross section illustrating the state in which the optical recording medium 6 is tilting in the traditional tilt sensing apparatus 1.
Figure 43:
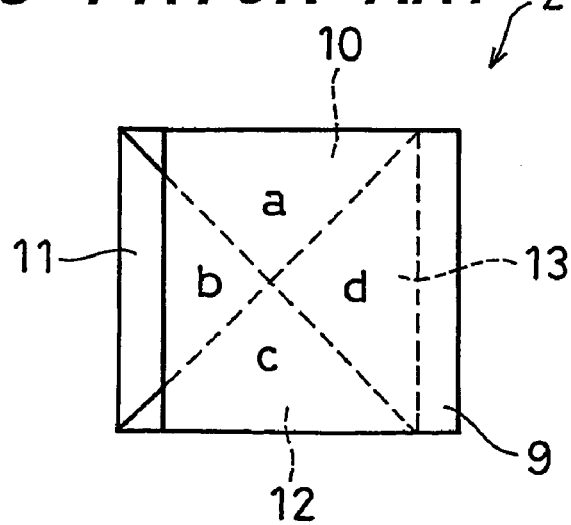
FIG. 43 is a plan view illustrating the position where the light shielded portion 9 reaches on the light sensing unit 2.

For example, in the tilt sensing apparatus including the optical device provided with six optical device strips, the seventh to twelfth optical device strips, the tilt sensing signal is detected as follows. FIG. 39 is a plan view illustrating an optical device 180 and a light sensing unit 188. The seventh to twelfth optical device strips 182, 183, 184, 185, 186, 187 have an approximately rectangular cross section orthogonal to the optical axis, and they are formed in plurals as extending from the optical device main body 181 at the positions of axial symmetry about the optical axis at a predetermined array pitch T2 in the direction of the straight line 30 of connecting the axis 29 of the optical recording medium 24 to the condensed position 25 where the light emitted from the light source 26 is condensed onto the optical recording medium 24 by the condensing unit 27. The seventh optical device strips 182 and the tenth optical device strips 185 have a shift L6 of (T2)/4 in one of the direction points of the straight line 30 from the position of axial symmetry about the optical axis. The eighth optical device strips 183 and the eleventh optical device strips 186 have a shift L7 of (T2)/4 in the other of the direction points of the straight line 30 from the position of axial symmetry about the optical axis. The ninth optical device strips 184 and the twelfth optical device strips 187 have a shift L8 of (T2)/4 in one of the direction points of the straight line 30 from the position of axial symmetry about the optical axis. Furthermore, when each of the optical device strips is appropriately set, each of the optical device strips can be formed so that the area to block the light transmitting through the optical device by the seventh, ninth, tenth and twelfth optical device strips 182, 184, 185, 187 is formed to be equal to the area to block the light by the eighth and eleventh optical device strips 183 and 186 when the optical recording medium is untilting.

The light sensing unit 188 is configured in which twenty-ninth to thirty-fourth light receiving elements 189, 190, 191, 192, 193 and 194 have parting lines in the direction parallel to the straight line 30 and in the direction orthogonal to the straight line 30 so as to receive the light transmitted through the areas containing the respective optical device strips 182, 183, 184, 185, 186 and 187 and are arranged in a matrix of two lines and three columns. Suppose the detection signal by the twenty-ninth light receiving element 189 for receiving the light transmitted through the area containing the seventh light receiving element strips 182 is P16, the detection signal by the thirtieth light receiving element 190 for receiving the light transmitted through the area containing the eighth optical device strips 183 is P17, the detection signal by the thirty-first light receiving element 191 for receiving the light transmitted through the area containing the ninth optical device strips 184 is P18, the detection signal by the thirty-second light receiving element 192 for receiving the light transmitted through the area containing the tenth optical device-strips 185 is P19, the detection signal by the thirty-third light receiving element 193 for receiving the light transmitted through the area containing the eleventh optical device strips 186 is P20, and the detection signal by the thirty-fourth light receiving element 194 for receiving the light transmitted through the area containing the twelfth optical device strips 187 is P21. The tilt sensing signal Pg10 expressing the radial tilt is determined by Equation (22), and the tilt sensing signal Pg11 expressing the tangential tilt is determined by Equation (23).

$$Pg10=(P15+P17+P18+P20)-(P16+P19) \tag{22}$$

$$Pg11=(P15+P16+P17)-(P18+P19+P20) \tag{23}$$

Moreover, the light sensing unit 75, 146 and 163 are formed of three light receiving elements, but it is acceptable to form such a configuration in which light receiving elements for receiving the other diffracted lights are further provided to detect other detection signals such as a reproducing signal without limiting to this.

Besides, the condensing unit 27 is the infinite system in which the output light from the light source 26 is formed into parallel light by the collimating lens 33 and then it is condensed onto the optical recording medium 24 by the objective lens 35. However, it may be the finite system in which the output light from the light source 26 is condensed onto the optical recording medium 24 by the objective lens 35 without the collimating lens 33.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

INDUSTRIAL APPLICABILITY

As described above, according to the invention, the light emitted from the light source is formed into parallel light by the irradiating unit and is irradiated onto the light reflector. The light transmitted through the optical device disposed in the irradiating unit is reduced in light quantity and is irradiated onto the light reflector. The reflected light reflected by the light reflector again transmits through the optical device and is received on the light sensing unit. When the light reflector is orthogonal to the optical axis and it is not tilting, the incident position of the reflected light on the optical device is the same as the output light. Further variations in light quantity are not generated by transmitting the optical device. When the light reflector is in the state not orthogonal to the optical axis and it is tilting, the position where the reflected light reflected from the light reflector enters the optical device is moved, and thus the light quantity is varied by transmitting the optical device. In this manner, the light quantity to be received on the light sensing unit is varied corresponding to the amount of tilt in the light reflector, and thus the accurate amount of tilt in the light reflector can be detected.

Furthermore, according to the invention, the light emitted from the light source is condensed onto the disk-shaped light reflector by the condensing unit. The light transmitted through the optical device disposed in the condensing unit is reduced in light quantity by the first and second optical device strips formed at the positions of axial symmetry about the optical axis so as to have the predetermined shift in the direction of the straight line of connecting the axis of the light reflector to the condensed position where the light emitted from the light source is condensed onto the light reflector by the condensing unit. When the light reflector is untilting, the reflected light reflected by the light reflector in axial symmetry again transmits through the optical device and is reduced in light quantity. Additionally, when the light reflector is tilting, the position where the reflected light from the light reflector reaches on the optical device is moved as compared with the case of the light reflector untilting, and thus the light quantity reduced by the first and second light receiving element strips is varied corresponding to the amount of tilt. In this manner, the light quantity varied corresponding to the amount of tilt in the light reflector is sensed on the light sensing unit, whereby the amount of tilt in the light reflector can be detected accurately.

Furthermore, according to the invention, the first and second optical device strips have an approximately rectangular cross section orthogonal to the optical axis. Thus, the modulation factor of the light quantity is increased to the amount of tilt in the light reflector and detection accuracy is improved. Additionally, the first and second optical device strips are arranged at regular intervals, whereby the light quantity is varied linearly corresponding to the amount of tilt in the light reflector. Thus, the amount of tilt in the light reflector can be detected accurately and easily.

Furthermore, according to the invention, the optical device is configured in which the first and second optical device strips are shifted by a quarter of the array pitch T, the first and second optical device strips have the length which is a half of the array pitch T in the direction of the straight line of connecting the axis of the light reflector to the condensed position where the light emitted from the light source is condensed onto the light reflector by the condensing unit. Therefore, the light quantity takes the maximum value when the position where the reflected light from the light reflector enters the optical device is shifted by a quarter toward one of the direction points of the straight line, whereas it takes the minimum value when shifted by a quarter toward the other of the direction points of the straight line. Accordingly, the amount of tilt can be detected accurately regardless of the direction of the light reflector tilting.

Furthermore, according to the invention, the light sensing unit includes at least three light receiving elements, which is configured of the light receiving element for receiving the light transmitted through the area containing the first optical device strips, the light receiving element for receiving the light transmitted through the area containing the second optical device strips, and the light receiving element for receiving the light transmitted through the remaining area containing the first and second optical device strips. The detection signals detected by the light receiving element for receiving the light transmitted through the area containing the first optical device strips and the light receiving element for receiving the light transmitted through the area containing the second optical device strips are divided by the detection signal detected by the light receiving element for receiving the light transmitted through the remaining area containing the first and second optical device strips. Then, the influence of variations in the light intensity caused by the light diffraction by the light reflector and variations in the reflectance is cancelled. Consequently, the accurate amount of tilt in the light reflector can be obtained regardless of the variations in the light intensity of the reflected light.

Furthermore, according to the invention, at least two light receiving elements are disposed in the direction of the lens moved with tracking control, and thus the direction of the objective lens moved can be detected based on the difference between the detection signals by the light receiving elements.

Furthermore, according to the invention, the diffracted light of the light transmitted through the area containing the first optical device strips and the diffracted light of the light transmitted through the area containing the second optical device strips are received by the same light receiving element. This allows simplification of an arithmetic circuit, and reduction in the numbers of the light receiving elements. Thus, the simplified, scaled-down apparatus and the cost reduction can be realized.

Furthermore, according to the invention, the light emitted from the light source is condensed onto the disk-shaped light reflector by the condensing unit. The light transmitted through the optical device disposed in the condensing unit is reduced in light quantity by at least four optical device strips formed at the positions of axial symmetry about the optical axis so as to have the predetermined shift in the direction of the straight line of connecting the axis of the light reflector to the condensed position where the light emitted from the light source is condensed onto the light reflector by the condensing unit. When the light reflector is tilting, the position where the reflected light from the light reflector reaches on the optical device is moved as compared with the case of the light reflector untilting. Thus, the light quantity to be reduced by at least four light receiving element strips is varied corresponding to the amount of tilt. In this manner, the light sensing unit senses the light quantity varied corresponding to the amount of tilt in the light reflector, whereby the amount of tilt in the light reflector can be detected.

Furthermore, according to the invention, the optical device is provided with the third, fourth, fifth and sixth optical device strips. The optical device strips are formed at the positions of axial symmetry about the optical axis as the third optical device strips to the fifth optical device strips and the fourth optical device strips to the sixth optical device strips, and they have the predetermined shift in the direction of the straight line of connecting the axis of the light reflector to the condensed position where the light emitted from the light source is condensed onto the light reflector by the condensing unit. Therefore, the light quantity reduced by the third optical device strips and the fifth optical device strips is different from the light quantity reduced by the fourth optical device strips and the sixth optical device strips in the variations corresponding to the amount of tilt. Accordingly, the light quantity reduced by the third optical device strips and the fifth optical device strips and the light quantity reduced by the fourth optical device strips and the sixth optical device strips can detect the amount of tilt in the light reflector.

Furthermore, according to the invention, the third, fourth, fifth and sixth optical device strips have an approximately rectangular cross section orthogonal to the optical axis. Thus, the modulation factor of the light quantity to the amount of tilt in the light reflector is greater and the detection accuracy is enhanced. Besides, the third, fourth, fifth and sixth optical device strips are arranged at regular intervals, whereby the light quantities of the light transmitting through the area containing the third optical device strips and the light transmitting through the area containing the fifth optical device strips, the light quantity of the light transmitting through the area containing the fourth optical device strips, and the light quantity of the light transmitting through the area containing the sixth optical device strips are varied linearly and separately corresponding to the amount of tilt in the light reflector. Therefore, the amount of tilt in the light reflector can be detected accurately and easily.

Furthermore, according to the invention, the optical device is configured in which the third, fourth, fifth and sixth optical device strips have the length which is a half of the array pitch T1 in the direction of the straight line of connecting the axis of the light reflector to the condensed position where the light emitted from the light source is condensed onto the light reflector by the condensing unit, the third optical device strips and the fifth optical device strips are arranged to shift by a quarter of the array pitch T1 in one of the direction points of the straight line, and the fourth optical device strips and the sixth optical device strips are arranged to shift by a quarter of the array pitch T1 in the other of the direction points of the straight line. Therefore, the light quantities of the light transmitting through the area containing the third optical device strips and the light the transmitting through the area containing the fifth optical device strips take the maximum value when the position where the reflected light from the light reflector enters the optical device is shifted by a quarter in one of the direction points of the straight line whereas they take the minimum value when shifted by a quarter in the other of the direction points. Furthermore, the light quantities of the light transmitting through the area containing the fourth optical device strips and the light transmitting through the area containing the sixth optical device strips take the minimum value when the position where the reflected light from the light reflector enters the optical device is shifted by a quarter in one of the direction points of the straight line, whereas they take the maximum value when shifted by a quarter in the other of the direction points. Accordingly, the amount of tilt can be detected accurately regardless of the direction of the light reflector tilting.

Furthermore, according to the invention, the third through sixth optical device strips are so formed as to be perpendicular to a straight line of connecting the axis of the light reflector to the condensed position where the light emitted from the light source is condensed onto the light reflector by the condensing unit, and to be axisymmetrical about the straight line passing through the center of the optical device. Thus, the light quantities reduced by the third and fifth optical device strips are allowed to be equal to the light quantities reduced by the fourth and sixth optical device strips when the light reflector is untilting.

Furthermore, according to the invention, the light sensing unit is configured of the light receiving element for receiving the light transmitted through the area containing the third optical device strips, the light receiving element for receiving the light transmitted through the area containing the fourth optical device strips, the light receiving element for receiving the light transmitted through the area containing the fifth optical device strips, and the light receiving element for receiving the light transmitted through the area containing the sixth optical device strips. The amount of tilt can be detected accurately by the detection signal of the detection signal by the light receiving element for receiving the light transmitted through the third optical device strips added to the detection signal by the light receiving element for receiving the light transmitted through the fifth optical device strips and the detection signal of the detection signal by the light receiving element for receiving the light transmitted through the fourth light receiving element strips added to the detection signal by the light receiving element for receiving the light transmitted through the sixth optical device strips. In addition, at least two light receiving elements included in the light sensing unit are disposed in the direction of the lens moved with tracking control. Thus, the direction of the objective lens moved can be detected based on the difference in the detection signals of the respective light receiving elements.

Furthermore, according to the invention, the amount of tilt in the light reflector can be detected by the detection signal of the detection signal by the light receiving element for receiving the light transmitted through the area containing the third light receiving element strips added to the detection signal by the light receiving element for receiving the light transmitted through the area containing the fifth light receiving element strips and the detection signal of the detection signal by the light receiving element for receiving the light transmitted through the area containing the fourth light receiving element strips added to the detection signal by the light receiving element for receiving the light transmitted through the area containing the sixth optical device strips.

Moreover, the detection signals by the respective light receiving elements for receiving the light transmitted through the area containing the third light receiving element strips, the light transmitted through the area containing the fourth light receiving element strips, the light transmitted through the area containing the fifth light receiving element strips, and the light transmitted through the area containing the sixth optical device strips are divided by the detection signal by the light receiving element for receiving the light transmitted through the remaining area containing the third, fourth, fifth and sixth light receiving element strips, and the influence of the variations in the light intensity caused by the light diffraction by the light reflector and variations in the reflectance. Therefore, the accurate amount of tilt in the light reflector can be obtained regardless of the variations in the light intensity of the reflected light. Besides, at least two light receiving elements included in the light sensing unit are arranged in the direction of the lens moved with tracking control. Thus, the direction of the objective lens moved can be detected based on the difference in the detection signals by the respective light receiving elements.

Furthermore, according to the invention, for example, the light transmitted through the area containing the third light receiving element strips and the light transmitted through the area containing the fifth light receiving element strips are received by the same light receiving element, and the light transmitted through the area containing the fourth light receiving element strips and the light transmitted through the area containing the sixth light receiving element strips are received by the same light receiving element. Therefore, an arithmetic circuit for determining the sum signal does not need to be disposed. This allows simplification of an arithmetic circuit and reduction in the numbers of the light receiving elements. Thus, the simplified, scaled-down apparatus and the cost reduction can be realized.

Furthermore, according to the invention, for example, the light transmitted through the area containing the third light receiving element strips and the light transmitted through the area containing the fifth light receiving element strips are received by the same light receiving element. The light transmitted through the area containing the fourth light receiving element strips and the light transmitted through the area containing sixth light receiving element strips are received by the same light receiving element. Therefore, an arithmetic circuit for calculating the sum signal does not need to be disposed, and the numbers of the light receiving elements can be reduced. Thus, the simplified, scaled-down apparatus and the cost reduction can be realized.

Furthermore, according to the invention, the determining unit determines whether the condensed position where the light emitted from the light source is condensed onto the optical recording medium by the condensing unit is located on the land or groove, and the switching unit switches the signal processing methods for detecting the amount of tilt responding to the determined result. Therefore, even when the light is condensed onto either the land or groove, the accurate amount of tilt can be detected with no influence of the variations in light quantity of the reflected light because of the difference between the diffraction pattern of the land and the diffraction pattern of the groove.

Furthermore, according to the invention, the objective lens and the optical device are disposed integrally. Thus the position adjustment and mounting of the optical device to the objective lens is easy and the time and operating procedures for adjusting the optical device can be reduced.

Furthermore, according to the invention, in the optical device, exclusive of the optical device strip, the length along the straight line of connecting the axis of the light reflector to the condensed position where the light emitted from the optical axis is condensed onto the light reflector by the condensing unit is made longer than the length in the direction perpendicular to the straight line. Thus, the light spot diameter of the light condensed by the condensing unit is shielded by the optical device strip. This helps cancel out reduction in the numerical aperture (NA) in the direction perpendicular to the straight line. Consequently, an increase in the light spot diameter proportional to $\lambda$/NA can be prevented.

Furthermore, according to the invention, the light filter is used for the optical device. The light filter is available at low cost, thus contributing to the cost reduction.

What is claimed is:

1. A tilt sensing apparatus comprising:
a light source for emitting light;
a light reflector for reflecting light emitted from the light source;
an irradiating unit disposed between the light source and the light reflector for forming the light emitted from the light source into parallel light and irradiating the parallel light onto the light reflector;
an optical device disposed in the irradiating unit for varying a light quantity of the light emitted from the light source and/or light reflected from the light reflector by blocking a portion of the light; and
a light sensing unit for sensing the light reflected from the light reflector and varied in light quantity by the optical device,
wherein an amount of tilt in the light reflector is detected.

2. The tilt sensing apparatus of claim 1, wherein the optical device is formed of a light filter for attenuating the light intensity.

3. A tilt sensing apparatus comprising:
a light source for emitting light;
a disk-shaped light reflector for reflecting light emitted from the light source;
a condensing unit disposed between the light source and the light reflector for condensing the light emitted from the light source onto the light reflector;
an optical device disposed in the condensing unit for varying the light quantity of the light emitted from the light source and the light reflected from the light reflector by blocking a portion of the light, the optical device having an optical body, and first and second groups of optical device strips formed on the optical device body so as to have a predetermined shift from positions of axial symmetry about an optical axis in the direction of a straight line connecting an axis of the light reflector to the condensed position where the light emitted from the light source is condensed onto the light reflector by the condensing unit; and
a light sensing unit for sensing the light reflected from the light reflector and varied in light quantity by the optical device,
wherein the amount of tilt in the light reflector is detected.

4. The tilt sensing apparatus of claim 3, wherein each optical device strip of the first and second groups of optical device strips has an approximately rectangular cross section orthogonal to the optical axis, the optical device strips are formed in plurals extending from an optical device main body at a predetermined array pitch T in a direction of a straight line connecting the axis of the light reflector to the condensed position where the light emitted from the light source is condensed onto the light reflector by the condensing unit.

5. The tilt sensing apparatus of claim 4, wherein each optical device strip of the first and second groups of optical device strips has a length which is one half of the array pitch T in the direction of a straight line connecting the axis of the light reflector to the condensed position where the light emitted by the light source is condensed onto the light reflector by the condensing unit, and the shift is a quarter of the array pitch T.

6. The tilt sensing apparatus of claim 3, wherein the light sensing unit includes at least three light receiving elements having parting lines in a direction parallel to the straight line connecting the axis of the light reflector to the condensed position where the light emitted from the light source is condensed onto the light reflector by the condensing unit and being arranged in the direction orthogonal to the straight line.

7. The tilt sensing apparatus of claim 3, wherein the light sensing unit includes at least two light receiving elements having a parting line in a direction orthogonal to the straight line connecting the axis of the light reflector to the condensed position where the light emitted from the light source is condensed onto the light reflector by the condensing unit and being arranged in the direction of the straight line.

8. The tilt sensing apparatus of claim 3, wherein in the light sensing unit, at least three rows are disposed in a direction orthogonal to the straight line connecting the axis of the light reflector to the condensed position where the light emitted from the light source is condensed onto the light reflector by the condensing unit and at least two columns are disposed in a direction parallel to the straight line.

9. The tilt sensing apparatus of claim 3, further comprising:
a diffraction grating disposed between the optical device and the light sensing unit, the diffraction grating having at least two parting lines parallel to a straight line connecting the axis of the light reflector to the condensed position where light emitted from the light source is condensed onto the light reflector by the condensing unit, and also having at least three diffraction regions arranged in a row in a direction orthogonal to the straight line.

10. The tilt sensing apparatus of claim 3, wherein
the light reflector is an optical recording medium having a land and a groove, and
the apparatus is further provided with:
a determining unit for determining whether the condensed position where the light emitted from the light source is condensed onto the optical recording medium by the condensing unit is located on the land or groove, and
a switching unit for switching signal processing methods for detecting the amount of tilt responding to the determined result by the determining unit.

11. The tilt sensing apparatus of claim 3, wherein
the condensing unit includes an objective lens and a lens holding member for holding the objective lens,
wherein the optical device is mounted on the lens holding member so as to have an axis on the elongation of the axis of the objective lens.

12. The tilt sensing apparatus of claim 3, wherein an opening is formed in the optical device body which opening is shaped so as to have a length in the direction orthogonal to the straight line connecting the axis of the light reflector to the condensed position where the light emitted from the optical axis is condensed onto the light reflector by the condensing unit is longer than a length in the direction parallel to the straight line.

13. The tilt sensing apparatus of claim 3, wherein
the optical device is formed of a light filter for attenuating the light intensity.

14. A tilt sensing apparatus comprising:
a light source for emitting light;
a disk-shaped light reflector for reflecting light emitted from the light source;
a condensing unit disposed between the light source and the light reflector, for condensing the light emitted from the light source onto the light reflector;
an optical device disposed in the condensing unit, for varying a light quantity of the light emitted from the light source and the light reflected from the light reflector by blocking a portion of the light, the optical device having at least four optical device strips formed at positions of axial symmetry about an optical axis so as to have a predetermined shift in a direction of a straight line connecting an axis of the light reflector to the condensed position where the light emitted from the light source is condensed onto the light reflector by the condensing unit; and
a light sensing unit for sensing the light reflected from the light reflector and varied in light quantity by the optical device,
wherein the amount of tilt of the light reflector is detected.

15. The tilt sensing apparatus of claim 14, wherein the optical device includes at least first, second, third and fourth optical device strips, wherein the optical device strips are formed at positions of axial symmetry about the optical axis as the first and third optical device strips and the second and fourth optical device strips, respectively, so as to have a predetermined shift in the direction of the straight line connecting the axis of the light reflector to the condensed position where the light emitted from the light source is condensed onto the light reflector by the condensing unit.

16. The tilt sensing apparatus of claim 15, wherein the first, second, third and fourth optical device strips each has an approximately rectangular cross section orthogonal to the optical axis and are formed in plurals as extending from the optical device main body at a predetermined array pitch T1 in the direction of the straight line connecting the axis of the light reflector to the condensed position where the light emitted from the light source is condensed onto the light reflector by the condensing unit.

17. The tilt sensing apparatus of claim 16, wherein
the first, second, third and fourth optical device strips each have a length which is half of the array pitch T1 in the direction of the straight line connecting the axis of the light reflector to the condensed position where the light emitted from the light source is condensed onto the light reflector by the condensing unit,
the first and third optical device strips have a shift which is a quarter of the array pitch T1 in one of the direction points of the straight line, and
the second and fourth optical device strips have a shift which is a quarter of the array pitch T1 in the other of the direction points of the straight line.

18. The tilt sensing apparatus of claim 15, wherein the first through the fourth optical device strips are formed so as to be axisymmetrical about a straight line which passes through the center of the optical device and is perpendicular to the straight line connecting the axis of the light reflector to the condensed position where the light emitted from the light source is condensed onto the light reflector by the condensing unit.

19. The tilt sensing apparatus of claim 16, wherein the first through the fourth optical device strips are formed so as to be axisymmetrical about a straight line which passes through the center of the optical device and is perpendicular to the straight line connecting the axis of the light reflector to the condensed position where the light emitted from the light source is condensed onto the light reflector by the condensing unit.

20. The tilt sensing apparatus of claim 17, wherein the first through the fourth optical device strips are formed so as to be axisymmetrical about a straight line which passes through the center of the optical device and is perpendicular to the straight line connecting the axis of the light reflector to the condensed position where the light emitted from the light source is condensed onto the light reflector by the condensing unit.

21. The tilt sensing apparatus of claim 15, wherein the light receiving unit includes at least four light receiving elements arranged in a matrix shape as having parting lines in the direction parallel to the straight line connecting the axis of the light reflector to the condensed position where the light emitted from the light source is condensed onto the light reflector by the condensing unit and in the direction orthogonal to the straight line, the four light receiving units for receiving the lights transmitted through the areas respectively containing said first, second, third and fourth optical device strips.

22. The tilt sensing apparatus of claim 15, wherein the light sensing unit includes at least three light receiving elements having parting lines in the direction parallel to the straight line connecting the axis of the light reflector to the condensed position where the light emitted from the light source is condensed onto the light reflector by the condensing unit and being arranged in the direction orthogonal to the straight line, wherein among the three light receiving elements, one light receiving element is further split into at least two parts by a parting line orthogonal to the straight line so as to receive the light transmitted through the areas containing the first and second optical device strips respectively, and another light receiving element is further split into at least two parts by the parting line orthogonal to the straight line so as to receive the light transmitted through the areas containing the third and fourth optical device strips respectively.

23. The tilt sensing apparatus of claim 15, further comprising:

a diffraction grating disposed between the optical device and the light sensing unit, the diffraction grating having partition lines in the direction parallel to the straight line connecting the axis of the light reflector to the condensed position where the light emitted from the light source is condensed onto the light reflector by the condensing unit and in the direction orthogonal to the straight line, and also having at least four diffraction regions arranged in a matrix shape.

24. The tilt sensing apparatus of claim 15, further comprising:

a diffraction grating disposed between the optical device and the light sensing unit, the diffraction grating having a parting line parallel to the straight line connecting the axis of the light reflector to the condensed position where the light emitted from the light source is condensed onto the light reflector by the condensing unit, and also having at least three diffraction regions arranged in a column in the direction perpendicular to the straight line, in which among the three diffraction regions, one diffraction region has a parting line perpendicular to the straight line and has at least two small diffraction regions disposed adjacently in the direction parallel to the straight line, so that the light transmitted through the areas containing the first and second optical device strips respectively enters, and another diffraction region includes a diffraction grating having a parting line perpendicular to the straight line and having at least two small diffraction regions disposed adjacently in the direction parallel to the straight line, so that the light transmitted through the areas containing the third and fourth optical device strips respectively enters.

25. The tilt sensing apparatus of claim 14, wherein the condensing unit includes an objective lens and a lens holding member for holding the objective lens, wherein the optical device is mounted on the lens holding member so as to have an axis on the elongation of the axis of the objective lens.

26. The tilt sensing apparatus of claim 14, wherein an opening is formed in the optical device body which opening is shaped so as to have a length in the direction orthogonal to the straight line connecting the axis of the light reflector to the condensed position where the light emitted from the optical axis is condensed onto the light reflector by the condensing unit is longer than a length in the direction parallel to the straight line.

27. The tilt sensing apparatus of claim 14, wherein the optical device is formed of a light filter for attenuating the light intensity.

* * * * *